(12) United States Patent
Ichihara

(10) Patent No.: US 10,097,768 B2
(45) Date of Patent: Oct. 9, 2018

(54) LIGHT EMISSION CONTROL DEVICE THAT CONTROLS LIGHT EMISSION OF LIGHTING DEVICE, METHOD OF CONTROLLING THE SAME, STORAGE MEDIUM, AND IMAGE PICKUP APPARATUS

(71) Applicant: CANON KABUSHIKI KAISHA, Tokyo (JP)

(72) Inventor: Yoshiro Ichihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/412,186

(22) Filed: Jan. 23, 2017

(65) Prior Publication Data
US 2017/0214840 A1    Jul. 27, 2017

(30) Foreign Application Priority Data

Jan. 27, 2016 (JP) ................. 2016-013498

(51) Int. Cl.
*H04N 5/235* (2006.01)

(52) U.S. Cl.
CPC ......... *H04N 5/2354* (2013.01); *H04N 5/2351* (2013.01); *G03B 2215/0528* (2013.01)

(58) Field of Classification Search
CPC ............. H04N 5/2354; H04N 5/2351; G03B 2215/0528
See application file for complete search history.

(56) References Cited

U.S. PATENT DOCUMENTS 5,194,885 A * 3/1993 Spencer ................. G03B 15/05
396/182

FOREIGN PATENT DOCUMENTS

JP    2009-163179 A    7/2009

\* cited by examiner

*Primary Examiner* — Ahmed A Berhan
(74) *Attorney, Agent, or Firm* — Fitzpatrick, Cella, Harper & Scinto

(57) ABSTRACT

A light emission control device capable of performing driving for changing an irradiating direction in correct timing during automatic bounce control. The light emission control device controls a light emission unit that irradiates light to an object. The posture information of at least one of an image pickup apparatus and the light emission unit is detected. For bounce shooting, there is selected one of a first mode for controlling the direction of irradiating the light according to distances from the image pickup apparatus to the object and the reflection object and a second mode for manually controlling the irradiating direction. In a case where the second mode has been selected, when a first operating portion is operated, the irradiating direction is controlled according to the detected posture information.

10 Claims, 35 Drawing Sheets

8-BIT (1-BYTE) COMMUNICATION EXAMPLE (BIT-RISE DETECTION)

|  | 1ST BYTE | 2ND BYTE | 3RD BYTE |
|---|---|---|---|
| CAMERA | COMMAND CS 08H | COMMAND NUMBER 011(0BH) | DATA 1 01 |
| STROBE | x x | x x | x x |

|  | 1ST BYTE | 2ND BYTE | 3RD BYTE |
|---|---|---|---|
| CAMERA | COMMAND CS 01H | x x | x x |
| STROBE | x x | COMMAND NUMBER 010(0AH) | DATA 1 01 |

FIG. 3D

|  | 1ST BYTE | 2ND BYTE | 3RD BYTE | 4TH BYTE |
|---|---|---|---|---|
| CAMERA | COMMAND CS 08H | COMMAND NUMBER 091(5BH) | DATA 1 02 | DATA 2 10 |
| STROBE | × × | × × | × × | × × |

FIG. 3E

|  | 1ST BYTE | 2ND BYTE | 3RD BYTE | 4TH BYTE |
|---|---|---|---|---|
| CAMERA | COMMAND CS 01H | × × | × × | × × |
| STROBE | × × | COMMAND NUMBER 090(5AH) | DATA 1 02 | DATA 2 10 |

*FIG. 6A*

| VERTICAL ANGLE | D0 | D1 | D2 | D3 |
|---|---|---|---|---|
| 0 | 0 | 0 | 0 | 0 |
| 45 | 0 | 0 | 0 | 1 |
| 60 | 0 | 0 | 1 | 1 |
| 75 | 0 | 0 | 1 | 0 |
| 90 | 0 | 1 | 1 | 0 |
| 105 | 0 | 1 | 1 | 1 |
| 120 | 0 | 1 | 0 | 1 |
| 135 | 0 | 1 | 0 | 0 |
| 180 | 1 | 1 | 0 | 0 |

*FIG. 6B*

| LATERAL ANGLE | D0 | D1 | D2 | D3 |
|---|---|---|---|---|
| 0(360) | 0 | 0 | 0 | 0 |
| 45 | 0 | 0 | 0 | 1 |
| 60 | 0 | 0 | 1 | 1 |
| 75 | 0 | 0 | 1 | 0 |
| 90 | 0 | 1 | 1 | 0 |
| 105 | 0 | 1 | 1 | 1 |
| 120 | 0 | 1 | 0 | 1 |
| 135 | 0 | 1 | 0 | 0 |
| 180 | 1 | 1 | 0 | 0 |
| 225 | 1 | 1 | 0 | 1 |
| 240 | 1 | 1 | 1 | 1 |
| 255 | 1 | 1 | 1 | 0 |
| 270 | 1 | 0 | 1 | 0 |
| 285 | 1 | 0 | 1 | 1 |
| 300 | 1 | 0 | 0 | 1 |
| 315 | 1 | 0 | 0 | 0 |

FIG. 8A
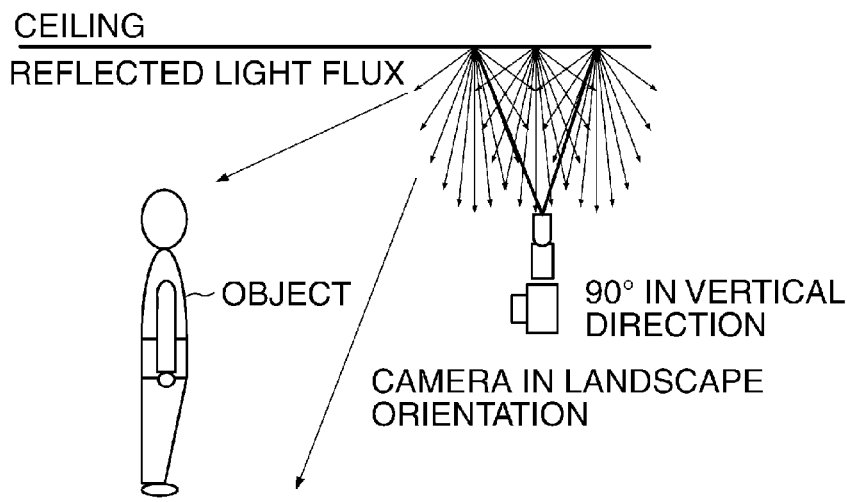
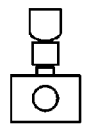
CAMERA-STROBE POSITION AS VIEWED FROM OBJECT
FIG. 8B
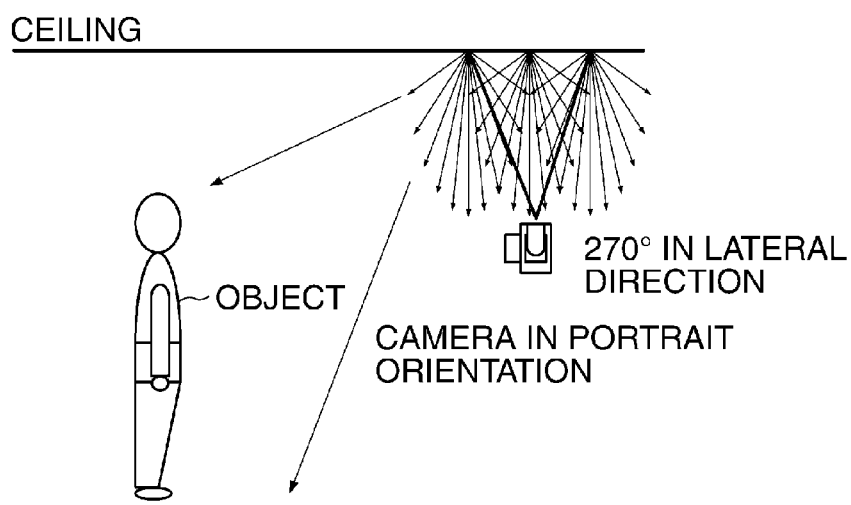
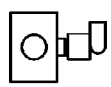
CAMERA-STROBE POSITION AS VIEWED FROM OBJECT

FIG. 11A

| COMMAND | COMMAND NUMBER | CONTENT | DATA ITEM |
|---|---|---|---|
| SC | 000 | AUTOMATIC BOUNCE FUNCTION | |
| HEX:01 | HEX:00 | | 0: NOT SET |
| | | | 1: SET |
| | | | |
| SC | 010 | AUTOMATIC BOUNCE SET/CANCEL | |
| HEX:01 | HEX:A | | 0: CANCEL |
| | | | 1: SET |
| | | | |
| SC | 020 | AUTOMATIC BOUNCE DRIVING RANGE | |
| HEX:01 | HEX:14 | | 0: ALL ALLOWED |
| | | | 1: HORIZONTAL ALLOWED |
| | | | 2: VERTICAL ENABLED |
| | | | |
| SC | 030 | AUTOMATIC BOUNCE HORIZONTAL DRIVING RANGE | START-END |
| HEX:01 | HEX:1E | | |
| SC | 040 | AUTOMATIC BOUNCE VERTICAL DRIVING RANGE | START-END |
| HEX:01 | HEX:28 | | |
| SC | 050 | DURING AUTOMATIC BOUNCE DRIVING (MOTOR) | |
| HEX:01 | HEX:32 | | 0: STOP |
| | | | 1: VERTICAL IN OPERATION |
| | | | 2: LATERAL IN OPERATION |
| | | | |
| SC | 060 | AUTOMATIC BOUNCE ERROR | |
| HEX:01 | HEX:3C | | 0: NORMAL |
| | | | 1: ERROR |
| | | | |
| SC | 070 | CURRENT POSITION BOUNCE ANGLE INFORMATION_VERTICAL | |
| HEX:01 | HEX:46 | | 000H—168H |
| | | | |
| SC | 080 | CURRENT POSITION BOUNCE ANGLE INFORMATION_LATERAL | |
| HEX:01 | HEX:50 | | 000H—168H |
| | | | |
| SC | 090 | AUTOMATIC BOUNCE RANGING METHOD | 0x: OBJECT |
| HEX:01 | HEX:5A | | 1x: REFLECTION OBJECT |
| | | | x0: PRELIMINARY LIGHT EMISSION |
| | | | x1: STROBE BUILT-IN AF |
| | | | x2: CAMERA AF |
| SC | 100 | REFLECTION OBJECT DISTANCE INFORMATION | |
| HEX:01 | HEX:64 | | DATA |
| | | | |
| SC | 110 | OBJECT DISTANCE INFORMATION | |
| HEX:01 | HEX:6E | | DATA |
| | | | |
| SC | 120 | STROBE POSTURE DIFFERENCE INFORMATION | |
| HEX:01 | HEX:78 | | HORIZONTAL DATA |
| | | | VERTICAL DATA |
| | | | FRONT-REAR DATA |
| SC | 130 | DURING AUTOMATIC BOUNCE PRELIMINARY LIGHT EMISSION | |
| HEX:01 | HEX:82 | | 0: ON STANDBY |
| | | | 1: DURING EMISSION |

FIG. 11B

| COMMAND | COMMAND NUMBER | CONTENT | DATA ITEM |
|---|---|---|---|
| CS | 001 | AUTOMATIC BOUNCE-COMPATIBLE CAMERA | |
| HEX: 08 | HEX: 01 | | 1: INCOMPATIBLE |
| | | | 0: COMPATIBLE |
| | | | |
| CS | 011 | AUTOMATIC BOUNCE SET/CANCEL | |
| HEX: 08 | HEX: 0B | | 0: CANCEL |
| | | | 1: SET |
| | | | |
| CS | 021 | INSTRUCTION OF AUTOMATIC BOUNCE DRIVING CONDITION | |
| HEX: 08 | HEX: 15 | | 0: ALL ALLOWED |
| | | | 1: HORIZONTAL |
| | | | 2: VERTICAL |
| | | | |
| CS | 031 | INSTRUCTION OF AUTOMATIC BOUNCE HORIZONTAL DRIVING RANGE | START-END |
| HEX: 08 | HEX: 1F | | |
| CS | 041 | INSTRUCTION OF AUTOMATIC BOUNCE VERTICAL DRIVING RANGE | START-END |
| HEX: 08 | HEX: 29 | | |
| CS | 051 | INSTRUCTION OF AUTOMATIC BOUNCE DRIVING (MOTOR) | |
| HEX: 08 | HEX: 33 | | 0: STOP |
| | | | 1: VERTICAL OPERATION |
| | | | 2: LATERAL OPERATION |
| | | | |
| CS | 071 | INSTRUCTION OF POSITION BOUNCE ANGLE_VERTICAL | |
| HEX: 08 | HEX: 47 | | 000H−S168H |
| | | | |
| CS | 081 | INSTRUCTION OF POSITION BOUNCE ANGLE_LATERAL | |
| HEX: 08 | HEX: 51 | | 000H−168H |
| | | | |
| CS | 091 | INSTRUCTION OF AUTOMATIC BOUNCE RANGING METHOD | 0x: OBJECT |
| HEX: 08 | HEX: 5B | | 1x: REFLECTION OBJECT |
| | | | x0: PRELIMINARY LIGHT EMISSION |
| | | | x1: STROBE BUILT-IN AF |
| | | | x2: CAMERA AF |

FIG. 11C

| COMMAND | COMMAND NUMBER | CONTENT | DATA ITEM |
|---|---|---|---|
| CS | 101 | REFLECTION OBJECT DISTANCE INFORMATION | |
| HEX: 08 | HEX: 65 | | DATA |
| | | | |
| CS | 111 | OBJECT DISTANCE INFORMATION | |
| HEX: 08 | HEX: 6F | | DATA |
| | | | |
| CS | 121 | CAMERA POSTURE DIFFERENCE INFORMATION | |
| HEX: 08 | HEX: 79 | | HORIZONTAL DATA |
| | | | VERTICAL DATA |
| | | | FRONT-REAR DATA |
| CS | 131 | INHIBITION OF PRELIMINARY LIGHT EMISSION | |
| HEX: 08 | HEX: 83 | | 0: ALLOWED |
| | | | 1: INHIBITED |
| CS | 141 | PHOTOMETRY TIMER | |
| HEX: 08 | HEX: 8D | | 0: NOT OPERATING |
| | | | 1: OPERATING |
| CS | 151 | STATE OF RELEASE SW | |
| HEX: 08 | HEX: 97 | | 0: SWITCH OFF |
| | | | 1: SW1 ON |
| | | | 2: SW2 ON |
| CS | 161 | CHANGE IN OPERATION SPEED | |
| HEX: 08 | HEX: A1 | | 0: NORMAL |
| | | | 1: LOW SPEED (QUIET) |
| | | | 2: HIGH SPEED |
| CS | 171 | CALCULATION OF BOUNCE ANGLE | |
| HEX: 08 | HEX: AB | | 0: STROBE |
| | | | 1: CAMERA |
| | | | |
| CS | 181 | SELECTION OF BOUNCE DRIVING INSTRUCTION | |
| HEX: 08 | HEX: B5 | | 0: STROBE |
| | | | 1: CAMERA |
| | | | |

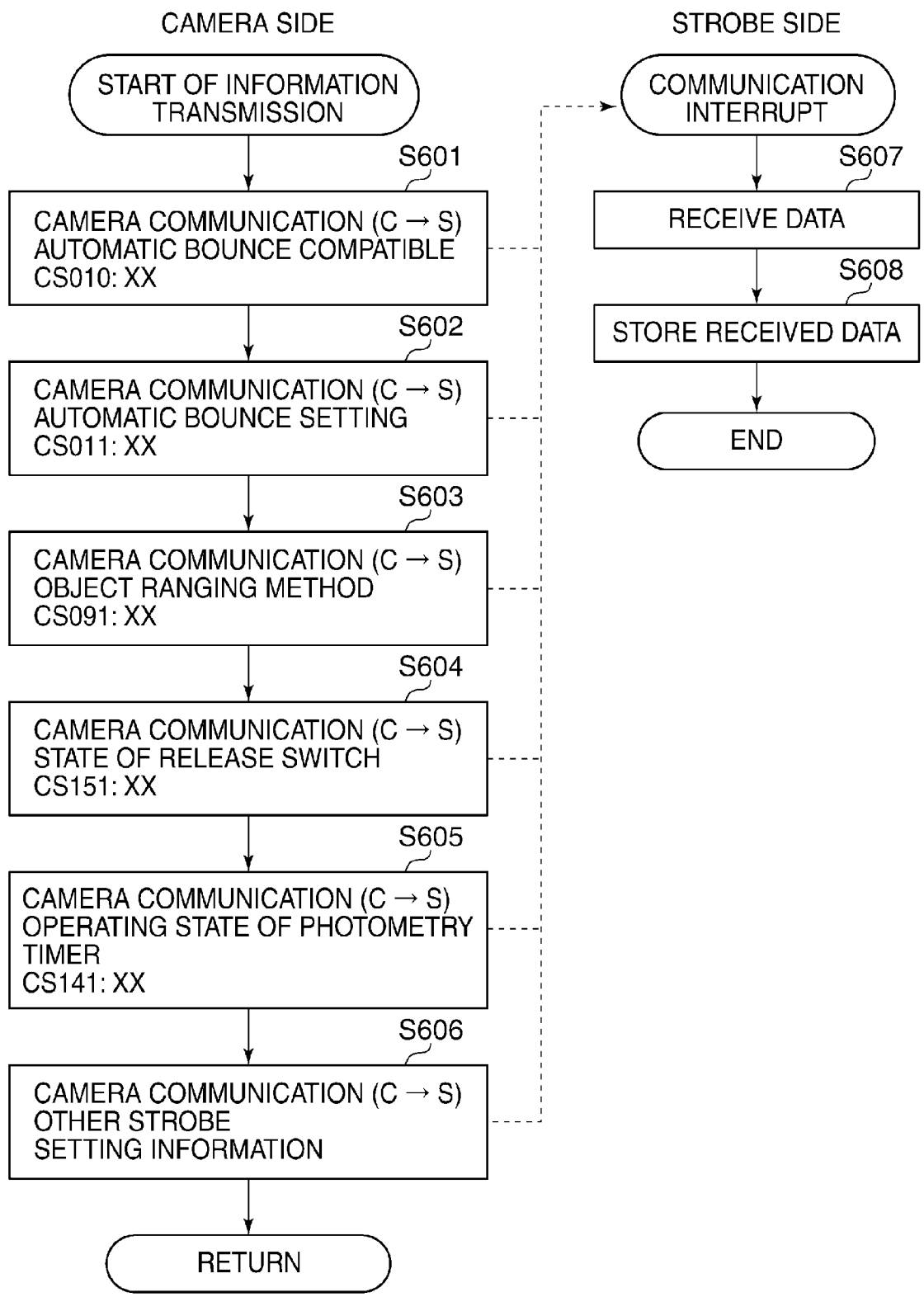

LIGHT EMISSION CONTROL DEVICE THAT CONTROLS LIGHT EMISSION OF LIGHTING DEVICE, METHOD OF CONTROLLING THE SAME, STORAGE MEDIUM, AND IMAGE PICKUP APPARATUS

BACKGROUND OF THE INVENTION

Field of the Invention

The present invention relates to a light emission control device, a method of controlling the same, a storage medium, and an image pickup apparatus, and more particularly to control of light emission of a lighting device that is capable of changing a direction of light irradiation therefrom.

Description of the Related Art

In general, there has been known so-called bounce flash shooting in which an object is shot, by irradiating light emitted from a lighting device, such as a strobe device, toward a reflection object (bounce surface), such as a ceiling, and illuminating the object by diffusely reflected light from the ceiling. Since the use of the bounce flash shooting makes it possible to indirectly irradiate the light from the strobe device to the object, the object can be rendered in soft light.

For performing such bounce flash shooting, there has been proposed automatic bounce control in which a distance to the object and a distance to the bounce surface are measured, and the direction of irradiating light from the strobe device is automatically controlled to an optimum bounce angle (angle formed by a shooting direction of a camera and a direction of irradiating light from the strobe device). The automatic bounce control is effective for beginners who are unfamiliar with the bounce shooting.

There has also been proposed manual bounce lock (semi-automatic bounce) in which a user designates a bounce angle in advance by manually changing an angle of a direction of irradiating light from the strobe device with respect to a shooting direction of the camera, and in this state, performs bounce shooting. The semi-automatic bounce is effective for users who are familiar with the bounce shooting. In the semi-automatic bounce, an optimum bounce angle is designated by the user himself/herself, and only when the posture of the camera is changed, the bounce angle is corrected according to the posture.

For example, there has been proposed a camera which is configured to automatically determine a bounce angle to perform a bounce operation (Japanese Patent Laid-Open Publication No. 2009-163179). In this camera, the user points a photographic lens at a reflection object, and then, first, half presses a release button (first time) for measuring a distance to the reflection object. Further, the user points the photographic lens at an object (shooting object), and then half presses the release button (second time) for measuring a distance to the object.

However, in the camera disclosed in Japanese Patent Laid-Open Publication No. 2009-163179, when the posture of the camera is changed from a landscape orientation to a portrait orientation, it is required to measure the distances again to calculate an optimum bounce angle. On the other hand, a case is assumed where the camera is configured to detect a change in the posture of the camera, and automatically drive a strobe emission section such that a direction of irradiating light therefrom always remains the same. In this case, since the automatic bounce control is intended for beginners, it is desirable to automatically drive the strobe emission section whenever the posture of the camera is changed. This not only makes it possible for the beginners to concentrate attention on an object without being conscious of the automatic bounce control but also is effective in a case where the beginners desire to immediately shoot the object (snapshot performance).

However, since the manual bounce control is intended for users who are familiar with the bounce shooting, if the bounce control is performed regardless of a user's will whenever the posture of the camera is changed, this can make the user uncomfortable. For example, the bounce control is performed even in a case where the user inclines the camera to make settings by operating the camera or to confirm an image by checking an image monitor, which can make the user uncomfortable.

SUMMARY OF THE INVENTION

The present invention provides a light emission control device that is capable of performing driving for changing an irradiating direction in correct timing during automatic bounce control according to a mode of the automatic bounce control, a method of controlling the same, a storage medium, and an image pickup apparatus.

In a first aspect of the invention, there is provided a light emission control device for controlling a light emission unit that irradiates light to an object when the object is shot by an image pickup apparatus, comprising a detection unit configured to detect posture information of at least one of the image pickup apparatus and the light emission unit, a selection unit configured to select one of a first mode for controlling an irradiating direction of the light emission unit according to distances from the image pickup apparatus to the object and a reflection object, and a second mode for manually controlling the irradiating direction of the light emission unit, when performing bounce shooting in which the object is shot by causing the light emitted from the light emission unit to be reflected from the reflection object for illumination of the object, and a control unit configured to control, in a case where the second mode has been selected, the irradiating direction of the light emission unit according to the posture information detected by the detection unit, when a predetermined first operating portion is operated.

In a second aspect of the invention, there is provided an image pickup apparatus including an image pickup unit configured to obtain an image by shooting an object via an image pickup optical system, and a light emission control device configured to control a light emission unit for irradiating light to the object when the image is obtained, the light emission control device comprising a detection unit configured to detect posture information of at least one of the image pickup apparatus and the light emission unit, a selection unit configured to select one of a first mode for controlling an irradiating direction of the light emission unit according to distances from the image pickup apparatus to the object and a reflection object, and a second mode for manually controlling the irradiating direction of the light emission unit, when performing bounce shooting in which the object is shot by causing the light emitted from the light emission unit to be reflected from the reflection object for illumination of the object, and a control unit configured to control, in a case where the second mode has been selected, the irradiating direction of the light emission unit according to the posture information detected by the detection unit, when a predetermined first operating portion is operated.

In a third aspect of the invention, there is provided a method of controlling a light emission control device for controlling a light emission unit that irradiates light to an object when the object is shot by an image pickup apparatus, comprising detecting posture information of at least one of the image pickup apparatus and the light emission unit, selecting one of a first mode for controlling an irradiating direction of the light emission unit according to distances from the image pickup apparatus to the object and a reflection object, and a second mode for manually controlling the irradiating direction of the light emission unit, when performing bounce shooting in which the object is shot by causing the light emitted from the light emission unit to be reflected from the reflection object for illumination of the object, and controlling, in a case where the second mode has been selected, the irradiating direction of the light emission unit according to the posture information detected by said detecting, when a predetermined first operating portion is operated.

In a fourth aspect of the invention, there is provided a non-transitory computer-readable storage medium storing a computer-executable program for executing a method of controlling a light emission control device for controlling a light emission unit that irradiates light to an object when the object is shot by an image pickup apparatus, wherein the method comprises detecting posture information of at least one of the image pickup apparatus and the light emission unit, selecting one of a first mode for controlling an irradiating direction of the light emission unit according to distances from the image pickup apparatus to the object and a reflection object, and a second mode for manually controlling the irradiating direction of the light emission unit, when performing bounce shooting in which the object is shot by causing the light emitted from the light emission unit to be reflected from the reflection object for illumination of the object, and controlling, in a case where the second mode has been selected, the irradiating direction of the light emission unit according to the posture information detected by said detecting, when a predetermined first operating portion is operated.

According to the present invention, in a case where the second mode has been selected, when a predetermined first operating portion is operated, the irradiating direction is controlled according to detected posture information. This makes it possible, during automatic bounce control, to perform driving for changing the irradiating direction according to a mode thereof in correct timing.

Further features of the present invention will become apparent from the following description of exemplary embodiments (with reference to the attached drawings).

BRIEF DESCRIPTION OF THE DRAWINGS

FIGS. 3A to 3E are diagrams useful in explaining an example of data communication using a terminal appearing in FIG. 1, in which FIG. 3A is a diagram of the timing of the data communication, and FIGS. 3B to 3E are diagrams showing examples of data transmitted and received through the data communication.

FIGS. 4A and 4B are diagrams useful in explaining rotations of a movable unit of a strobe appearing in FIG. 2 in vertical and lateral directions, in which FIG. 4A shows the rotation in the vertical direction, and FIG. 4B shows the rotation in the lateral direction.

FIGS. 5A and 5B are diagrams useful in explaining outputs from rotary encoders dependent on the rotations of the movable unit in the vertical and lateral directions, in which FIG. 5A illustrates detection of a rotational angle of the movable unit in the vertical direction, and FIG. 5B illustrates detection of a rotational angle of the movable unit in the lateral direction.

FIGS. 6A and 6B are diagrams useful in explaining correspondences between Gray codes of the rotary encoders and the rotational angles shown in FIGS. 5A and 5B, in which FIG. 6A shows a correspondence between Gray codes and the rotational angles in the vertical direction, and FIG. 6B shows a correspondence between Gray codes and the rotational angles in the lateral direction.

FIGS. 8A and 8B are diagrams useful in explaining a change in an irradiating direction, caused by a posture of the digital camera, in which FIG. 8A shows a state in which the digital camera is in a landscape orientation, and FIG. 8B shows a state in which the digital camera is in a portrait orientation.

FIG. 11A is a diagram showing an example of commands of a command type SC in a command list used in communication between the camera and the strobe.

FIG. 11B is a diagram showing an example of commands of a command type CS in the command list.

FIG. 11C is a continuation of FIG. 11B.

FIG. 12 is a flowchart of an information transmission process performed in a step in FIG. 7A.

DESCRIPTION OF THE EMBODIMENTS

The present invention will now be described in detail below with reference to the accompanying drawings showing embodiments thereof.

Figure 1:
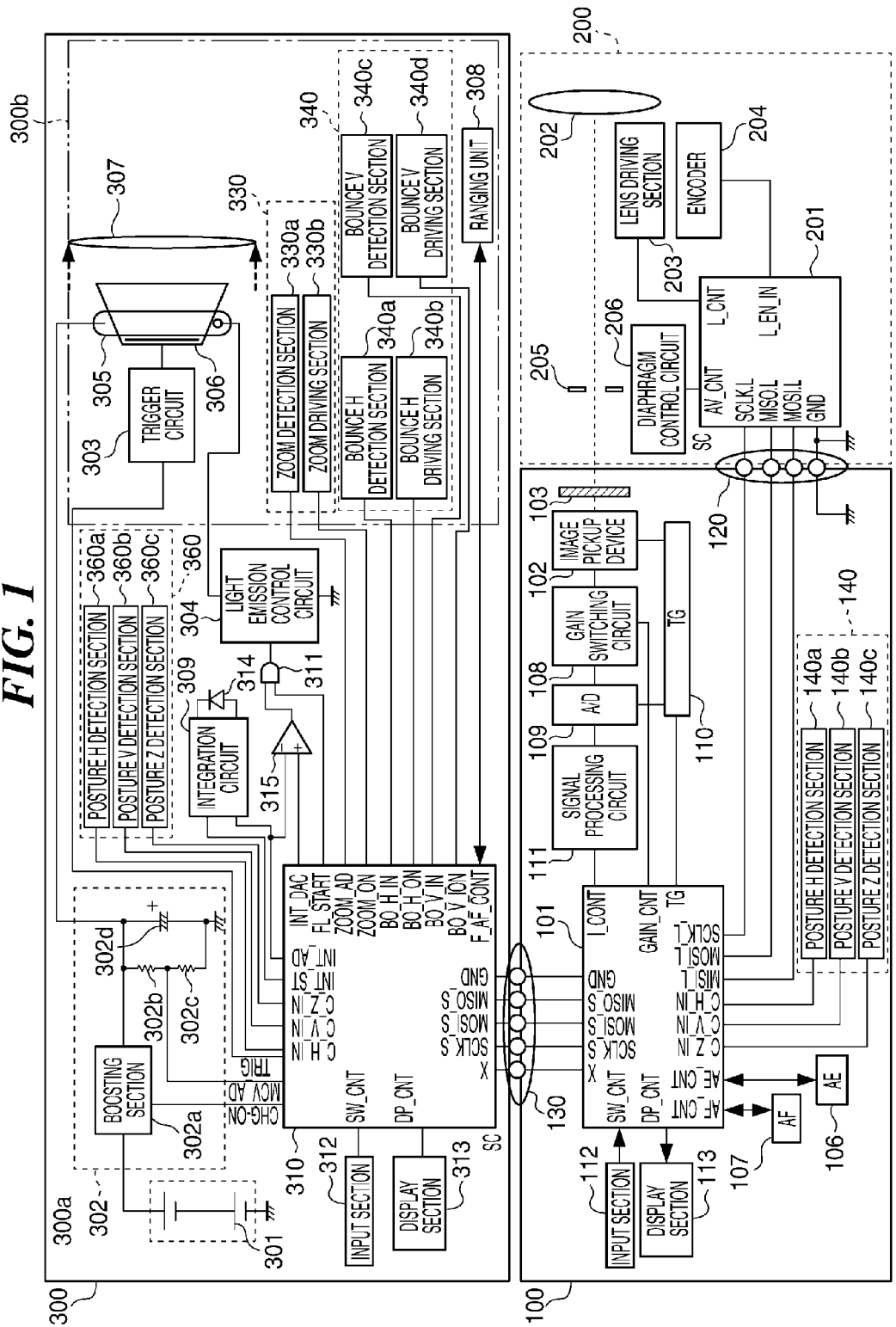
FIG. 1 is a block circuit diagram of a digital camera as an image pickup apparatus including a light emission control device according to a first embodiment of the present invention, in a state in which a light emission device is mounted on the image pickup apparatus.

FIG. 1 is a block circuit diagram of a digital camera as an image pickup apparatus including a light emission control device according to a first embodiment of the present invention, in a state in which a light emission device is mounted on the image pickup apparatus. Further, FIG. 2 is a diagram, partly broken away, of the mechanical configuration of the image pickup apparatus appearing in FIG. 1.

Figure 2:
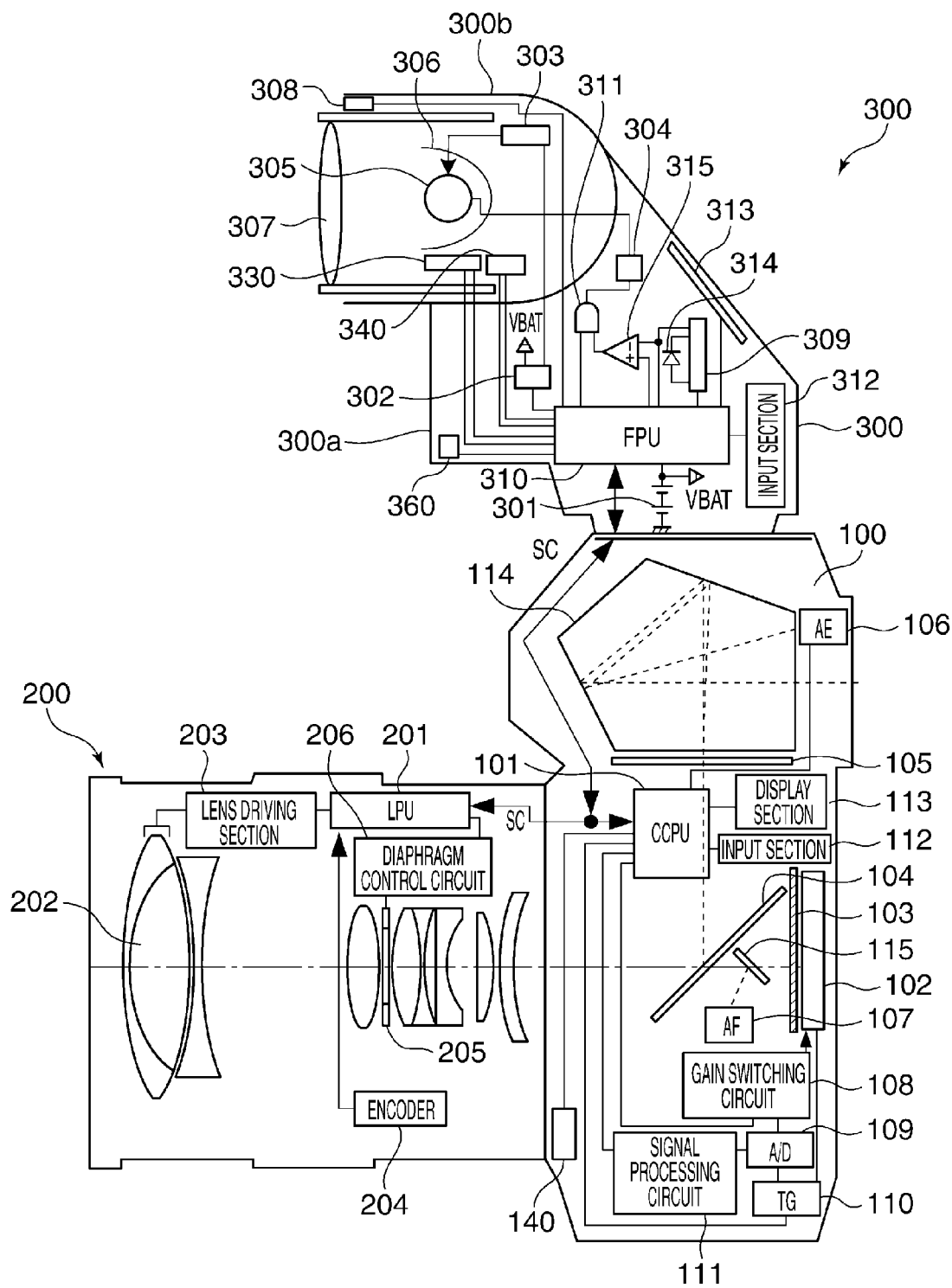
FIG. 2 is a diagram, partly broken away, of the mechanical configuration of the digital camera appearing in FIG. 1.

Referring to FIGS. 1 and 2, the illustrated digital camera (hereinafter simply referred to as the "camera") 100 as the image pickup apparatus has an interchangeable photographic lens unit (hereinafter simply referred to as the "photographic lens": image pickup optical system) 200 mounted thereon. Further, the light emission device (hereinafter simply referred to as the "strobe") 300 is removably mounted on the camera 100.

The camera 100 is provided with a microcomputer (CCPU: hereinafter referred to as the "camera microcomputer") 101. The camera microcomputer 101 controls the overall operation of the camera 100. The camera microcomputer 101 is implemented by a microcomputer-incorporated one-chip IC circuit. The camera microcomputer 101 is comprised of a CPU, a ROM, a RAM, an input/output control circuit, a multiplexer, a timer circuit, an EEPROM, an analog-to-digital converter, and a digital-to-analog converter. Further, the camera microcomputer 101 controls the camera 100, the photographic lens 200, and the strobe 300 according to programs (i.e. software), and performs various condition determinations.

An image pickup device 102 is implemented by a CCD sensor or a CMOS sensor including an infrared cut filter and a low pass filter. An optical image (object image) is formed on the image pickup device 102 via a lens group 202, described hereinafter, and the image pickup device 102 outputs electrical signals (analog signals) corresponding to the optical image.

A shutter 103 shields the image pickup device 102 from light when shooting is not performed, and opens a shutter curtain to guide an optical image to the image pickup device 102 when shooting is performed. A main mirror (half mirror) 104 reflects light incident through the lens group 200 when shooting is not performed, and causes the reflected light to form an optical image on a focusing plate 105. A photographer visually confirms the optical image projected on the focusing plate 105 through an optical finder (not shown).

A photometric circuit (AE) 106 includes a photometric sensor. In this example, an image pickup device, such as a CCD (charged coupled device) sensor or a CMOS (complementary metal oxide semiconductor) sensor, including a plurality of pixels, is used as the photometric sensor. Before acquiring an image for recording, a digital signal processing circuit 111 analyzes an image obtained by the photometric circuit 106, described hereinafter, to thereby detect a face orientation or the like of an object. Note that an object image formed on the focusing plate 105 enters the photometric sensor through a pentaprism 114.

A focus detection circuit (AF) 107 includes a ranging sensor. The ranging sensor measures a distance from the camera 100 to an object, using a plurality of points as ranging points. The ranging sensor is divided into a plurality of areas, and the areas include the ranging points.

A gain switching circuit 108 is a circuit for switching a gain for amplifying electrical signals which are outputs from the image pickup device 102. The gain switching circuit 108 performs gain switching e.g. according to a shooting condition and an instruction from the photographer under the control of the camera microcomputer 101. An analog-to-digital converter 109 converts the electrical signals which are the outputs from the image pickup device 102 to digital signals. A timing generator (TG) 110 synchronizes the electrical signals as the outputs from the image pickup device 102 and the timing of analog-to-digital conversion by the analog-to-digital converter 109.

The digital signal processing circuit (hereinafter also simply referred to as the "signal processing circuit") 111 generates image data by performing image processing on the digital signals which are the outputs from the analog-to-digital converter 109 according to predetermined development parameters. In this example, a memory and the like used for storing processed image data are omitted.

A communication line (SC) is an interface signal line between the camera 100, the photographic lens 200, and the strobe 300. For example, the camera 100, the photographic lens 200, and the strobe 300 exchange data and commands with each other using the camera microcomputer 101 as a host. By way of examples of the communication line SC, terminals of three-terminal serial communication are illustrated as terminals 120 and 130 in FIG. 1. The terminal 120 includes an SCLK_L terminal, an MOSI_L terminal, an MISO_L terminal, and a GND terminal. The SCLK_L terminal is a terminal for synchronizing communication between the camera 100 and the photographic lens (also referred to as the "lens unit") 200. The MOSI_L terminal is a terminal for transmitting data from the camera 100 to the lens unit 200. The MISO_L terminal is a terminal for receiving data transmitted from the lens unit 200 to the camera 100. The camera 100 and the lens unit 200 are connected to the GND terminal.

The terminal 130 includes an SCLK_S terminal, an MOSI_S terminal, an MISO_S terminal, and a GND terminal. The SCLK_S terminal is a terminal for synchronizing communication between the camera 100 and the strobe 300. The MOSI_S terminal is a terminal for transmitting data from the camera 100 to the strobe 300. The MISO_S terminal is a terminal for receiving data transmitted from the strobe 300 to the camera 100. The camera 100 and the strobe 300 are connected to the GND terminal.

Figures 3A, 3B, 3C:
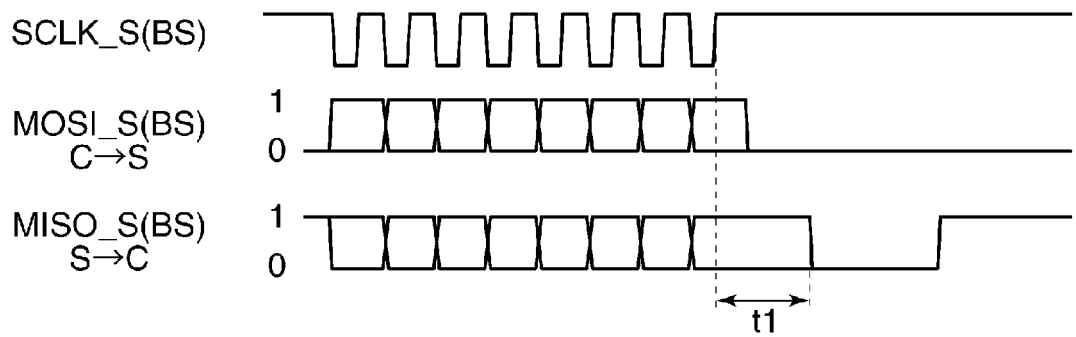

FIGS. 3A to 3E are diagrams useful in explaining an example of data communication using the terminal 130 appearing in FIG. 1, in which FIG. 3A is a diagram of the timing of the data communication, and FIGS. 3B to 3E are diagrams showing examples of data transmitted and received through the data communication.

To transmit data from the camera microcomputer 101 to a strobe microcomputer 310, referred to hereinafter, the data is serially transmitted from the MOSI_S terminal in synchronism with the 8-bit clock of the SCLK_S terminal. Further, to transmit data from the strobe microcomputer 310 to the camera microcomputer 101, the data is serially transmitted from the MISO_S terminal in synchronism with the 8-bit clock of the SCLK_S terminal.

Here, for example, data shown in FIGS. 3B to 3E is transmitted from the camera microcomputer 101 to the strobe microcomputer 310 according to a command list, described hereinafter. For example, in the case of "automatic bounce set/cancel" shown in FIG. 3B, 08H indicating that the transmitted command is a command of CS communication as a first byte, a command No. of 011 (0BH) as a second byte, and data (contents) of 01 (setting) as a third byte, are transmitted after converted from hexadecimal to binary.

When the camera 100 transmits data to the strobe 300, as the first byte, 08H indicating a command type CS is transmitted from the camera 100 to the strobe 300, as mentioned above. On the other hand, when the camera 100 acquires data from the strobe 300, as the first byte, 01H indicating a command type SC is transmitted from the camera 100 to the strobe 300.

As the second byte, a command number (which is converted to a hexadecimal number when transmitted) following the command type SC or CS, and as the third byte or as the third and fourth bytes, setting item data is transmitted from an associated one of the camera 100 and the strobe 300 to the other. Communication of other data items will be described hereinafter. Further, FIG. 3A illustrates 8-bit (1-byte) communication in which each signal is read or written in synchronism with the rise of the SCLK_S signal, and this 8-bit communication is consecutively performed a plurality of times, for a command type, a command number, and data.

An input section 112 includes a console section provided with a power switch, a release switch, setting buttons, and so forth (none of which are specifically shown), and the camera microcomputer 101 performs various processes according to inputs to the input section 112. When the release switch is half pressed as a first-stage operation, a first release switch SW1 is turned on to cause the camera microcomputer 101 to start a shooting preparation operation including focusing, photometry, etc. Further, when the release switch is fully pressed as a second-stage operation, a second release switch SW2 is turned on to cause the camera microcomputer 101 to start a shooting operation including exposure, development processing, etc. Furthermore, by operating the setting buttons provided on the input section 112, it is possible to configure various settings of the strobe 300.

A display section 113 displays shooting information including a shooting mode set for the camera. The display section 113 includes a liquid crystal display, a light emitting element, and so forth.

The pentaprism 114 guides an object image formed on the focusing plate 105 to the photometric sensor of the photometric circuit 106 and the optical finder. A sub mirror 115 guides light passed through the main mirror 104 to the ranging sensor of the focus detection circuit 107.

A posture detection circuit 140 is a circuit for detecting the posture information of the camera, and includes a posture H detection section 140a, a posture V detection section 140b, and a posture Z detection section 140c. The posture H detection section 140a detects the posture information of the camera in a horizontal direction. The posture V detection section 140b detects the posture information of the camera in a vertical direction. The posture Z detection section 140c detects the posture information of the camera in a front-rear direction (Z direction). Note that the posture detection circuit 140 is implemented e.g. by an angular velocity sensor or a gyro sensor. Further, posture information on the posture of the camera in each direction, detected by the posture detection circuit 140, is input to the camera microcomputer 101.

The photographic lens 200 includes a microcomputer (LPU: lens microcomputer) 201. The lens microcomputer 201 controls the overall operation of the photographic lens 200. The lens microcomputer 201 is implemented e.g. by a microcomputer-incorporated one-chip IC circuit which includes a CPU, a ROM, a RAM, an input/output control circuit, a multiplexer, a timer circuit, an EEPROM, an analog-to-digital converter, and a digital-to-analog converter. Further, the lens microcomputer 201 controls the photographic lens 200 according to programs.

The photographic lens 200 includes a lens group 202 having a plurality of lenses. The lens group 202 includes at least a focus lens. A lens driving section 203 moves at least the focus lens of the lens group 202 along an optical axis. The camera microcomputer 101 calculates a driving amount of the lens group 202 based on a detection output from the focus detection circuit 107, and transmits the calculated driving amount to the lens microcomputer 201.

An encoder 204 detects a position of the lens group 202 when the lens group 202 is driven. The lens microcomputer 201 controls the lens driving section 203 according to the driving amount calculated by the camera microcomputer 101. The lens microcomputer 201 controls the driving of the lens group 202 by referring to the position indicated by an output from the encoder 204 so as to perform focusing. A diaphragm control circuit 206 controls a diaphragm 205 under the control of the lens microcomputer 201.

The strobe 300 includes a body 300a removably mounted on the camera 100, and a movable unit 300b held on the body 300a in a manner rotatable in the vertical direction and a lateral direction with respect to the body. Note that in the following description, the direction of rotation of the movable unit 300b is described assuming that a portion of the body 300a on which the movable unit 300b is mounted is an upper portion.

The strobe 300 includes the microcomputer (FPU: strobe microcomputer) 310. The strobe microcomputer 310 controls the overall operation of the strobe 300. The strobe microcomputer 310 is implemented e.g. by a microcomputer-incorporated one-chip IC circuit which includes a CPU, a ROM, a RAM, an input/output control circuit, a multiplexer, a timer circuit, an EEPROM, an analog-to-digital converter, and a digital-to-analog converter.

A battery 301 is a power supply (VBAT) for the strobe. A boosting circuit 302 includes a boosting section 302a, resistors 302b and 302c used for detecting voltage, and a main capacitor 302d. The boosting circuit 302 boosts the voltage of the battery 301 up to several hundred volts by the boosting section 302a, to thereby accumulate electric energy for light emission in the main capacitor 302d. The charge voltage of the main capacitor 302d is divided by the resistors 302b and 302c, and the divided voltage is input to an analog-to-digital converter terminal of the strobe microcomputer 310.

A discharge tube 305 has pulse voltage of several kilovolts applied thereto from a trigger circuit 303, whereby it is excited by an energy charged in the main capacitor 302d to emit light. The light from the discharge tube 305 is irradiated to an object or the like. A light emission control circuit 304 controls the trigger circuit 303, and controls the start and stop of light emission from the discharge tube 305.

A ranging unit 308 detects a distance to a target object by a known method. The ranging unit 308 includes e.g. a light receiving sensor, and receives light irradiated from the discharge tube 305 and reflected by the target object, using the light receiving sensor, to thereby detect the distance to the target object based on a time period taken after the emission of light until the receipt of the reflected light. The ranging unit 308 may be configured to include a ranging light source and receive light irradiated from the ranging light source and reflected by a target object using the light receiving sensor, to thereby detect a distance to the target object based on a time period taken after the irradiation of the light until the receipt of the reflected light.

A photodiode 314 receives light emitted from the discharge tube 305, and outputs a detection output (electric current) corresponding to the amount of light emission from the discharge tube 305. The photodiode 314 receives the light emitted from the discharge tube 305 directly or e.g. via a glass fiber. An integration circuit 309 integrates the electric current output from the photodiode 314. An output (integration output) from the integration circuit 309 is input to an inverting input terminal of a comparator 315 and the analog-to-digital converter terminal of the strobe microcomputer 310.

A non-inverting input terminal of the comparator 315 is connected to a digital-to-analog converter output terminal of the strobe microcomputer 310, and an output terminal of the comparator 315 is connected to one of input terminals of an AND gate 311. The other of the input terminals of the AND gate 311 is connected to a light emission control terminal of the strobe microcomputer 310, and an output terminal of the AND gate 311 is connected to the light emission control circuit 304.

The strobe 300 includes a reflection umbrella 306 and a zoom optical system 307. The reflection umbrella 306 reflects light emitted from the discharge tube 305, and guides the light in a predetermined direction. The zoom optical system 307 is comprised of an optical panel, and changes an irradiation angle of light from the strobe 300. By changing a relative position between the zoom optical system 307 and the discharge tube 305, it is possible to change a guide number and the irradiation range of the strobe 300.

That is, a light emission section of the strobe 300 is comprised of the discharge tube 305, the reflection umbrella 306, and the zoom optical system 307. The irradiation range of light from the light emission section is changed by the movement of the zoom optical system 307, and the direction of irradiating light from the light emission section is changed by the rotation of the movable unit 300b.

An input section 312 includes an operation section comprised of a power switch, a mode setting switch for setting an operation mode of the strobe 300, and setting buttons for setting various parameters. Further, the strobe microcomputer 310 performs various processes in response to inputs to the input section 312. Information indicative of the state of the strobe 300 is displayed on a display section 313. The display section 313 is provided with a liquid crystal device and a light emitting element.

A zoom driving circuit 330 includes a zoom detection section 330a and a zoom driving section 330b. The zoom detection section 330a detects the relative position between the zoom optical system 307 and the discharge tube 305 by an encoder or the like. The zoom driving section 330b moves the zoom optical system 307 using a motor. The strobe microcomputer 310 acquires a focal length from the lens microcomputer 201 via the camera microcomputer 101, and determines a driving amount of the zoom optical system 307 according to the focal length.

A bounce circuit 340 includes a bounce H detection section 340a, a bounce V detection section 340c, a bounce H driving section 340b, and a bounce V driving section 340d. The bounce H detection section 340a detects a driving amount of the movable unit 300b in the lateral direction (horizontal direction) by a rotary encoder or an absolute encoder. The bounce V detection section 340c detects a driving amount of the movable unit 300b in the vertical direction by a rotary encoder or an absolute encoder.

The bounce H driving section 340b drives the movable unit 300b in the lateral direction using a motor, not shown. The bounce V driving section 340d drives the movable unit 300b in the vertical direction using a motor, not shown.

Here, a posture detection circuit 360 of the strobe 300 has the same construction and functions as those of the posture detection circuit 140 of the camera 300 and is a circuit for detecting the posture information of the strobe 300. The posture detection circuit 360 includes a posture H detection section 360a, a posture V detection section 360b, and a posture Z detection section 360c. The posture H detection section 360a detects the posture information of the strobe 300 in a horizontal direction. The posture V detection section 360b detects the posture information of the strobe 300 in a vertical direction. The posture Z detection section 360c detects the posture information of the strobe 300 in a front-rear direction (Z direction). Note that the posture detection circuit 360 is implemented e.g. by an angular velocity sensor or a gyro sensor. Further, posture information on the posture of the strobe in each direction, detected by the posture detection circuit 360, is input to the strobe microcomputer 310.

Here, a description will be given of an example of a range of the rotation of the movable unit 300b of the strobe 300 appearing in FIG. 2.

Figure 4A:
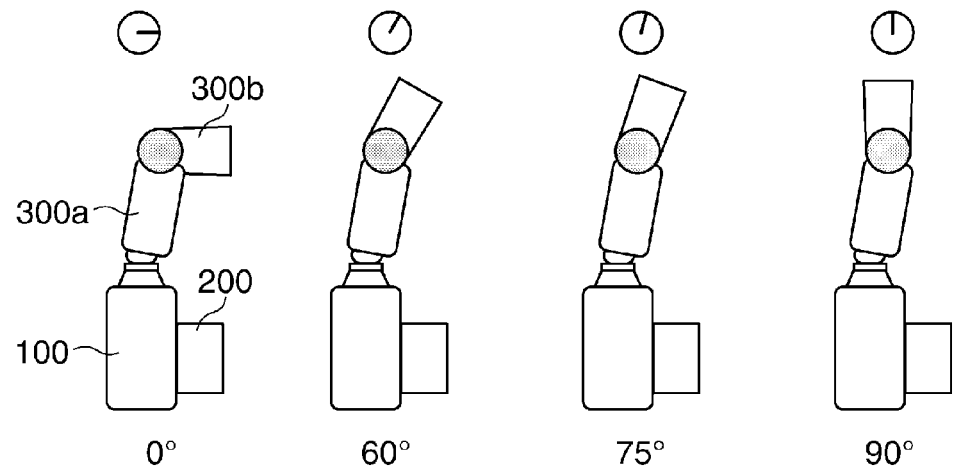
Figure 4B:
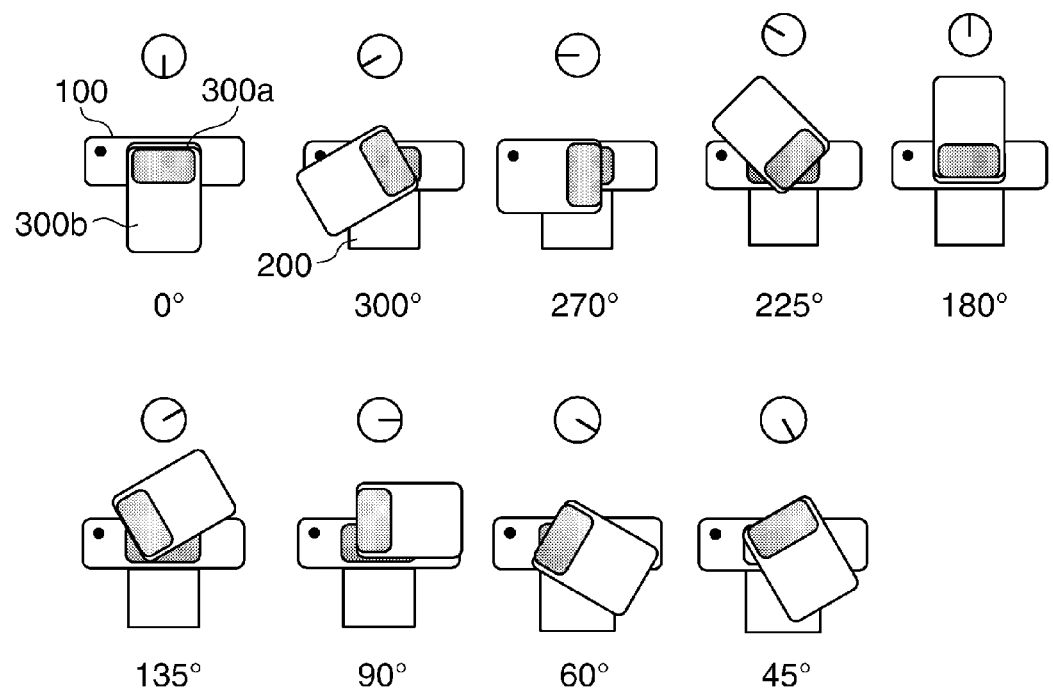

FIGS. 4A and 4B are diagrams useful in explaining the rotation of the movable unit 300b of the strobe 300 appearing in FIG. 2 in the vertical direction and the rotation thereof in the lateral direction, in which FIG. 4A shows the rotation in the vertical direction, and FIG. 4B shows the rotation in the lateral direction.

As shown FIG. 4A, the movable unit 300b is held on the body 300a such that it can be rotated in the vertical direction with respect to the body 300a. Further, as shown FIG. 4B, the movable unit 300b is held on the body 300a such that it can be rotated in the lateral direction with respect to the body 300a. Note that a reference position of the movable unit 300b is set to a 0-degree state of the position of the movable unit 300b in the vertical direction, out of states shown in FIG. 4A, and at the same time to a 0-degree state of the position of the movable unit 300b in the lateral direction, out of states shown in FIG. 4B. Further, an indicator, which is expressed in a circle and a line, appearing above each of the illustrated states of the position of the movable unit 300b in FIGS. 4A and 4B correspond to a position of an associated one of the rotary encoders, described hereinafter.

Figure 5A:
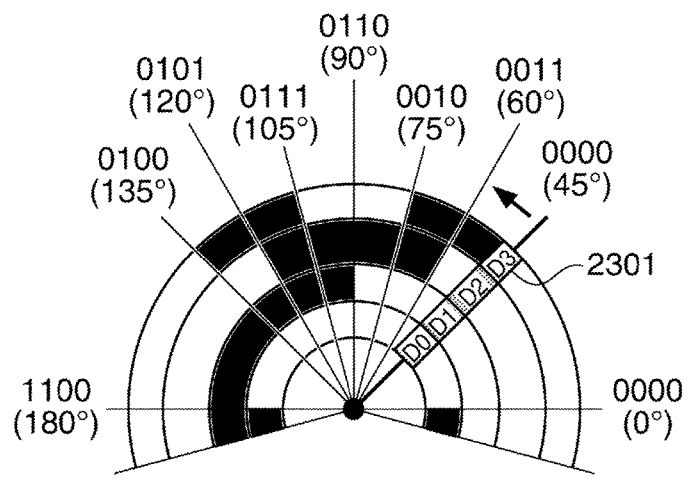
Figure 5B:
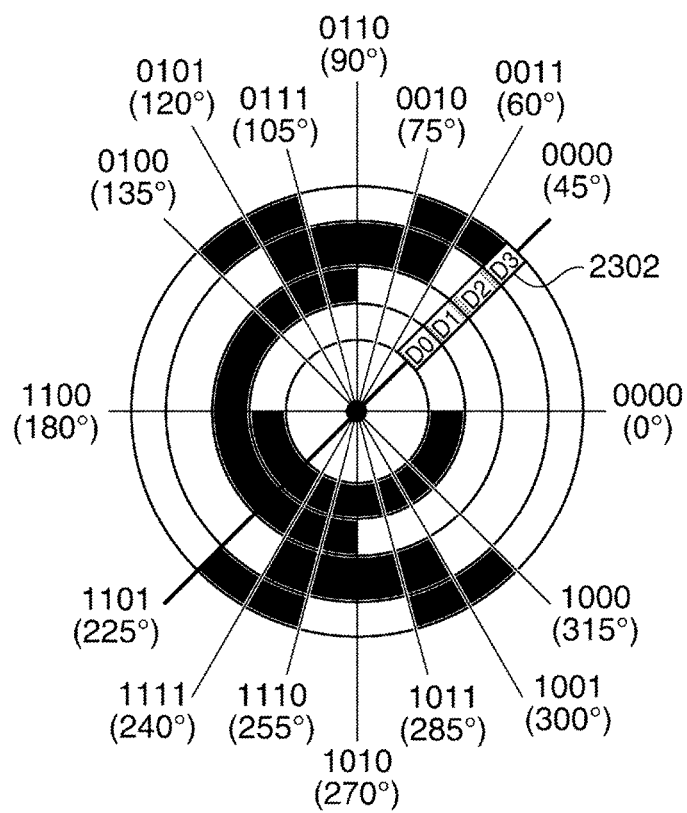

FIGS. 5A and 5B are diagrams useful in explaining outputs from the rotary encoders dependent on the respective rotations of the movable unit 300b appearing in FIG. 2 in the vertical and lateral directions, in which FIG. 5A illustrates detection of a rotational angle of the movable unit 300b in the vertical direction, and FIG. 5B illustrates detection of a rotational angle of the movable unit 300b in the lateral direction.

FIG. 5A shows a configuration for detecting the rotational angle of the movable unit 300b in the vertical direction, using a rotary encoder which uses a 4-bit Gray code. Further, FIG. 5B shows a configuration for detecting the rotational angle of the movable unit 300b in the lateral direction, using a rotary encoder which uses the 4-bit Gray code. Note that detecting sections of the rotary encoder for detecting the rotation of the movable unit 300b in the vertical direction and the rotary encoder for detecting the rotation of the movable unit 300b in the lateral direction each have a known configuration using e.g. a photo reflector and a photo interrupter. Further, in the illustrated examples, it is assumed that outputs from the rotary encoders associated with white portions appearing in FIGS. 5A and 5B are 0, and outputs from the same associated with black portions appearing in FIGS. 5A and 5B are 1. Further, it is assumed that when the movable unit 300b is rotated, at the rise of change in bits, determination of the rotation is performed, and when the movable unit 300b is stopped, pattern data is read in.

FIGS. 6A and 6B are diagrams useful in explaining correspondence between Gray codes of the rotary encoders and the rotational angles shown in FIGS. 5A and 5B, in which FIG. 6A shows a correspondence between Gray codes and the rotational angles in the vertical direction, and FIG. 6B shows a correspondence between Gray codes and the rotational angles in the lateral direction.

As shown in FIGS. 6A and 6B, the rotary encoder outputs detection signals different from each other according to the rotational angles of the movable unit 300b. This enables the bounce H detection section 340a and the bounce V detection section 340c to detect driving amounts (i.e. rotational angles) of the movable unit 300b.

Figure 7A:
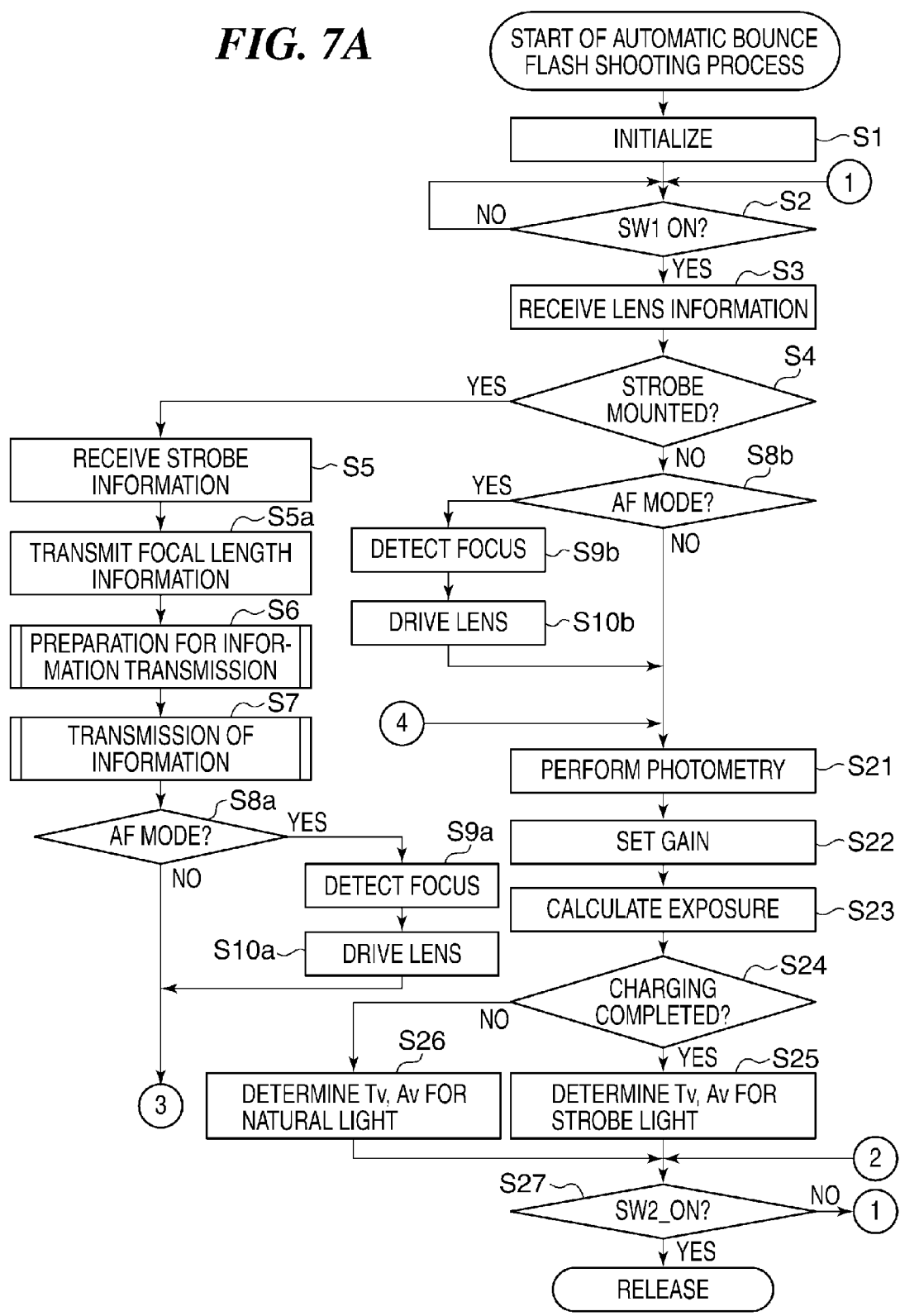
FIG. 7A is a flowchart of an automatic bounce flash shooting process performed by the digital camera.
Figure 7B:
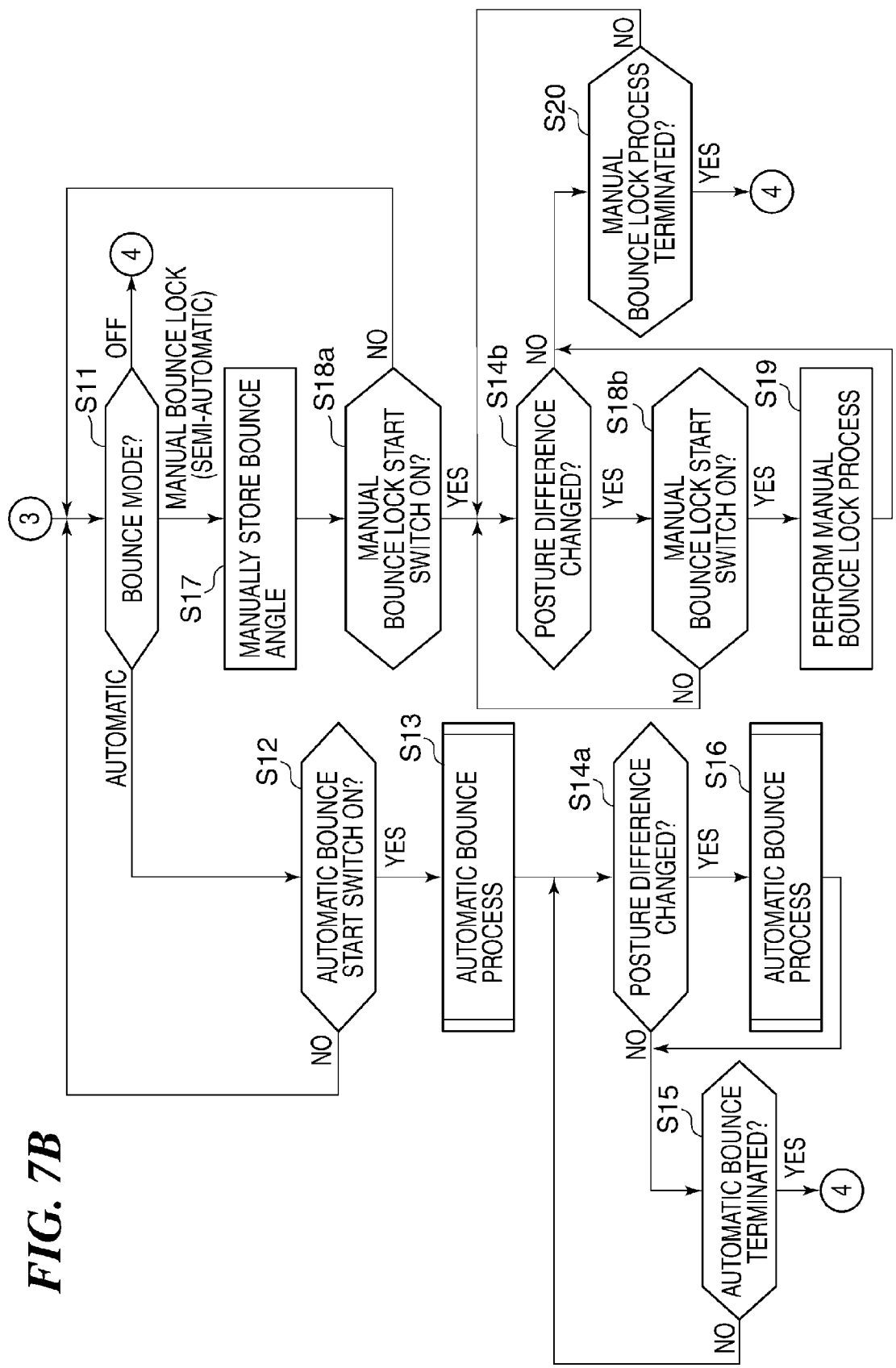
FIG. 7B is a continuation of FIG. 7A.

FIGS. 7A and 7B are flowcharts of an automatic bounce flash shooting process performed by the camera appearing in FIGS. 1 and 2.

When the power switch provided in the input section 112 is turned on to make the camera microcomputer 101 operable, the camera microcomputer 101 starts the automatic bounce flash shooting process shown in FIGS. 7A and 7B.

First, the camera microcomputer 101 initializes a built-in memory and ports (none of which are shown) (step S1). Further, the camera microcomputer 101 reads the states of the switches provided in the input section 112 and input information set in advance to thereby makes settings of a shooting mode concerning a shutter speed determination method, an aperture determination method and so forth.

Then, the camera microcomputer 101 determines whether or not the first release switch SW1 has been turned on by operation of the release switch provided in the input section 112 (step S2). If the first release switch SW1 is off (NO to the step S2), the camera microcomputer 101 waits, whereas if the first release switch SW1 is on (YES to the step S2), the camera microcomputer 101 performs communication with the lens microcomputer 201 via the communication line SC. Then, the camera microcomputer 101 acquires focal length information and optical information required for focusing and photometry as lens information (step S3).

Next, the camera microcomputer 101 determines whether or not the strobe 300 is mounted on the camera 100 (step S4). If the strobe 300 is mounted on the camera 100 (YES to the step S4), the camera microcomputer 101 performs communication with the strobe microcomputer 310 via the communication line SC. Then, the camera microcomputer 101 acquires strobe information, such as a strobe ID and charge information indicative of the charged state of the main capacitor 302d, from the strobe microcomputer 310 (step S5). Further, the camera microcomputer 101 performs communication with the strobe microcomputer 310 via the communication line SC, and transmits the focal length information obtained in the step S3 to the strobe microcomputer 310 (step S5a).

With this, the strobe microcomputer 310 determines the driving amount of the zoom optical system 307 based on the received focal length information. Then, the strobe microcomputer 310 moves the zoom optical system 307 based on the driving amount, to thereby adjust the irradiation range of the strobe 300 to the focal distance.

Next, the camera microcomputer 101 prepares for transmitting information concerning the strobe 300 input by the input section 112, to the strobe microcomputer 310 (step S6). Here, the camera microcomputer 101 converts the information concerning the strobe 300 to a command transmission format. Processing (information transmission preparation process) in the step S6 will be described hereinafter.

Then, the camera microcomputer 101 transmits the information concerning the strobe 300 prepared in the step S6 to the strobe 300 (step S7), as described hereinafter. Then, the camera microcomputer 101 determines whether or not a set focusing mode is an automatic focusing (AF) mode (step S8a).

If the set focusing mode is the automatic focusing mode (YES to the step S8a), the camera microcomputer 101 controls the focus detection circuit 107 to thereby detect a focus by a known phase difference detection method (step S9a). In doing this, the camera microcomputer 101 determines a ranging point to which the lens group 202 is to be focused on in the focusing, from a plurality of ranging points, based on a known automatic selection algorithm which gives priority to a closer point, or according to a user's operation. Then, the camera microcomputer 101 stores the ranging point determined in the step S9a in the RAM incorporated in the camera microcomputer 101.

Next, the camera microcomputer 101 determines the driving amount of the lens group 202 based on focus information obtained from the focus detection circuit 107. Then, the camera microcomputer 101 performs communication with the lens microcomputer 201 via the communication line SC, and drives the lens group 202 based on the lens driving amount (step S10a).

Next, the camera microcomputer 101 reads a bounce mode of the strobe 300 from the strobe microcomputer 310. The bounce mode includes an automatic bounce mode (first mode) and a manual bounce lock mode (second mode). Then, the camera microcomputer 101 determines which of auto (automatic bounce mode), manual bounce lock (manual bounce lock (semi-automatic) mode), and off, is set as the bounce mode (step S11). Note that whether or not to perform the automatic bounce is determined, for example, by an automatic bounce switch provided in the input section 312.

If the bounce mode is the automatic bounce mode ("auto" in the step S11), the camera microcomputer 101 determines whether or not an automatic bounce start switch has been turned on (step S12). If the start switch is off (NO to the step S12), the camera microcomputer 101 returns to the step S11.

If the start switch is on (YES to the step S12), the camera microcomputer 101 performs processing associated with an automatic bounce operation (hereinafter referred to as the "automatic bounce process"), described hereinafter (step S13). After execution of the automatic bounce process, the camera microcomputer 101 determines, based on a result of detection by the posture detection circuit 140 or the posture detection circuit 360, whether or not the amount of change in the posture of the camera is not smaller than a predetermined threshold value (step S14*a*). Here, the camera microcomputer 101 determines whether or not a difference between the immediately preceding result of detection of the posture and the latest result of detection of the posture is not smaller than the predetermined threshold value.

If the amount of change in the posture of the camera is smaller than the predetermined threshold value (NO to the step S14*a*), the camera microcomputer 101 determines whether or not the automatic bounce has been terminated (step S15). If the automatic bounce has not been terminated (NO to the step S15), the camera microcomputer 101 returns to the step S14*a*. On the other hand, if the automatic bounce has been terminated (YES to the step S15), the camera microcomputer 101 proceeds to a step S21, described hereinafter.

If the amount of change in the posture of the camera is not smaller than the predetermined threshold value (YES to the step S14*a*), the camera microcomputer 101 performs the automatic bounce process for calculating the rotational angles of the movable unit 300*b*, again (step S16). Here, the camera microcomputer 101 determines, based on a changed posture of the camera, rotational angles of the movable unit 300*b* which make the direction of irradiating strobe light unchanged from the direction before the change in the posture. Then, the camera microcomputer 101 transmits angle information indicative of the rotational angles to the strobe microcomputer 310. The strobe microcomputer 310 drives the movable unit 300*b* based on the angle information, whereafter the camera microcomputer 101 proceeds to the step S15.

As described above, in a case where the amount of change in the posture of the camera is not smaller than the predetermined threshold value, i.e. in a case where the posture of the camera is largely changed, the above-described processing is performed, because the irradiating direction is largely changed if the movable unit 300*b* remains in a state in which the rotational angles thereof with respect to the body 300*a* are fixed.

FIGS. 8A and 8B are diagrams useful in explaining a change in the irradiating direction, caused by the posture of the camera, in which FIG. 8A shows a state in which the camera is in a landscape orientation, and FIG. 8B shows a state in which the camera is in a portrait orientation.

In a state shown in FIG. 8A, the camera 100 is set to a posture in which a portion thereof on which the strobe 300 is mounted is oriented toward a ceiling (camera in the landscape orientation). Further, in a state shown in FIG. 8B, the camera 100 is set to a posture in which the portion thereof on which the strobe 300 is mounted is oriented in a horizontal direction (camera in the portrait orientation).

In a case where the posture of the camera 100 is changed from a state shown in FIG. 8A in which the irradiating direction is set with the rotational angles of the movable unit 300*b* being fixed (bounce lock) to a state shown in FIG. 8B, the direction of light irradiation from the strobe 300 is largely changed due to the fixed state of the rotational angles. Therefore, when the posture of the camera 100 is changed in the bounce lock, the process for calculating the rotational angles is performed again so as to cause the strobe light to be irradiated in the set irradiating direction.

For example, let it be assumed that in the posture of the camera appearing in FIG. 8A, the rotational angle of the movable unit 300*b* is 90 degrees in the vertical direction of the camera appearing in FIG. 4A. In this case, in the posture appearing in FIG. 8B, by setting the rotational angle of the movable unit 300*b* to 270 degrees in the lateral direction of the camera appearing in FIG. 4B, it is possible to set the irradiating direction to the same direction as in FIG. 4A.

As described above, when in the automatic bounce mode, depending on the condition that the amount of change in the posture of the camera 100 is not smaller than the predetermined threshold value, bounce driving is continuously repeated.

If the bounce mode is the manual bounce lock mode ("manual bounce lock" in the step S11), the camera microcomputer 101 manually stores a changed bounce angle in a built-in RAM by a user's operation of a storage button, not shown (step S17). Note that the storage button is provided in the input section 112 or 312, and the bounce angle at a stop position of the movable unit 320 is stored by a user's operation of the storage button.

Then, the camera microcomputer 101 determines whether or not a manual bounce lock start switch has been turned on (step S18*a*). If the start switch is off (NO to the step S18*a*), the camera microcomputer 101 returns to the step S11. On the other hand, if the start switch is on (YES to the step S18*a*), the camera microcomputer 101 performs processing associated with a manual bounce lock operation (hereinafter referred to as the "manual bounce lock process"). Then, the camera microcomputer 101 determines, instead of determining the bounce angle, whether or not the amount of change in the posture of the camera (the difference between the immediately preceding result of detection of the posture and the latest result of detection of the posture) is not smaller than the predetermined threshold value, based on a result of detection by the posture detection circuit 140 or the posture detection circuit 360 (step S14*b*).

If the amount of change in the posture is not smaller than the predetermined threshold value (YES to the step S14*b*), similar to the step 18*a*, the camera microcomputer 101 determines whether or not the manual bounce lock start switch is on (continues to be on) (step S18*b*).

If the start switch is off (NO to the step S18*b*), the camera microcomputer 101 returns to the step S14*b*. On the other hand, if the start switch is on (YES to the step S18*b*), the camera microcomputer 101 performs the manual bounce lock process (step S19). Here, the camera microcomputer 101 determines, based on a changed posture of the camera, rotational angles of the movable unit 300*b* which make the direction of irradiating strobe light unchanged from the direction before the change in the posture.

Note that when the manual bounce lock start switch is not turned on, the bounce operation is not performed even when the posture of the camera is changed.

The camera microcomputer 101 transmits the angle information indicative of the rotational angles of the movable unit 300*b* to the strobe microcomputer 310. The strobe microcomputer 310 drives the movable unit 300*b* based on the angle information.

After execution of the step S19, the camera microcomputer 101 determines whether or not the manual bounce lock operation has been terminated (step S20). Here, for example, when a built-in timer counts a predetermined time period, the camera microcomputer 101 determines that the manual bounce lock operation has been terminated. Note that the camera microcomputer 101 may be configured to determine that the manual bounce lock operation has been terminated when a termination button, not shown, is operated.

If the manual bounce lock operation has not been terminated (NO to the step S20), the camera microcomputer 101 returns to the step S14*b*. whereas if the manual bounce lock operation has been terminated (YES to the step S20), the camera microcomputer 101 proceeds to the step S21, described hereinafter. If the amount of change in the posture of the camera is smaller than the predetermined threshold value (NO to the step S14*b*), the camera microcomputer 101 also proceeds to the step S20.

Note that the steps S18*a* and S18*b* are executed only in a case where the first release switch SW1 is on. That is, even when the posture of the camera is largely changed during the manual bounce lock operation, if the first release switch SW1 is off, resetting of the irradiating direction and re-driving of the movable unit 300*b* are not performed. As described above, by inhibiting the resetting of the irradiating direction and the re-driving of the movable unit 3000*b* from being performed depending on the state of zhe first release switch SW1, it is possible to drive the movable unit 300*b* in correct timing.

If the strobe 300 is not mounted (NO to the step S4), the camera microcomputer 101 determines whether or not the focusing mode is the AF mode (step S8*b*). If the focusing mode is the AF mode (YES to the step S8*b*), the camera microcomputer 101 executes the same processing as in the step S9*a* (step S9*b*), and executes the same processing as in the step S10*a* (step S10*b*). Then, the camera microcomputer 101 perform photometry using the photometric circuit 106, and obtains results of the photometry (step S21). If the bounce mode is off ("OFF" in the step S11), the camera microcomputer 101 also proceeds to the step S21. Further, if the focusing mode is not the AF mode, i.e. if the focusing is a manual focusing (MF) mode (NO to the step S8*b*), the camera microcomputer 101 directly proceeds to the step S21.

In the step S21, for example, in a case where the photometric sensor performs photometry in each of six areas formed by dividing a shooting range, the camera microcomputer 101 stores luminance values of the respective areas as results of the photometry, i.e. as EVb(i) (i=0 to 5) in the built-in RAM.

Then, the camera microcomputer 101 performs gain switching by the gain switching circuit 108 according to a gain setting input from the input section 112 (step S22). Note that the gain setting is an ISO sensitivity setting, for example. Further, the camera microcomputer 101 performs communication with the strobe microcomputer 310 via the communication line SC, to thereby transmit gain setting information indicative of a switched gain, for example, to the strobe microcomputer 310.

Next, the camera microcomputer 101 determines an exposure value (EVs) using a known algorithm based on the results of the photometry (the luminance values of the respective areas stored in the built-in RAM) (step S23: exposure calculation). Then, the camera microcomputer 101 determines whether or not a charging completion signal has been received from the strobe microcomputer 310 (step S24). If the charging completion signal has been received (YES to the step S24), the camera microcomputer 101 determines exposure control values (a shutter speed (Tv) and a aperture value (Av)) suitable for flash shooting based on the exposure value (step S25). On the other hand, if the charging completion signal has not been received (NO to the step S24), the camera microcomputer 101 determines the exposure control values suitable for shooting in which the strobe 300 is inhibited from emitting light (no flash shooting) based on the exposure value (step S26).

After execution of the step S25 or S26, the camera microcomputer 101 determines whether or not the second release switch SW2 has been turned on by operating the release switch provided in the input section 112 (step S27). If the second release switch SW2 is on (YES to the step S27), the camera microcomputer 101 proceeds to a release process, described hereinafter, whereas if the second release switch SW2 is off (NO to the step S27), the camera microcomputer 101 returns to the step S2.

Figure 9:
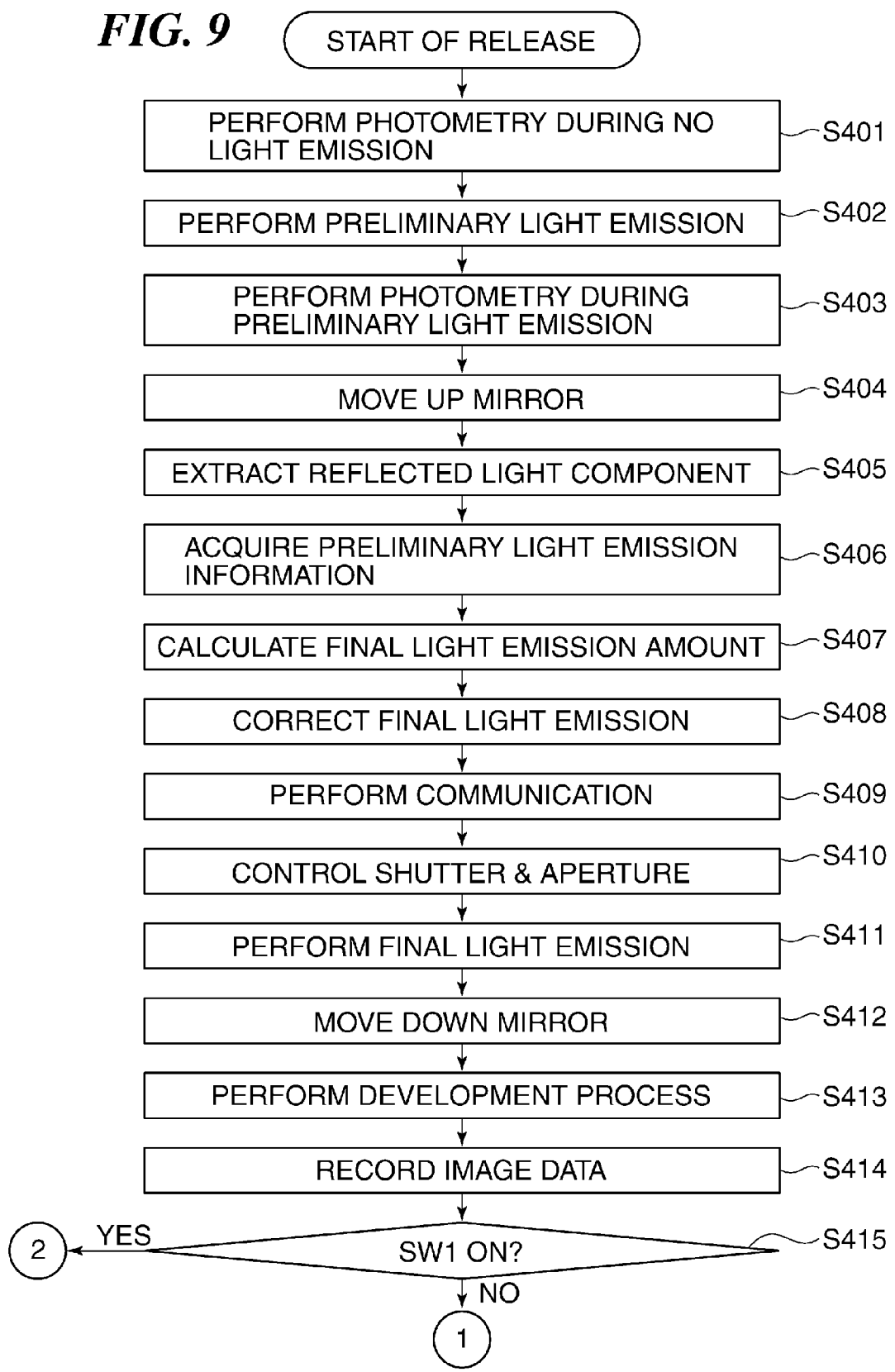
FIG. 9 is a flowchart of a process performed by the digital camera after the start of release.

FIG. 9 is a flowchart of a process performed by the camera appearing in FIGS. 1 and 2 after the start of release. Note that the illustrated process performed after the start of the release is a process concerning flash shooting, and a process for performing final light emission is omitted in a process concerning no flash shooting.

First, the camera microcomputer 101 performs photometry using the photometric circuit 106 in a state in which the strobe 300 is not emitting light, and obtains results of the photometry determined when light is not emitted (no flashing luminance values) (step S401: external light luminance photometry). At this time, the photometric circuit 106 stores the no flashing luminance values of the respective areas obtained by the photometry, as EVa(i) (i=0 to 5) in the built-in RAM. Then, the camera microcomputer 101 sends a command to the strobe microcomputer 310 for performing preliminary light emission, via the communication line SC (step S402). In response to the preliminary light emission command, the strobe microcomputer 310 controls the trigger circuit 303 and the light emission control circuit 304 to perform preliminary light emission with a predetermined amount of light.

Then, the camera microcomputer 101 performs photometry using the photometric circuit 106 in a state in which the preliminary light emission is being performed, and obtains results of the photometry at the time of preliminary light emission (preliminary light emission luminance values) (step S403). At this time, the photometric circuit 106 stores the preliminary light emission luminance values of the respective areas obtained by the photometry, as EVf(i) (i=0 to 5) in the built-in RAM.

Next, the camera microcomputer 101 moves up the main mirror 104 before executing exposure to cause the main mirror 104 to be retracted from a shooting optical path (step S404). Then, the camera microcomputer 101 extracts a luminance value EVdf(i) of only a reflected light component of the preliminary light emission (preliminary light emission component) based on the no flashing luminance values and the preliminary light emission luminance values using the following formula (1) (step S405):

$$EVdf(i) \leftarrow (LN_2(2^{EVf(i)} - 2^{EVa(i)})) \quad (1)$$

Note that the extraction is performed on each of the six areas.

Then, the camera microcomputer 101 acquires preliminary light emission information (preliminary light emission data: Qpre) indicative of the amount of light emitted at the preliminary light emission time from the strobe microcomputer 310 via the communication line SC (step S406). The camera microcomputer 101 selects one of the six areas which includes an object toward which an appropriate amount of light is to be emitted and determines a final light emission amount, based on the ranging point, the focal length information, the preliminary light emission information (Qpre), and bounce communication information (step S407).

In determining the final light emission amount, the camera microcomputer 101 determines a relative ratio of the final light emission amount, which is an amount of light to be emitted toward the object in the selected area (P), using the following format (2). Here, the camera microcomputer 101 determines a relative ratio (r) of an appropriate final light emission amount to a preliminary light emission amount, based on the exposure value (EVs), the object luminance value (EVb), and a luminance value EVdf(p) of only the reflected light component of the preliminary light emission.

$$r \leftarrow LN_2(2^{EVa} - 2^{EVb(p)}) - EVdf(p) \quad (2)$$

Here, a difference between the exposure value (EVs) and an expanded object luminance value (EVb) is determined, so as to control strobe light such that the exposure at the time of strobe light emission becomes appropriate by a combination of the strobe light and external light.

When there is a highly reflective object (e.g. a golden folding screen) in an image pickup screen, the reflected light component of the preliminary light emission sometimes becomes larger to make the final light emission amount smaller. To prevent such a problem, there has been known correction processing for making the final light emission amount larger when a highly reflective object is detected in the image pickup screen. On the other hand, in a case where bounce flash shooting is performed, detection of a highly reflective object is not performed, and the above-mentioned correction processing is not performed. That is, in the bounce flash shooting, since strobe light is not directly emitted even when there is a highly reflective object in the image pickup screen, the highly reflective object has less influence on the reflected light component of the preliminary light emission. Therefore, detection of a highly reflective object is not performed. Besides, in the bounce flash shooting, correction of the final light emission amount in accordance with the position of an object in the image pickup screen is not performed, either.

As described above, in the bounce flash shooting, correction of the final light emission amount in accordance with the reflectivity, position, and the like of an object existing in the image pickup screen is not performed, though such correction is performed in normal flash shooting. This makes it possible to determine the final light emission amount suitable for the bounce flash shooting. Note that the normal flash shooting refers to flash shooting performed by positioning the movable unit 300b at the reference position appearing in FIGS. 4A and 4B.

The camera microcomputer 101 determines a new relative ratio, by the following formula (3). Here, the camera microcomputer 101 corrects the relative ratio (r) using a shutter speed (Tv) in the flash shooting, a light emission time period (t_pre) of the preliminary light emission, and a correction coefficient (c) set in advance, to thereby determine the new relative ratio r (step S408).

$$r \leftarrow r + Tv - t\_pre + c \quad (3)$$

Here, when the correction is performed using the shutter speed (Tv) and the light emission time period (t_pre) of the preliminary light emission, it is possible to properly compare a photometric integrated value (INTp) in the preliminary light emission and a photometric integrated value (INTm) in the final light emission.

Then, the camera microcomputer 101 transmits information on the relative ratio (r) for determining the final light emission amount to the strobe microcomputer 310 via the communication line SC (step S409). Then, the camera microcomputer 101 sends a command to the lens microcomputer 201 such that the diaphragm 205 is controlled to the aperture value (Av) determined in the step S25, and controls the shutter 103 to operate at the shutter speed (Tv) determined in the step S25 (step S410).

Next, the camera microcomputer 101 sends a command to the strobe microcomputer 310 via the communication line SC for performing final light emission (step S411). In response to the command, the strobe microcomputer 310 performs the final light emission based on the relative ratio (r) transmitted from the camera.

After terminating a series of exposure operations described above, the camera microcomputer 101 moves down the main mirror 104 which has been retracted from the shooting optical path, to obliquely set the same in the shooting optical path again (step S412). Then, the camera microcomputer 101 amplifies the outputs from the image pickup device 102 by the gain set by the gain switching circuit 108, and converts the amplified outputs to digital signals by the analog-to-digital converter 109. Then, the camera microcomputer 101 performs predetermined signal processing (development processing), such as white balance processing, on the digital signals (image data) by the signal processing circuit 111 (step S413). Then, the camera microcomputer 101 records the image data having been subjected to the signal processing in the memory (not shown) (step S414), and terminates a series of processing concerning shooting.

Then, the camera microcomputer 101 determines whether or not the first release switch SW1 is on (step S415). If the first release switch SW1 is on (YES to the step S415), the camera microcomputer 101 returns to the step S27 appearing in FIGS. 7A and 7B, whereas if the first release switch SW1 is off (NO to the step S415), the camera microcomputer 101 returns to the step S2 appearing in FIG. 7A.

Figure 10A:
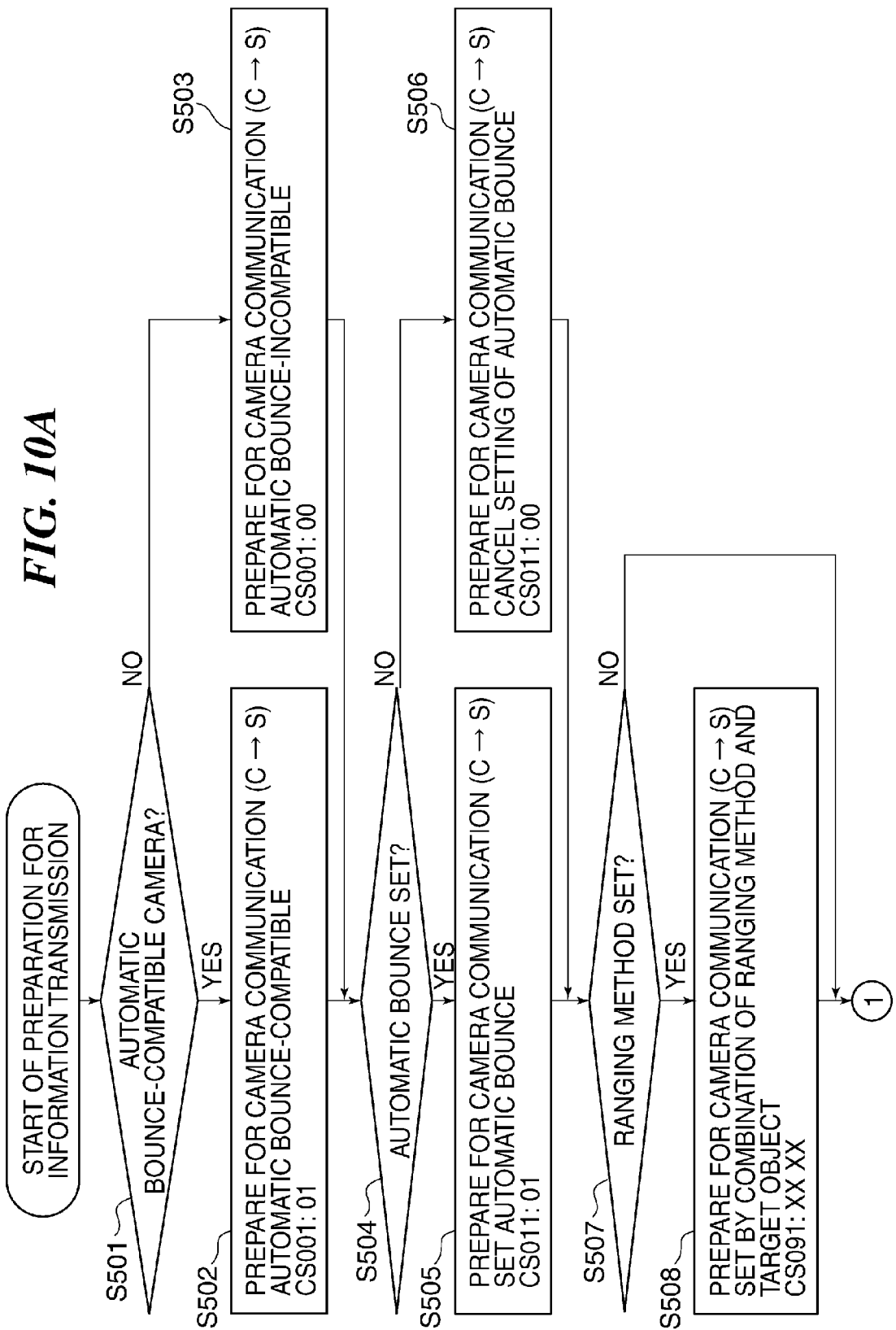
FIG. 10A is a flowchart of an information transmission preparation process performed in a step in FIG. 7A.
Figure 10B:
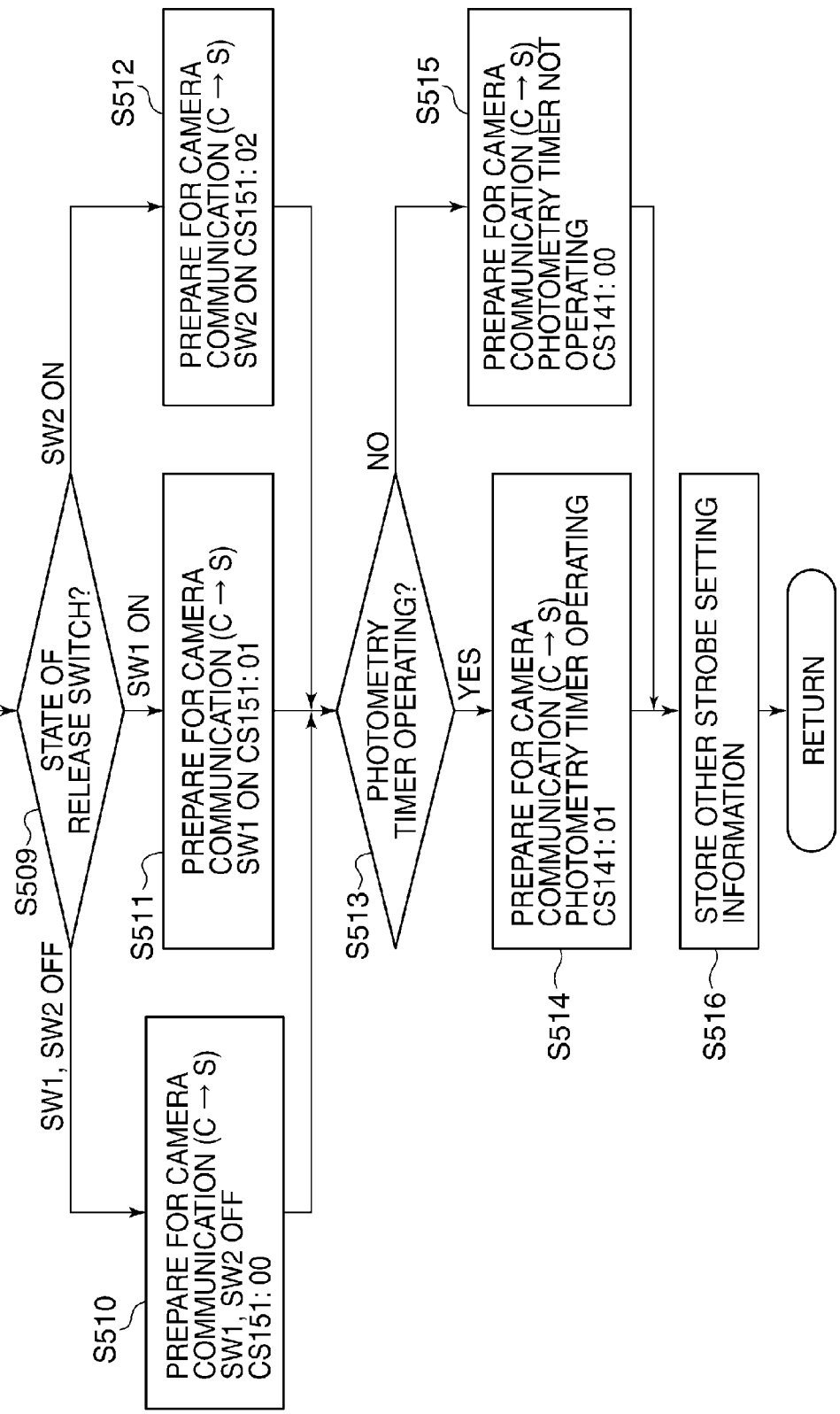
FIG. 10B is a continuation of FIG. 10A.

FIGS. 10A and 10B are a flowchart of the information transmission preparation process performed in the step S6 shown in FIG. 7A. Further, FIGS. 11A and 11B are diagrams showing examples of the command list used in the communication between the camera and the strobe.

In the information transmission preparation process, first, the camera microcomputer 101 determines whether or not the camera is a camera capable of performing the automatic bounce operation (compatible camera) (step S501). If the camera is a compatible camera (YES to the step S501), the camera microcomputer 101 stores a "CS001 command: 01" in the built-in memory (not shown) in preparation for camera-strobe communication (C→S) (step S502), whereas if not (NO to the step S501), the camera microcomputer 101 stores a "CS001 command: 00" in the built-in memory in preparation for the camera-strobe communication (C→S) (step S503).

After execution of the step S502 or S503, the camera microcomputer 101 determines whether or not the automatic bounce operation is set (step S504). If the automatic bounce operation is set (YES to the step S504), the camera microcomputer 101 stores a "CS011 command: 01" in the built-in memory in preparation for the camera-strobe communication (C→S) (step S505), whereas if not (NO to the step S504), the camera microcomputer 101 stores a "CS011 command: 00" in the built-in memory in preparation for the camera-strobe communication (C→S) (step S506).

After execution of the step S505 or S506, the camera microcomputer 101 determines whether or not there is set a method (ranging method) for determining a distance to a target object (reflection object), which is information for determining an optimum irradiating direction for the bounce flash shooting (step S507). Note that the term "target object" is intended to mean a reflection object (a ceiling, a wall, etc.) which reflects strobe light in the bounce flash shooting. Further, as the ranging method, there may be mentioned e.g. a so-called preliminary light emission method which performs preliminary light emission toward a target object, and measures a distance to the target object by the amount of light reflected therefrom. Further, there is a so-called strobe ranging method which measures a distance to a target object, using the ranging unit 308 provided in the strobe 300. Besides, there is a so-called camera ranging method which measures a distance to a target object using a result of focusing.

If the ranging method is set (YES to the step S507), the camera microcomputer 101 stores a CS091 command in the built-in memory according to the setting of the ranging method in preparation for the camera-strobe communication (C→S) (step S508). Here, the camera microcomputer 101 assigns a distinction between "object" and "ceiling" to most significant 4 bits, with "object" set to 0 and "ceiling" set to 1 as shown in the box of a data item for a command number 091 of the command list in FIG. 11B. Further, the camera microcomputer 101 assigns a distinction between "preliminary light emission", "strobe ranging", and "camera ranging" to least significant 4 bits, with "preliminary light emission" set to 0, "strobe ranging" set to 1, and "camera ranging" set to 2 as shown in the box of a data item for a command number 091 of the command list in FIG. 11B. The most significant 4 bits (expressed in the first digit in the illustrated example) and the least significant 4 bits (expressed in the second digit in the illustrated example) are combined to form e.g. "00" which represents "object" and "preliminary light emission". Assuming that the object and the ceiling are both set to "preliminary light emission", "CS091 command: data 00 10" is stored in the built-in memory. Similarly, assuming that the object and the ceiling are both set to "strobe ranging", a "CS091 command: data 01 11" is stored in the built-in memory. Further, assuming that the object is set to "camera ranging", and the ceiling is set to "preliminary light emission", a "CS091 command: data 02 10" is stored in the built-in memory.

Then, the camera microcomputer 101 determines the state of the release switch (step S509). If the ranging method is not set (NO to the step S507), the camera microcomputer 101 proceeds to the step S509.

If the SW1 and the SW2 are both off (SW1, SW2 OFF in the step S509), the camera microcomputer 101 stores a "CS151 command: data 00" in the built-in memory (step S510). If the SW1 is on (SW1 ON in the step S509), the camera microcomputer 101 stores a "CS151 command: data 01" in the built-in memory (step S511). Further, the SW2 is on (SW2 ON in the step S509), the camera microcomputer 101 stores a "CS151 command: data 02" in the built-in memory (step S512).

After execution of the step S510, S511, or S512, the camera microcomputer 101 determines whether or not a photometry timer, not shown, is in operation (step S513). The photometry timer is a timer for defining a time period over which photometry is to be performed, so as to switch the operation mode of the camera 100 to a power saving mode after performing the photometry for the time period thus defined. The photometry timer is provided in the camera microcomputer 101. For example, when the SW1 is turned on, the count of the photometry timer is started.

If the photometry timer is in operation (YES to the step S513), the camera microcomputer 101 stores a "CS141 command: data 01" in the built-in memory in preparation for the camera-strobe communication (C→S) (step S514). On the other hand, if the photometry timer is not in operation (NO to the step S513), the camera microcomputer 101 stores a "CS141 command: data 00" in the built-in memory in preparation for the camera-strobe communication (C→S) (step S515).

After execution of the step S514 or S515, the camera microcomputer 101 stores other strobe setting information in the built-in memory (step S516). Then, the camera microcomputer 101 proceeds to the step S7 appearing in FIG. 7A.

FIG. 12 is a flowchart of an information transmission process performed in the step S7 appearing in FIG. 7A. Note that in the information transmission process, the commands shown in FIGS. 11A and 11B are used as setting commands, and further the serial communication described with reference to FIGS. 3A to 3E is performed.

In the information transmission process, first, the camera microcomputer 101 transmits the data (information) set according to the result of the determination in the step S501 described with reference to FIG. 10A, to the strobe microcomputer 310 (step S601). Then, the camera microcomputer 101 transmits the data set according to the result of the determination in the step S504 to the strobe microcomputer 310 (step S602). Further, the camera microcomputer 101 transmits the data set according to the result of the determination in the step S507 to the strobe microcomputer 310 (step S603).

Furthermore, the camera microcomputer 101 transmits the data (release state) set according to the result of the determination in the step S509 to the strobe microcomputer 310 (step S604). Then, the camera microcomputer 101 transmits the data (operating state of the photometry timer) set according to the result of the determination in the step S513 to the strobe microcomputer 310 (step S605). Next, the camera microcomputer 101 transmits the data (other strobe setting information) stored in the built-in memory in the step S516 to the strobe microcomputer 310 (step S606). Then, the camera microcomputer 101 proceeds to the step S8*a* appearing in FIG. 7A.

In the strobe 300, upon receipt of a communication interrupt, the strobe microcomputer 310 receives the data transmitted from the camera microcomputer 101 (step S607). Then, the strobe microcomputer 310 stores the received data in the built-in memory (step S608), followed by terminating the present process.

Figure 13:
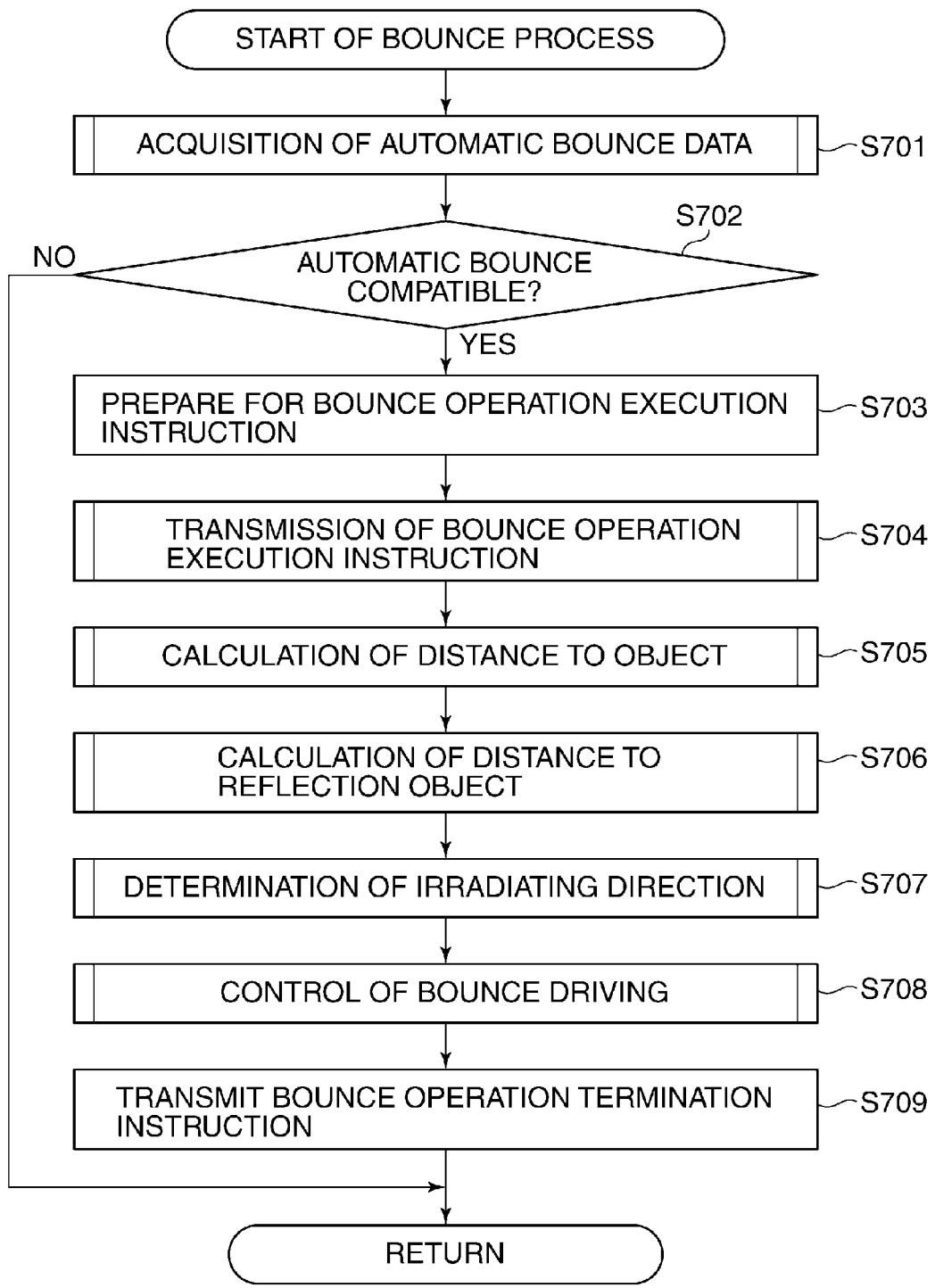
FIG. 13 is a flowchart of an automatic bounce process performed in steps in FIG. 7B.

FIG. 13 is a flowchart of the automatic bounce process performed in the steps S13 and S16 in FIG. 7B.

In the automatic bounce process, first, the camera microcomputer 101 performs an automatic bounce data acquisition process for acquiring automatic bounce data from the strobe microcomputer 310, as described hereinafter (step S701). Then, the camera microcomputer 101 determines whether or not the automatic bounce operation can be performed, based on the automatic bounce data and the settings of the automatic bounce operation (step S702).

If the automatic bounce operation cannot be performed (NO to the step S702), the camera microcomputer 101 proceeds to the step S14*a* in FIG. 7B, whereas if the automatic bounce operation can be performed (YES to the step S702), the camera microcomputer 101 prepares for instructing the execution of the bounce operation (step S703). Then, the camera microcomputer 101 performs a bounce operation execution instruction-transmitting process for transmitting an instruction for executing the bounce operation to the strobe microcomputer 310, as described hereinafter (step S704).

Then, the camera microcomputer 101 performs an object distance calculation process for calculating a distance to the object (object distance) in order to determine an optimum irradiating direction for the bounce flash shooting, as described hereinafter (step S705). Then, the camera microcomputer 101 calculates a distance to a reflection object, such as a ceiling or a wall, (reflection object distance), in order to determine the optimum irradiating direction for the bounce flash shooting, as described hereinafter (step S706).

Note that although in the above description, the camera microcomputer 101 calculates the object distance and the reflection object distance, which of the camera microcomputer 101 and the strobe microcomputer 310 calculates the object distance and the reflection object distance is determined based on the set ranging method.

Then, the camera microcomputer 101 determines the optimum irradiating direction for the bounce flash shooting, as described hereinafter (step S707). After that, the camera microcomputer 101 performs bounce drive control according to the determined irradiating direction (step S708). Next, the camera microcomputer 101 transmits an instruction for terminating the bounce operation to the strobe microcomputer 310 (step S709), and proceeds to the step S14a in FIG. 7B.

Figure 14A:
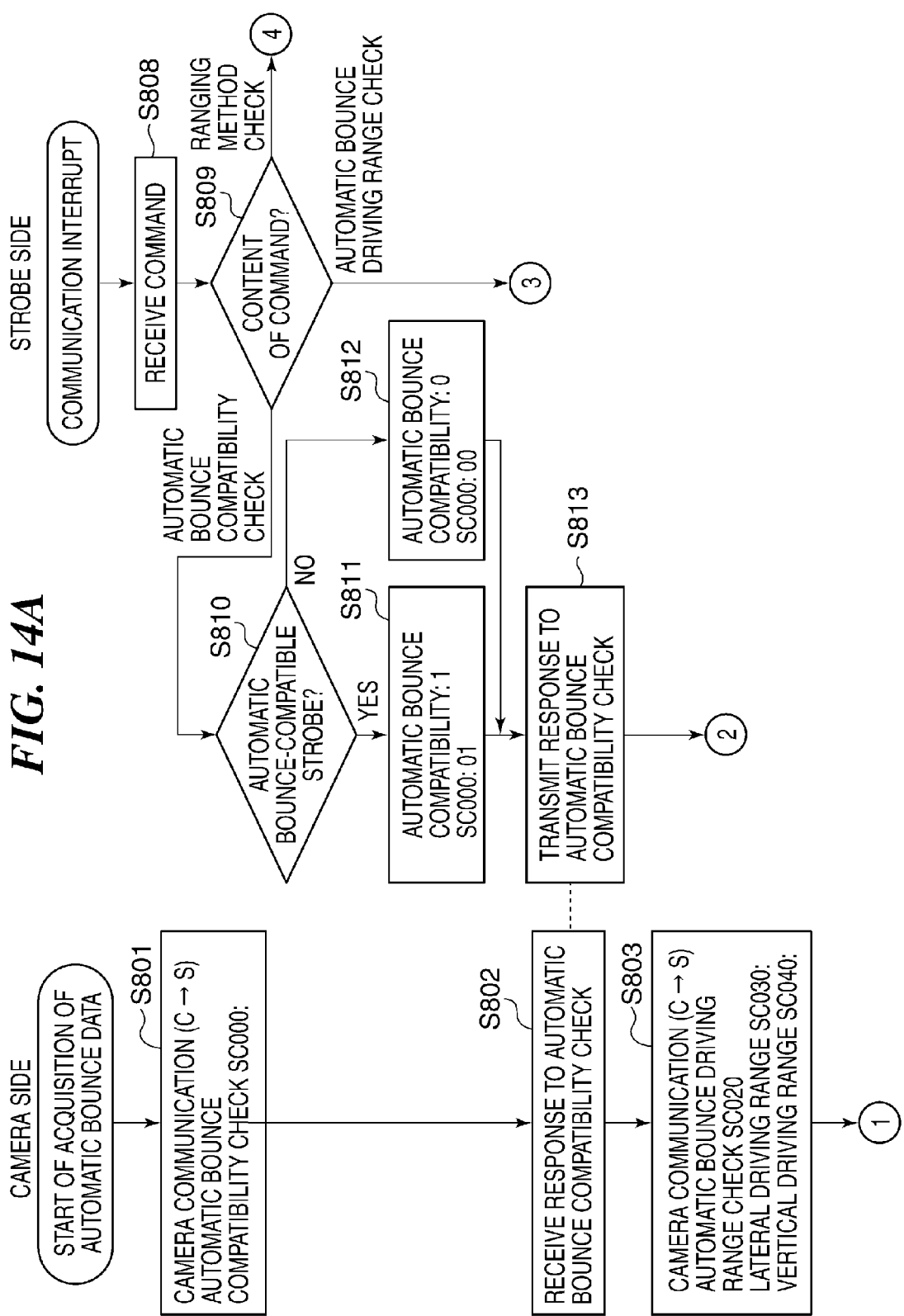
FIG. 14A is a flowchart of an automatic bounce data acquisition process performed in a step in FIG. 13.
Figure 14B:
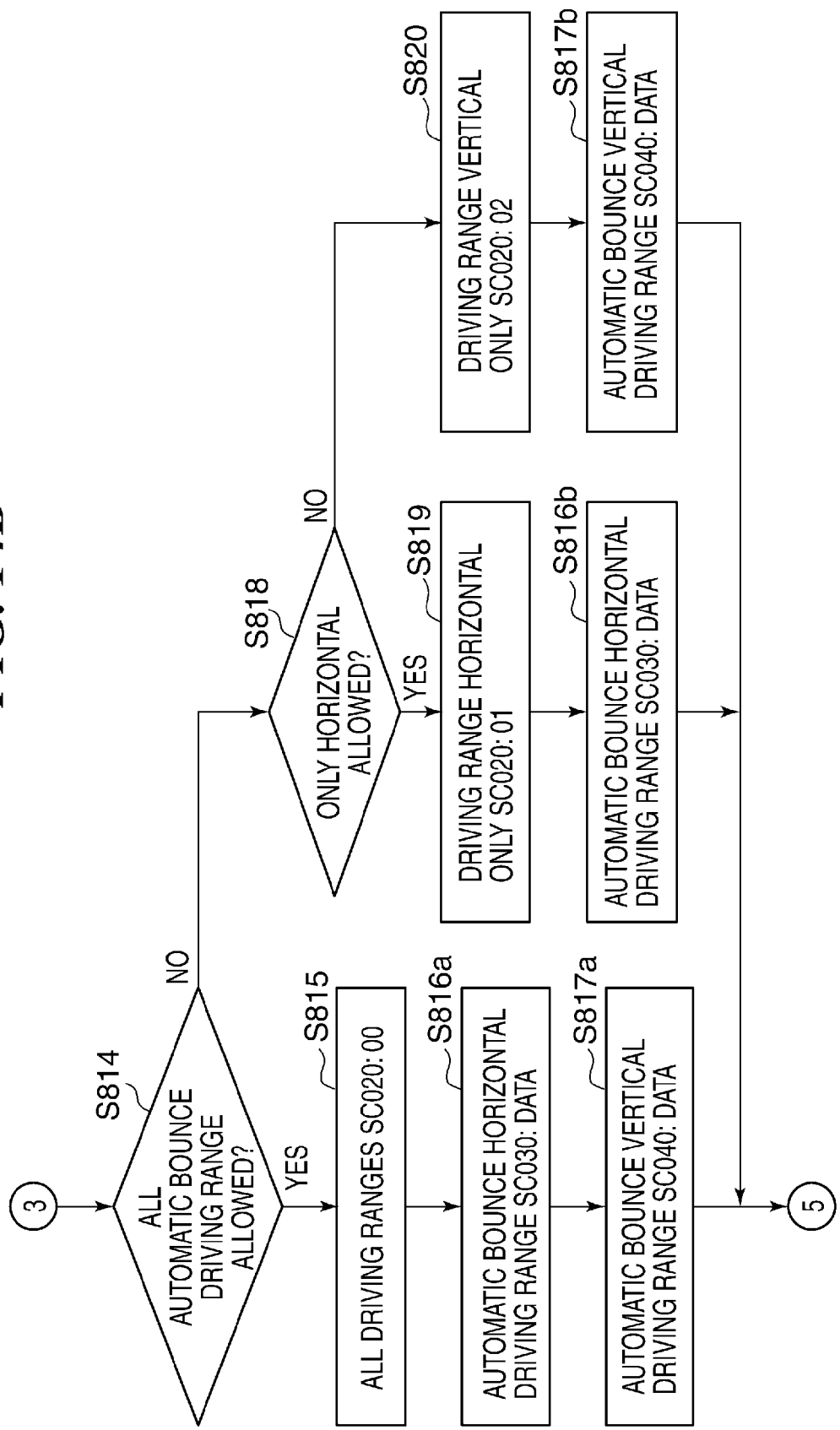
FIG. 14B is a continuation of FIG. 14A.
Figure 14C:
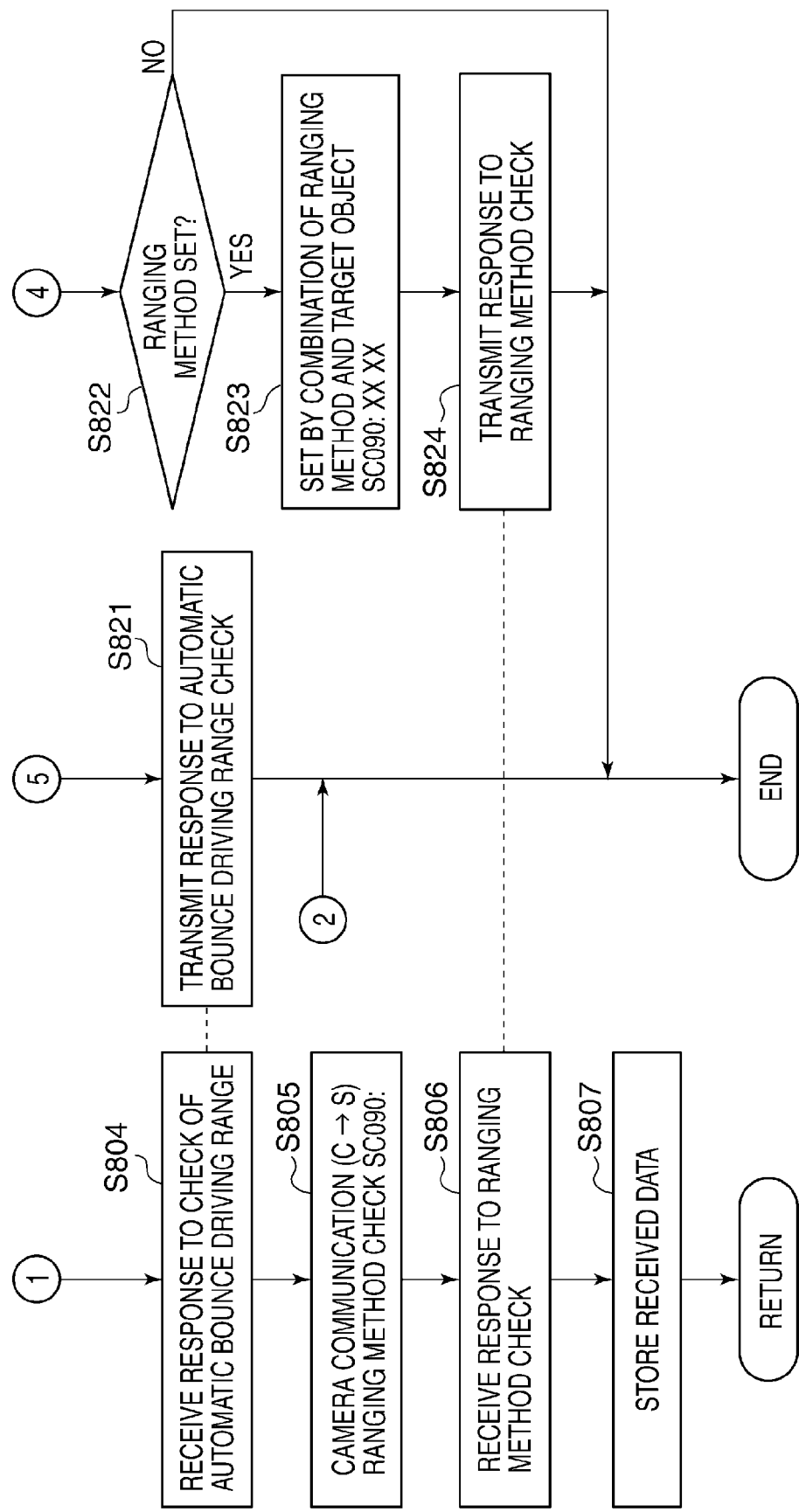
FIG. 14C is a continuation of FIG. 14B.

FIG. 14 is a flowchart of the automatic bounce data acquisition process performed in the step S701 in FIG. 13.

In the automatic bounce data acquisition process, first, the camera microcomputer 101 sends a command to the strobe microcomputer 310 for checking whether or not the strobe 300 is capable of performing the automatic bounce operation (step S801). Then, the camera microcomputer 101 receives a response to the command from the strobe microcomputer 310 (step S802).

Next, the camera microcomputer 101 sends a command to the strobe microcomputer 310 for checking the driving range of the movable unit 300b in the automatic bounce operation (step S803). Then, the camera microcomputer 101 receives a response to the command for checking the driving range, from the strobe microcomputer 310 (step S804).

Next, the camera microcomputer 101 sends a command to the strobe microcomputer 310 for checking the ranging method for calculating a distance to the target object (i.e. reflection object) in the automatic bounce operation (step S805). The camera microcomputer 101 receives a response to the command for checking the ranging method, from the strobe microcomputer 310 (step S806). Finally, the camera microcomputer 101 stores the data received in the steps S802, S804, and S806 in the built-in memory (step S807), and proceeds to the step S702 in FIG. 13.

In the strobe 300, upon receipt of a communication interrupt, the strobe microcomputer 310 receives a command transmitted from the camera microcomputer 101 (step S808), and checks the command (step S809). If the command is for checking whether or not the strobe 300 is capable of performing the automatic bounce operation ("automatic bounce operation capability check" in the step S809), the strobe microcomputer 310 determines whether or not the strobe 300 is capable of performing the automatic bounce operation (step S810).

If the strobe 300 is capable of performing the automatic bounce operation (YES to the step S810), the strobe microcomputer 310 stores an "SC001 command: 01" in preparation for the camera-strobe communication (S→C) in the built-in memory (step S811). On the other hand, if the strobe 300 is incapable of performing the automatic bounce operation (NO to the step S810), the strobe microcomputer 310 stores an "SC001 command: 00" in preparation for the camera-strobe communication (S→C) in the built-in memory (step S812).

After execution of the step S811 or S812, the strobe microcomputer 310 transmits the data stored in the built-in memory in the step S811 or S812, as a response to the command for checking whether or not the strobe 300 is capable of performing the automatic bounce operation (step S813), followed by terminating the present process.

If the command is for checking the driving range of the movable unit 300b in the automatic bounce operation ("automatic bounce driving range check" in the step S809), the strobe microcomputer 310 determines whether or not the automatic bounce driving range allows driving in both the vertical direction and the lateral direction (step S814). If the automatic bounce driving range allows driving in both the vertical direction and the lateral direction (YES to the step S814), the strobe microcomputer 310 stores an "SC020 command: data 00" in preparation for the camera-strobe communication (S→C) in the built-in memory (step S815). Then, the strobe microcomputer 310 stores an "SC030 command: data XX (start) XX (end)" as the driving range in the lateral direction (horizontal driving range) in preparation for the camera-strobe communication (S→C) in the built-in memory (step S816a). Further, the strobe microcomputer 310 stores an "SC040 command: data XX (start) XX (end)" as the driving range in the vertical direction (vertical driving range) in preparation for the camera-strobe communication (S→C) in the built-in memory (step S817a).

If the automatic bounce driving range does not allow driving in both the vertical direction and the lateral direction (NO to the step S814), the strobe microcomputer 310 determines whether or not the automatic bounce driving range allows only the driving range in the lateral direction (horizontal direction) (step S818). If the automatic bounce driving range allows driving only in the lateral direction (YES to the step S818), the strobe microcomputer 310 stores an "SC020 command: data 01" in preparation for the camera-strobe communication (S→C) in the built-in memory (step S819). Then, the strobe microcomputer 310 stores an "SC030 command: data XX (start) XX (end)" as the driving range in the lateral direction in preparation for the camera-strobe communication (S→C) in the built-in memory (step S816b).

If the automatic bounce driving range allows driving only in the vertical direction (NO to the step S818), the strobe microcomputer 310 stores an "SC020 command: data 02" in preparation for the camera-strobe communication (S→C) in the built-in memory (step S820). Then, the strobe microcomputer 310 stores an "SC040 command: data XX (start) XX (end)" as the driving range in the vertical direction in preparation for the camera-strobe communication (S→C) in the built-in memory (step S817b).

After execution of the step S8117a, S816b, or S817b, the strobe microcomputer 310 transmits a response to the command for checking the automatic bounce driving range. Here, the strobe microcomputer 310 transmits the data stored in the built-in memory in the steps S815, S816a, and S817a, the steps S819 and S816b, or the steps S820 and S817b, to the camera microcomputer 101 (step S821), followed by terminating the present process.

If the command is for checking a ranging method ("ranging method check" in the step S809), the strobe microcomputer 310 determines whether or not a ranging method is set for calculating the distance to the reflection object in the automatic bounce (step S822). If a ranging method is set (YES to the step S822), the strobe microcomputer 310 stores an "SC090 command: XX XX" formed according to the ranging method and the setting of the target object, in the built-in memory (step S823). Then, the strobe microcomputer 310 transmits the data stored in the built-in memory in the step S823 as a response to the command for checking a ranging method, to the camera microcomputer 101 (step S824), followed by terminating the present process. On the other hand, if no ranging method is set (NO to the step S822), the strobe microcomputer 310 transmits data indicating that no ranging method is set, to the camera microcomputer 101, followed by terminating the present process.

Figure 15:
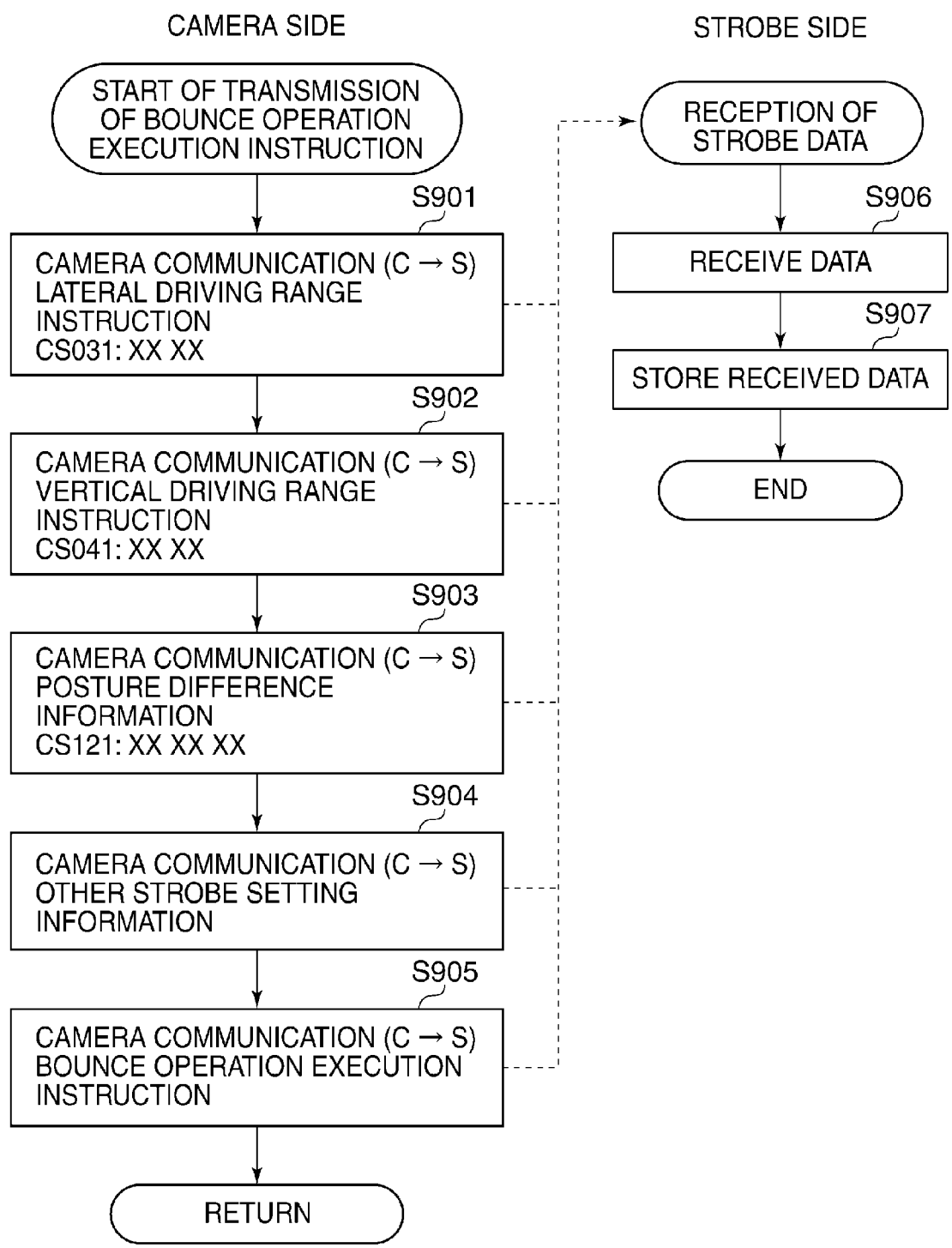
FIG. 15 is a flowchart of a bounce operation execution instruction-transmitting process performed in a step in FIG. 13.

FIG. 15 is a flowchart of the bounce operation execution instruction-transmitting process performed in the step S704 in FIG. 13.

In the bounce operation execution instruction-transmitting process, first, the camera microcomputer 101 transmits a "CS031 command: data XX XX" to the strobe microcomputer 310 in order to set the driving range in the lateral direction during the bounce operation (step S901). Note that in a case where the driving range in the lateral direction is not to be set, the step S901 is omitted.

Next, the camera microcomputer 101 transmits a "CS041 command: data XX XX" to the strobe microcomputer 310 in order to set the driving range in the vertical direction during the bounce operation (step S902). Note that in a case where the driving range in the vertical direction is not to be set, the step S902 is omitted.

The camera microcomputer 101 transmits a "CS121 command: data XX XX XX" as posture difference information which is the results of detections by the posture H detection section 140a, the posture V detection section 140b, and the posture Z detection section 140c, to the strobe microcomputer 310 (step S903). Then, the camera microcomputer 101 transmits other strobe setting information to the strobe microcomputer 310 (step S904). Further, the camera microcomputer 101 transmits an instruction for performing the bounce operation to the strobe microcomputer 310 (step S905). After that, the camera microcomputer 101 proceeds to the step S705 in FIG. 13.

Upon receipt of a communication interrupt, the strobe microcomputer 310 receives the data transmitted from the camera microcomputer 101 (step S906). Then, the strobe microcomputer 310 stores the received data in the built-in memory (step S907), followed by terminating the present process.

Figure 16:
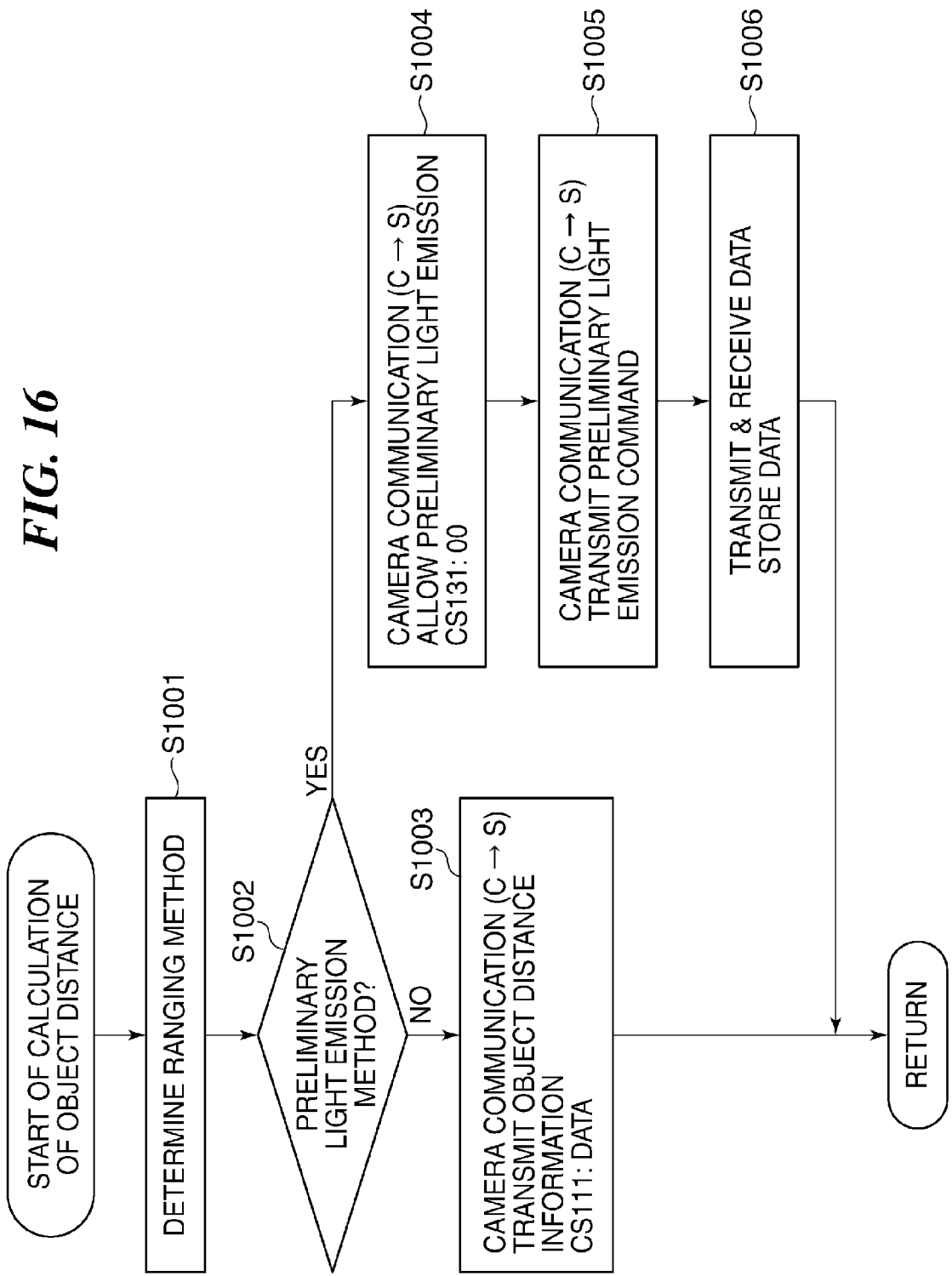
FIG. 16 is a flowchart of an object distance calculation process performed by a camera microcomputer in a step in FIG. 13.

FIG. 16 is a flowchart of the object distance calculation process performed in the step S705 in FIG. 13.

In the object distance calculation process, first, the camera microcomputer 101 determines a ranging method for calculating the object distance (step S1001). Then, the camera microcomputer 101 determines whether or not the ranging method is the preliminary light emission method (step S1002). If the ranging method is not the preliminary light emission method (NO to the step S1002), the camera microcomputer 101 transmits a "CS111 command: data XX" as object distance information to the strobe microcomputer 310 (step S1003). After that, the camera microcomputer 101 proceeds to the step S706 in FIG. 13. Note that in a case where it has been notified by the automatic bounce data that the ranging method is the strobe ranging method, the step S1002 is omitted.

If the ranging method is the preliminary light emission method (YES to the step S1002), the camera microcomputer 101 transmits a "CS131 command: data 00" as preliminary light emission permission to the strobe microcomputer 310 (step S1004). Then, the camera microcomputer 101 transmits a preliminary light emission command to the strobe microcomputer 310 (step S1005). After that, the camera microcomputer 101 receives the object distance information from the strobe microcomputer 310, and stores the received data in the built-in memory (step S1006). Then, the camera microcomputer 101 proceeds to the step S706 in FIG. 13.

Figure 17:
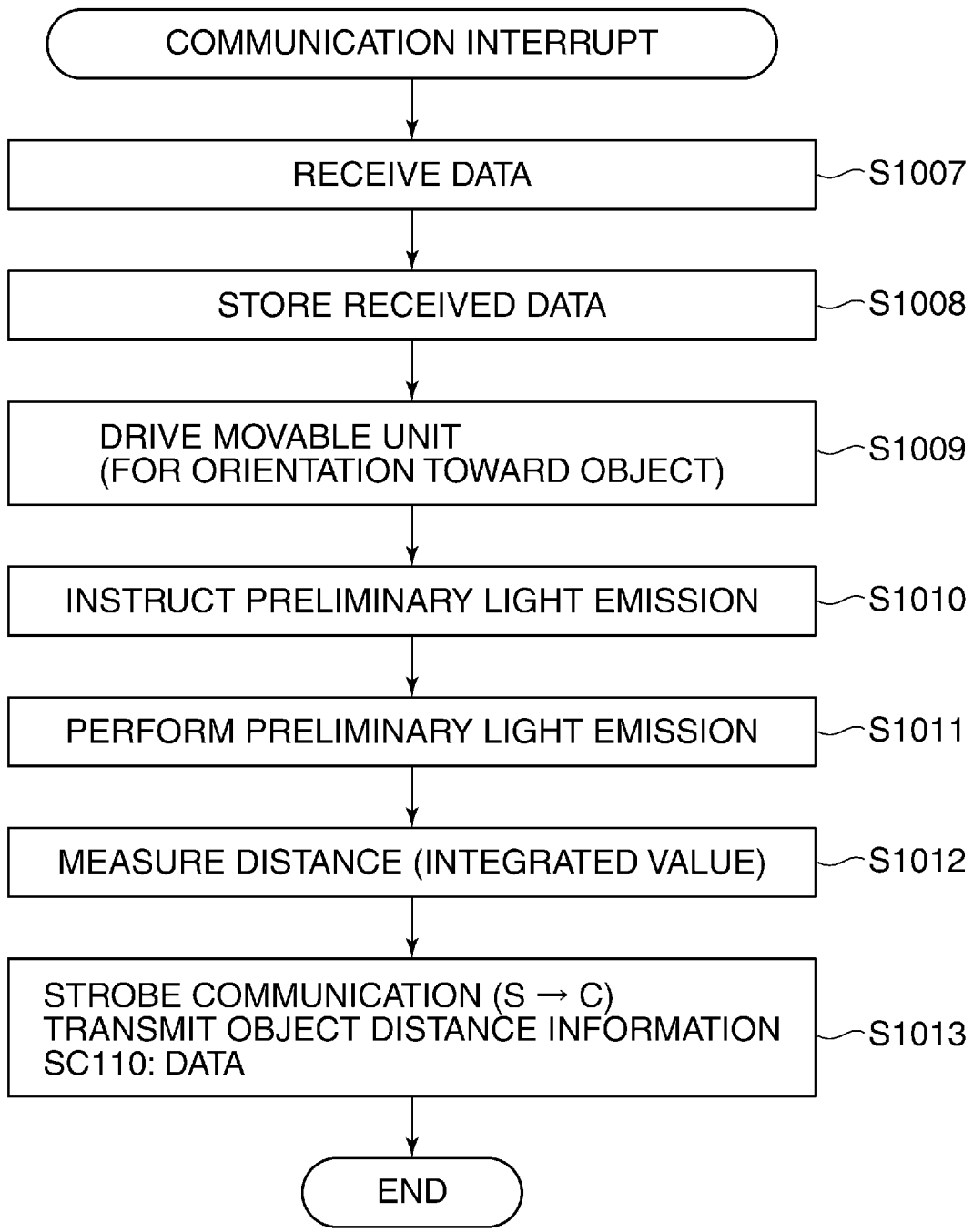
FIG. 17 is a flowchart of a process performed by a strobe microcomputer in response to a communication interrupt by the object distance calculation process performed in a step in FIG. 13.

FIG. 17 is a flowchart of a process performed by the strobe microcomputer 310 in response to a communication interrupt by the object distance calculation process which is performed in the step S705 in FIG. 13 and is described above in detail with reference to FIG. 16.

Upon receipt of the communication interrupt, the strobe microcomputer 310 receives the data transmitted from the camera microcomputer 101 (step S1007). Then, the strobe microcomputer 310 stores the received data in the built-in memory (step S1008). After that, upon receipt of the preliminary light emission permission, the strobe microcomputer 310 controls the bounce circuit 340 to rotate the movable unit 300b such that the irradiating direction becomes a direction toward the object (step S1009).

Then, the strobe microcomputer 310 instructs the light emission control circuit 304 to perform preliminary light emission in response to the preliminary light emission command (step S1010). In response to this, the light emission control circuit 304 performs preliminary light emission using the discharge tube 305 according to the preliminary light emission command (step S1011). Then, the strobe microcomputer 310 causes the ranging unit 308 to receive reflected light of the preliminary light emission, which is reflected from the reflection object, and calculate an object distance based on the integrated value of the received reflected light (step S1012). The strobe microcomputer 310 transmits an "SC110 command: data XX" as object distance information indicative of the object distance, to the camera microcomputer 101 (step S1013), followed by terminating the present process.

Figure 18:
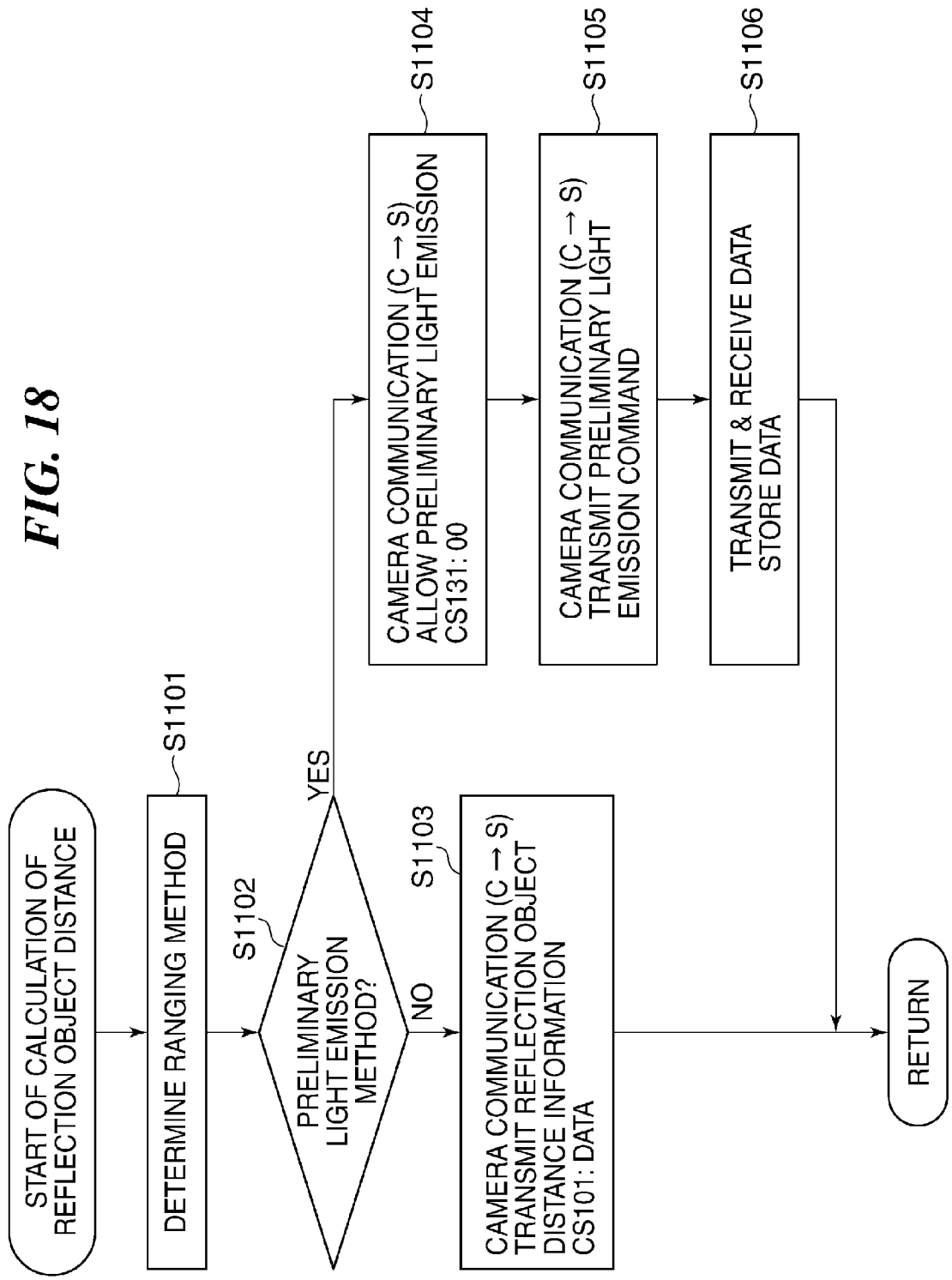
FIG. 18 is a flowchart of a reflection object distance calculation process performed by the camera microcomputer in a step in FIG. 13.

FIG. 18 is a flowchart of a reflection object distance calculation process performed in the step S706 in FIG. 13.

In the reflection object distance calculation process, first, the camera microcomputer 101 determines a ranging method for calculating the reflection object distance (step S1101). Then, the camera microcomputer 101 determines whether or not the ranging method is the preliminary light emission method (step S1102). If the ranging method is not the preliminary light emission method (NO to the step S1102), the camera microcomputer 101 transmits a "CS101 command: data XX" as reflection object distance information to the strobe microcomputer 310 (step S1103). After that, the camera microcomputer 101 proceeds to the step S707 in FIG. 13. Note that in a case where it has been notified by the automatic bounce data that the ranging method is the strobe ranging method, the step S1102 is omitted.

If the ranging method is the preliminary light emission method (YES to the step S1102), the camera microcomputer 101 transmits the "CS131 command: data 00" as preliminary light emission permission to the strobe microcomputer 310 (step S1104). Then, the camera microcomputer 101 transmits a preliminary light emission command to the strobe microcomputer 310 (step S1105). After that, the camera microcomputer 101 receives the reflection object distance information from the strobe microcomputer 310, and stores the data in the built-in memory (step S1106). Then, the camera microcomputer 101 proceeds to the step S707 in FIG. 13.

Figure 19:
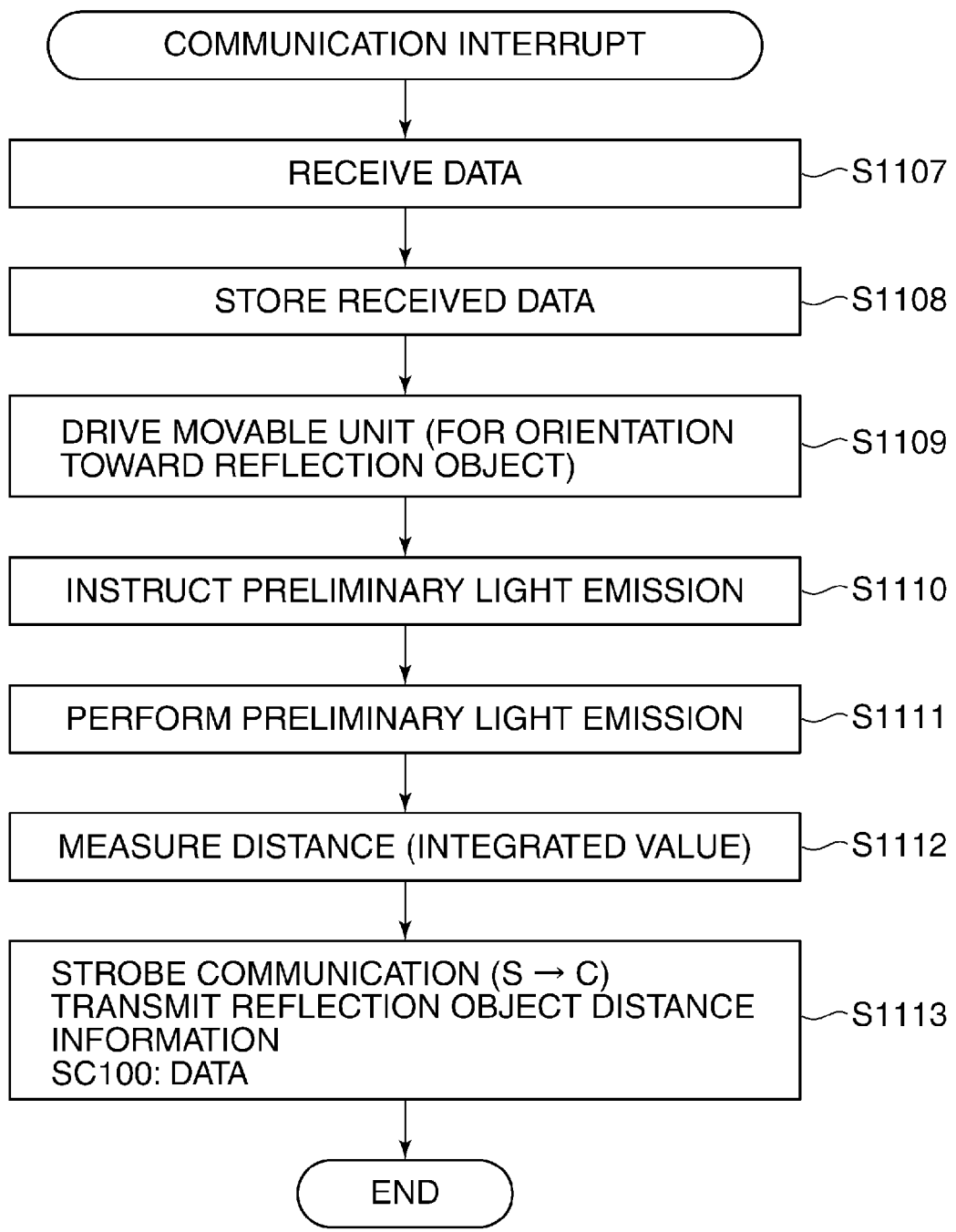
FIG. 19 is a flowchart of a process performed by the strobe microcomputer in response to a communication interrupt by the reflection object distance calculation process performed in the step in FIG. 13.

FIG. 19 is a flowchart of a process performed by the strobe microcomputer 310 in response to a communication interrupt by the reflection object distance calculation process which is performed in the step S706 in FIG. 13 and is described above in detail with reference to FIG. 18.

Upon receipt of the communication interrupt, the strobe microcomputer 310 receives the data transmitted from the camera microcomputer 101 (step S1107). Then, the strobe microcomputer 310 stores the received data in the built-in memory (step S1108). After that, upon receipt of the preliminary light emission permission, the strobe microcomputer 310 controls the bounce circuit 340 to rotate the movable unit 300b such that the irradiating direction becomes a direction toward a reflection object, such as a ceiling or a wall (step S1109).

Then, the strobe microcomputer 310 instructs the light emission control circuit 304 to perform preliminary light emission in response to the preliminary light emission command (step S1110). In response to this, the light emission control circuit 304 performs preliminary light emission using the discharge tube 305 according to the preliminary light emission command (step S1111). Then, the strobe microcomputer 310 causes the ranging unit 308 to receive reflected light of the preliminary light emission, which is reflected from the reflection object, and calculate a reflection object distance based on the integrated value of the received reflected light (step S1112). The strobe microcomputer 310 transmits an "SC110 command: data XX" as reflection object distance information indicative of the reflection object distance, to the camera microcomputer 101 (step S1113), followed by terminating the present process.

Figure 20:
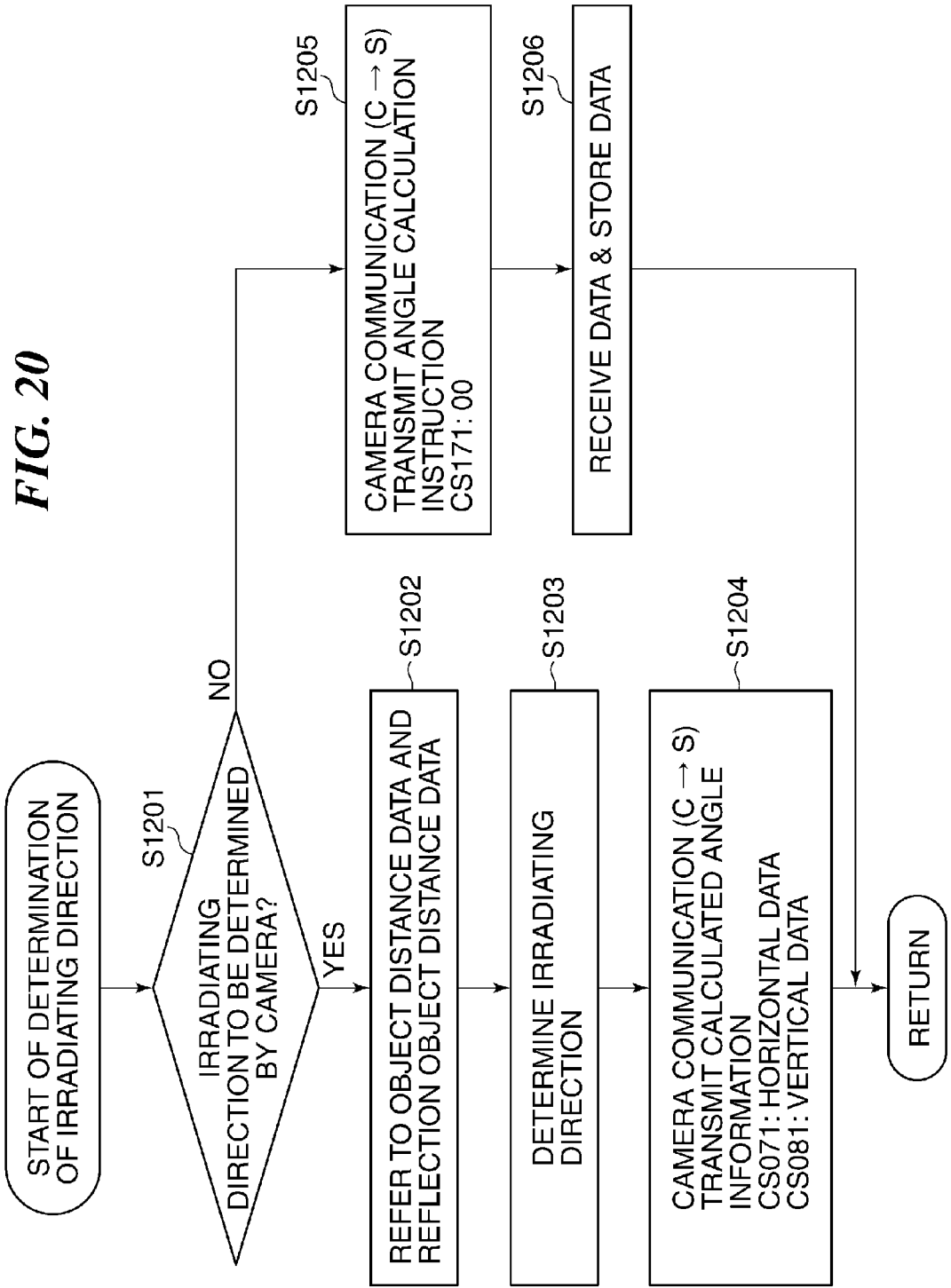
FIG. 20 is a flowchart of an irradiating direction determination process performed by the camera microcomputer in a step in FIG. 13.
Figure 21:
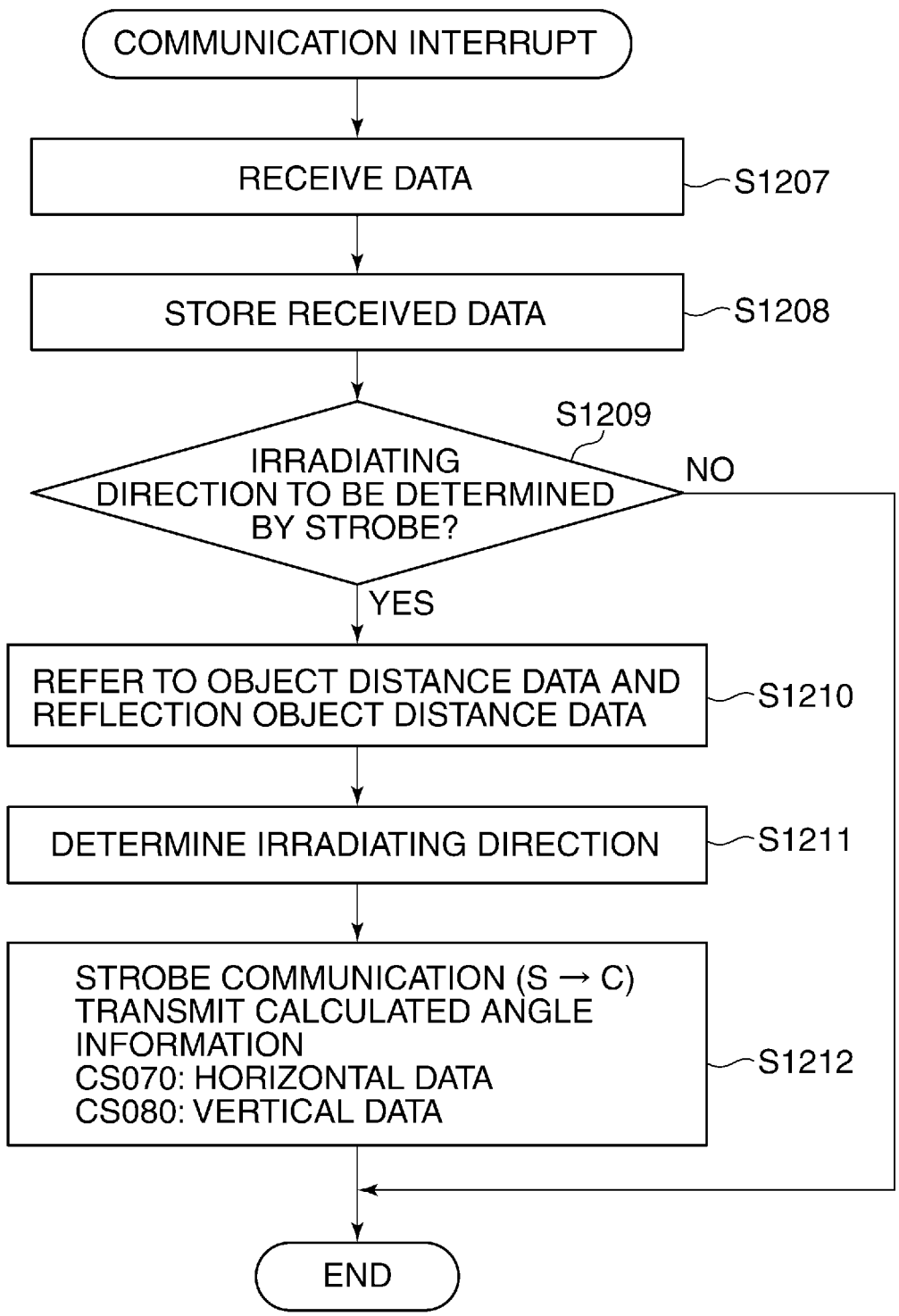
FIG. 21 is a flowchart of a process performed by the strobe microcomputer in response to a communication interrupt by the irradiating direction determination process performed in the step in FIG. 13.

FIG. 20 is a flowchart of an irradiating direction determination process performed in the step S707 in FIG. 13. FIG. 21 is a flowchart of a process performed by the strobe microcomputer 310 in response to a communication interrupt by the irradiating direction determination process described in detail with reference to FIG. 20.

First, referring to FIG. 20, in the irradiating direction determination process, the camera microcomputer 101 determines whether or not the irradiating direction is to be determined by the camera 100 (step S1201). Note that in a case where the irradiating direction can be determined by any of the camera 100 and the strobe 300, the determination may be performed by either of them. Further, one of the camera 100 and the strobe 300, which determines the irradiating direction, may be set by operating the input section 112. Further, in a case where the irradiating direction can be determined by only one of the camera 100 and the strobe 300, one which performs the determination may be automatically set.

If the irradiating direction is determined by the camera 100 (YES to the step S1201), the camera microcomputer 101 refers to the object distance information obtained in the step S705 in FIG. 13 and the reflection object distance information obtained in the step S706 in FIG. 13 (step S1202), and determines an optimum direction of irradiating the strobe light for the bounce flash shooting based on the object distance information and the reflection object distance information (step S1203). For example, the camera microcomputer 101 calculates a rotational angle of the movable unit 300b, which makes the irradiating direction optimum. A method of determining the rotational angle is not particularly limited.

Figure 22:
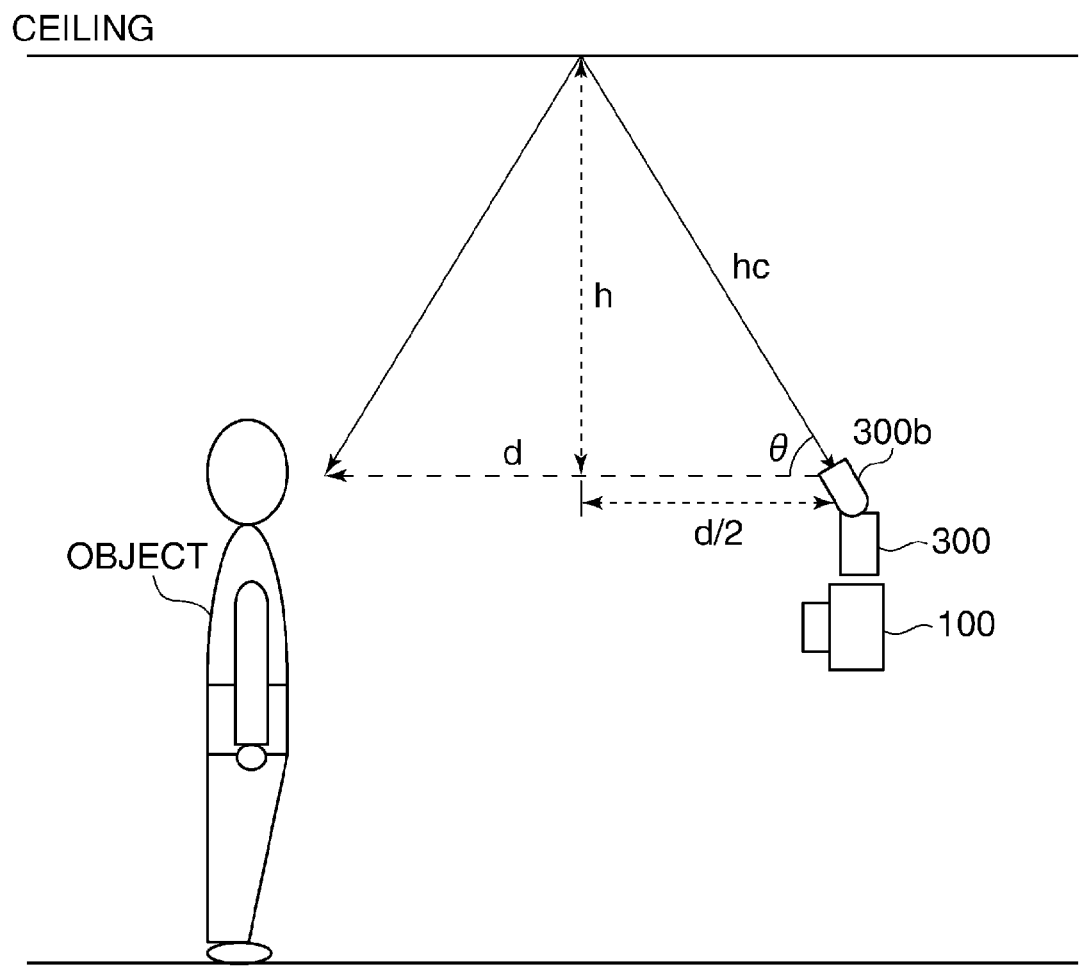
FIG. 22 is a diagram showing one scene of the bounce flash shooting performed by the digital camera.

FIG. 22 is a diagram showing one scene of the bounce flash shooting performed by the camera appearing in FIGS. 1 and 2.

In FIG. 22, a distance from a strobe light emission surface as a starting point to the object is represented by d. At this time, it is assumed that when the strobe light is reflected from a ceiling portion directly above a point on the optical axis at a distance of d/2 from the camera 100 toward the object, optimum reflected light is irradiated to the object. The distance from the movable unit 300b to the ceiling portion as the reflection object, which is determined in the step S706, is represented by hc. When a distance to the ceiling which is measured by the ranging unit 308 in a state oriented toward the ceiling by rotating the movable unit 300b through 90 degrees is represented by h, and an angle of the optimum irradiating direction from the horizontal direction is represented by θ, the irradiating direction θ can be determined by the following equation (4):

$$\theta = \tan^{-1}(2h/d) \qquad (4)$$

Therefore, a rotational angle of the movable unit 300b relative to the body 300a may be determined such that the angle of the irradiating direction from the horizontal direction becomes equal to θ.

Note that to cope with a case where the movable unit 300b cannot be rotated to a determined rotational angle, by causing one of predetermined designated angles to be selected based on the determined rotational angle, the movable unit 300b may be rotated through the selected angle. In this case, the selection is performed such that a larger one of the designated angles than the determined rotational angle is selected. That is, the movable unit 300b is moved to a position further away from the reference position than the position of the determined rotational angle. This makes it possible, compared with a case where a designated angle smaller than the determined rotational angle is selected, to irradiate a larger amount of reflected light from the ceiling to the front surface of the object and prevent the strobe light from being directly irradiated to the object.

Referring again to FIG. 20, after determination of the rotational angle, the camera microcomputer 101 stores angle information (vertical angle information and lateral angle information) indicative of the rotational angles in the built-in memory. Then, the camera microcomputer 101 transmits "CS071: vertical data XX" and "CS081: lateral data XX" as the angle information to the strobe microcomputer 310 (step S1204). After that, the camera microcomputer 101 proceeds to the step S708 in FIG. 13.

If the irradiating direction is not determined by the camera 100 (NO to the step S1201), the camera microcomputer 101 transmits "CS171: 00" as an angle calculation instruction to the strobe microcomputer 310 (step S1205). Then, the camera microcomputer 101 receives angle information from the strobe microcomputer 310, stores the angle information in the built-in memory (step S1206), and proceeds to the step S708 in FIG. 13.

Referring to FIG. 21, in the strobe 300, upon receipt of a communication interrupt, the strobe microcomputer 310 receives the data transmitted from the camera microcomputer 101 (step S1207). Then, the strobe microcomputer 310 stores the data in the built-in memory (step S1208).

Then, the strobe microcomputer 310 determines whether or not the irradiating direction is to be determined by the strobe 300 (step S1209). If the irradiating direction is not to be determined by the strobe 300 (NO to the step S1209), the strobe microcomputer 310 terminates the present process. If the irradiating direction is to be determined by the strobe 300 (YES to the step S1209), the strobe microcomputer 310 refers to the object distance information obtained in the step S705 in FIG. 13 and the reflection object distance information obtained in the step S706 in FIG. 13 (step S1210).

The strobe microcomputer 310 determines an optimum irradiating direction for the bounce flash shooting based on the object distance information and the reflection object distance information (step S1211). To determine the irradiating direction, the strobe microcomputer 310 performs the same processing as described above as the processing performed by the camera microcomputer 101. Note that in a camera which has no communication on the automatic bounce, the strobe microcomputer 310 determines the irradiating direction by the method described as to the step S1203.

Then, the strobe microcomputer 310 transmits "SC070: vertical data XX" and "SC080: lateral data XX" as vertical and lateral angle information indicative of the vertical and lateral rotational angles to the camera microcomputer 101 (step S1212), followed by terminating the present process.

Figure 23:
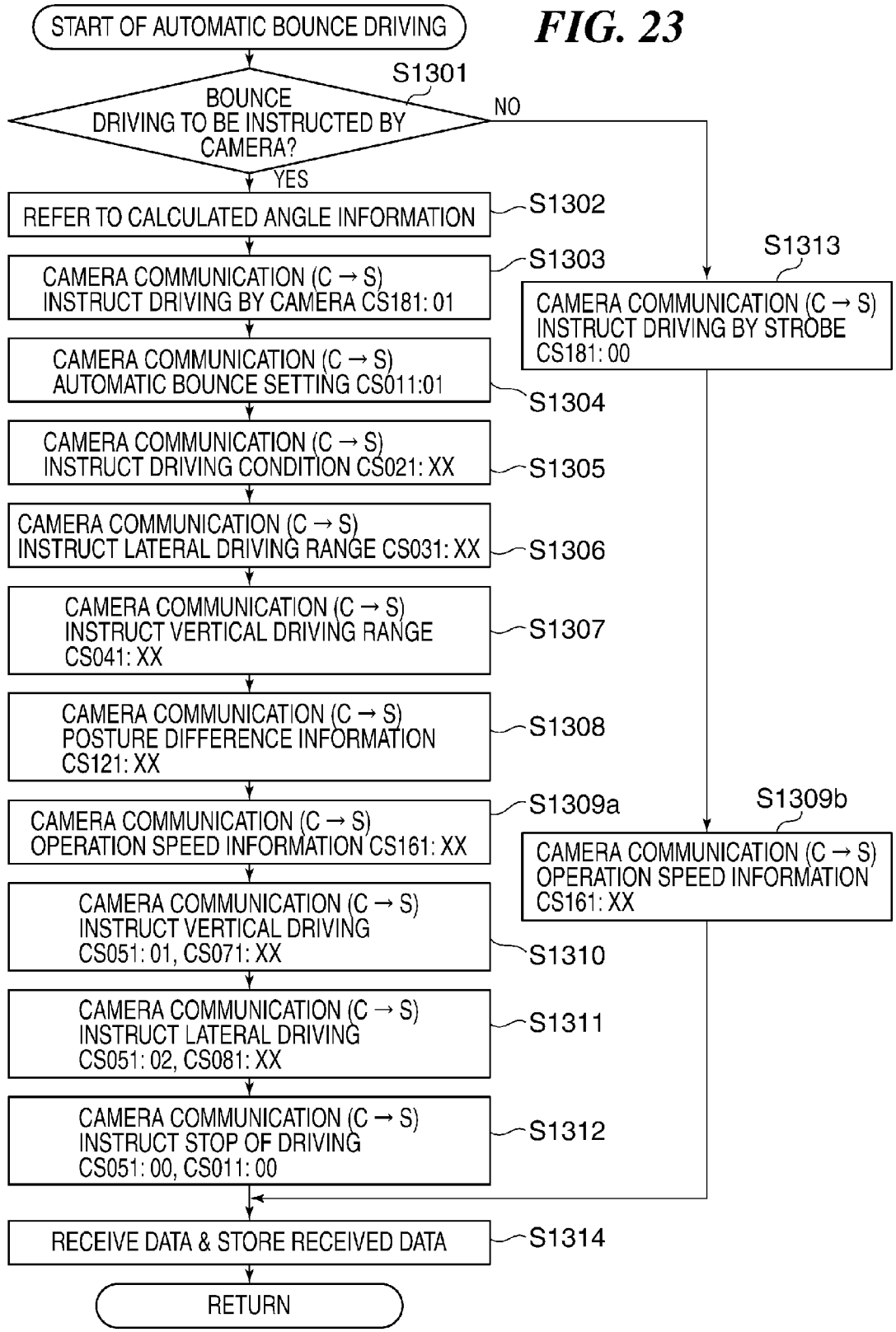
FIG. 23 is a flowchart of a bounce drive control process performed by the camera microcomputer in a step in FIG. 13.

FIG. 23 is a flowchart of a bounce drive control process performed by the camera microcomputer in the step S708 in FIG. 13.

In the bounce drive control process, first, the camera microcomputer 101 determines whether or not a bounce driving instruction is to be given by the camera (step S1301). If the bounce driving instruction is to be given by the camera (YES to the step S1301), the camera microcomputer 101 refers to the angle information determined in the irradiating direction determination process in the step S707 in FIG. 13 (step S1302). Then, to notify that the bounce driving instruction is to be given by the camera, the camera microcomputer 101 transmits a "CS181 command: data 01" to the strobe microcomputer 310 (step S1303).

Then, the camera microcomputer 101 transmits a "CS011 command: data 01" as an automatic bounce setting to the strobe microcomputer 310 (step S1304). Next, the camera microcomputer 101 transmits a "CS021 command: data XX" as an automatic bounce driving condition to the strobe microcomputer 310 (step S1305). In this data, "both the lateral direction and the vertical direction" is represented by "00", "only the lateral direction" is represented by "01", and "only the vertical direction" is represented by "02".

Next, the camera microcomputer 101 transmits a "CS031 command: data XX XX" as the driving range in the lateral direction to the strobe microcomputer 310 (step S1306). Further, the camera microcomputer 101 transmits a "CS041 command: data XX XX" as the driving range in the vertical direction to the strobe microcomputer 310 (step S1307). Then, the camera microcomputer 101 transmits a "CS121 command: data XX XX XX" as the posture difference information to the strobe microcomputer 310 (step S1308).

The camera microcomputer 101 transmits a "CS0161 command: data XX" as operation speed information indicative of a speed for rotating the movable unit 300b (driving speed of the motors of the bounce circuit 340) to the strobe microcomputer 310 (step S1309a). Although in this data, "a normal speed (reference speed)" is represented by "00", "a low speed (50% of the reference speed)" is represented by "01", and a "a high speed (150% of the reference speed)" is represented by "02", the information may be more finely set.

If the speed for rotating the movable unit 300b is thus made changeable, it is possible to set the operation sound of the motors for rotating the movable unit 300b in a manner adapted to a scene. Note that the speed for rotating the movable unit 300b can be changed by a user's operation of the input section 112.

Next, the camera microcomputer 101 transmits a "CS051 command: data 01" and a "CS0071 command: data XX" as an instruction for driving the movable unit 300b in the vertical direction to the strobe microcomputer 310 (step S1310). Then, the camera microcomputer 101 transmits a "CS051 command: data 02" and a "CS081 command: data XX" as an instruction for driving the movable unit 300b in the lateral direction to the strobe microcomputer 310 (step S1311).

After termination of the bounce driving, the camera microcomputer 101 transmits a "CS051 command: data 00" and a "CS011 command: data 00" as an instruction for stopping the bounce driving to the strobe microcomputer 310 (step S1312).

If the bounce driving instruction is to be given by the strobe (NO to the step S1301), the camera microcomputer 101 transmits a "CS181 command: data 00" to the strobe microcomputer 310 (step S1313). Then, similar to the step S1309a, the camera microcomputer 101 transmits a "CS161 command: data XX" as operation speed information to the strobe microcomputer 310 (step S1309b).

After execution of the step S1312 or S1309b, the camera microcomputer 101 receives current position information from the strobe microcomputer 310, and stores the same in the built-in memory (step S1314). Then, the camera microcomputer 101 proceeds to the step S709 in FIG. 13.

Figure 24A:
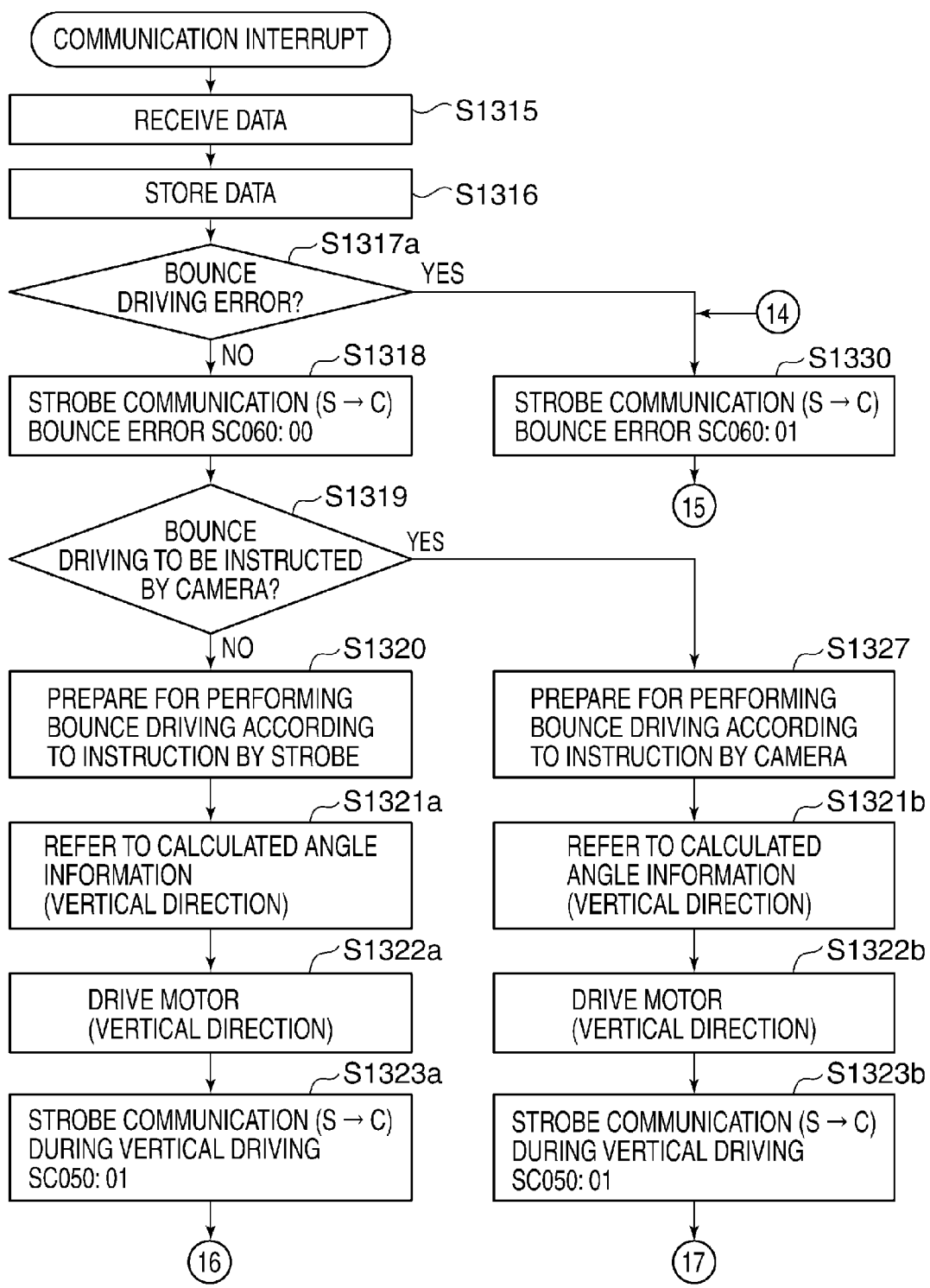
FIG. 24A is a flowchart of a process performed by the strobe microcomputer in response to a communication interrupt by the bounce drive control process performed in the step in FIG. 13.
Figure 24B:
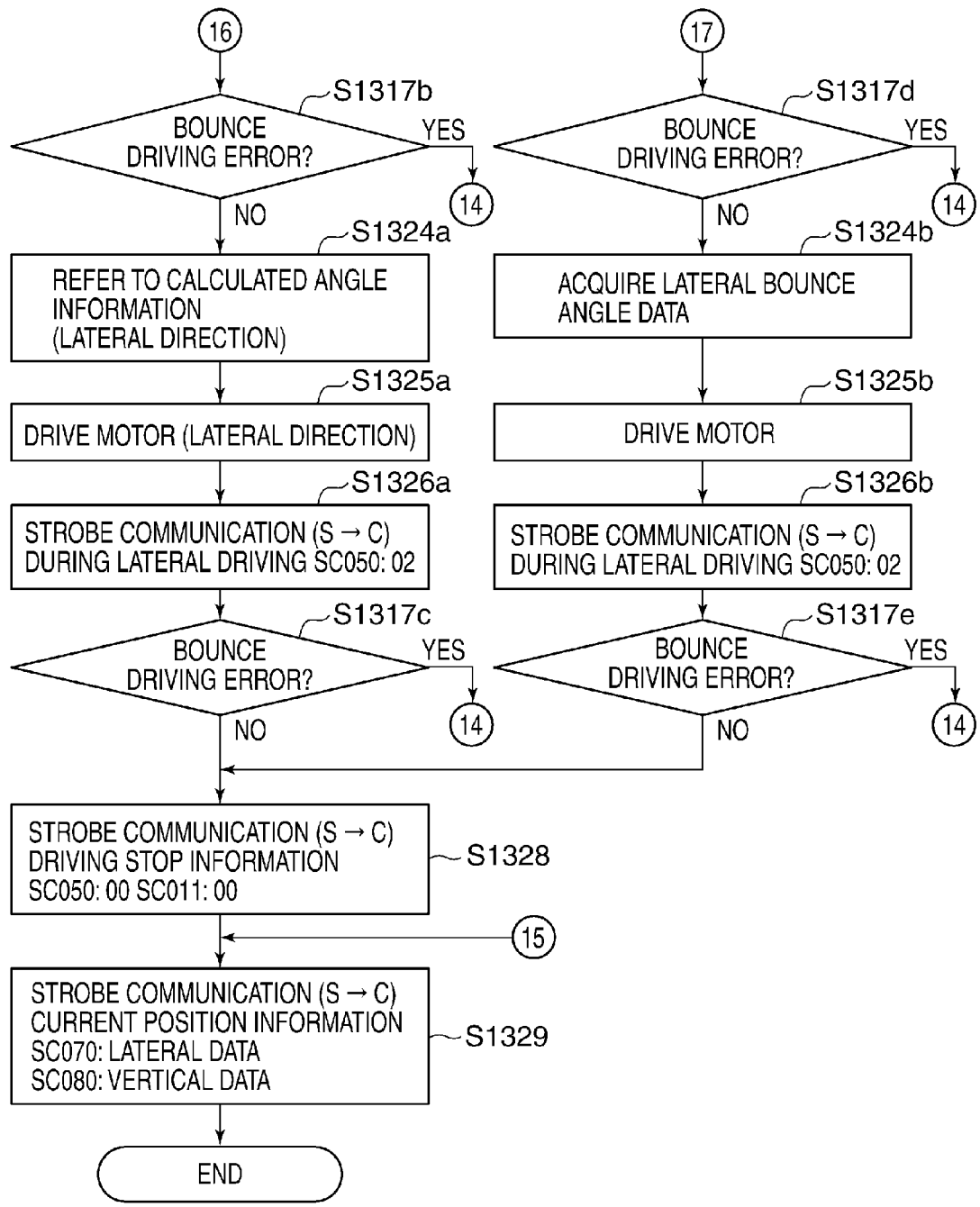
FIG. 24B is a continuation of FIG. 24A.

FIGS. 24A and 24B are a flowchart of a process performed by the strobe microcomputer 310 in response to a communication interrupt by the bounce drive control process performed in the step S709 in FIG. 13.

Upon receipt of the communication interrupt, the strobe microcomputer 310 receives the data transmitted from the camera microcomputer 101 (step S1315). Then, the strobe microcomputer 310 stores the received data in the built-in memory (step S1316).

Then, the strobe microcomputer 310 determines whether or not there has occurred a driving error, such as unexpected abutment of the movable unit 300b or forcible holding of the movable unit 300b by hand, during the bounce driving (step S1317a). If there has not occurred a driving error (NO to the step S1317a), the strobe microcomputer 310 transmits an "SC060 command: data 00" to the camera microcomputer 101 (step S1318). Then, the strobe microcomputer 310 determines whether or not a bounce driving instruction is to be given by the camera (step S1319).

If the bounce driving instruction is to be given by the strobe 300 (NO to the step S1319), the strobe microcomputer 310 prepares for performing bounce driving according to the instruction by the strobe 300 (step S1320). Then, the strobe microcomputer 310 refers to the vertical angle information determined in the irradiating direction determination process in the step S707 in FIG. 13 (step S1321a). After that, the strobe microcomputer 310 drives the motor of the bounce V driving section 340d according to the vertical angle information to thereby rotate the movable unit 300b in the vertical direction (step S1322a).

Then, to notify that the movable unit 300b is being driven in the vertical direction, the strobe microcomputer 310 transmits an "SC050 command: data 01" to the camera microcomputer 101 (step S1323a). Then, similar to the step S1317a, the strobe microcomputer 310 determines whether or not there has occurred a driving error (step S1317b). If there has occurred a driving error (YES to the step S1317b), the strobe microcomputer 310 proceeds to a step S1330, described hereinafter.

If there has not occurred a driving error (NO to the step S1317b), the strobe microcomputer 310 refers to the lateral angle information determined in the irradiating direction determination process in the step S707 in FIG. 13 (step S1324a). Then, the strobe microcomputer 310 drives the motor of the bounce H driving section 340b according to the lateral angle information to thereby rotate the movable unit 300b in the lateral direction (step S1325a). After that, to notify that the movable unit 300b is being driven in the lateral direction, the strobe microcomputer 310 transmits an "SC050 command: data 02" to the camera microcomputer 101 (step S1326a).

Then, similar to the step S1317a, the strobe microcomputer 310 determines whether or not there has occurred a driving error (step S1317c). If there has occurred a driving error (YES to the step S1317c), the strobe microcomputer 310 proceeds to the step S1330, described hereinafter. On the other hand, if there has not occurred a driving error (NO to the step S1317c), the strobe microcomputer 310 transmits an "SC050 command: data 00" and an "SC010 command: data 00" (step S1328). Note that the commands are transmitted to the camera microcomputer 101 as driving stop information after termination of the bounce driving in the vertical and lateral directions.

Then, the strobe microcomputer 310 transmits an "SC070 command: data XX" and an "SC080 command: data XX" as current position information indicative of the rotational angles of the movable unit 300b after termination of the bounce driving, to the camera microcomputer 101 (step S1329). Then, the strobe microcomputer 310 terminates the present process.

If the bounce driving instruction is to be given by the camera 100 (YES to the step S1319), the strobe microcomputer 310 prepares for performing bounce driving according to the instruction by the camera 100 (step S1327). Then, the strobe microcomputer 310 executes the steps S1321b, S1322b, S1323b, S1317d, S1324b, S1325b, S1326b, and S1317e. These steps are the same as the steps S1321a, S1322a, S1323a, S1317b, S1324a, S1325a, S1326a, and S1317c. If it is determined in the step S1317e that there has not occurred a driving error, the strobe microcomputer 310 proceeds to the step S1328.

If there has occurred a bounce driving error (YES to the step S1317a), the strobe microcomputer 310 transmits a message indicating the fact to the camera microcomputer 101 via strobe communication (step S1330). Then, the strobe microcomputer 310 proceeds to the step S1329.

Figure 25:
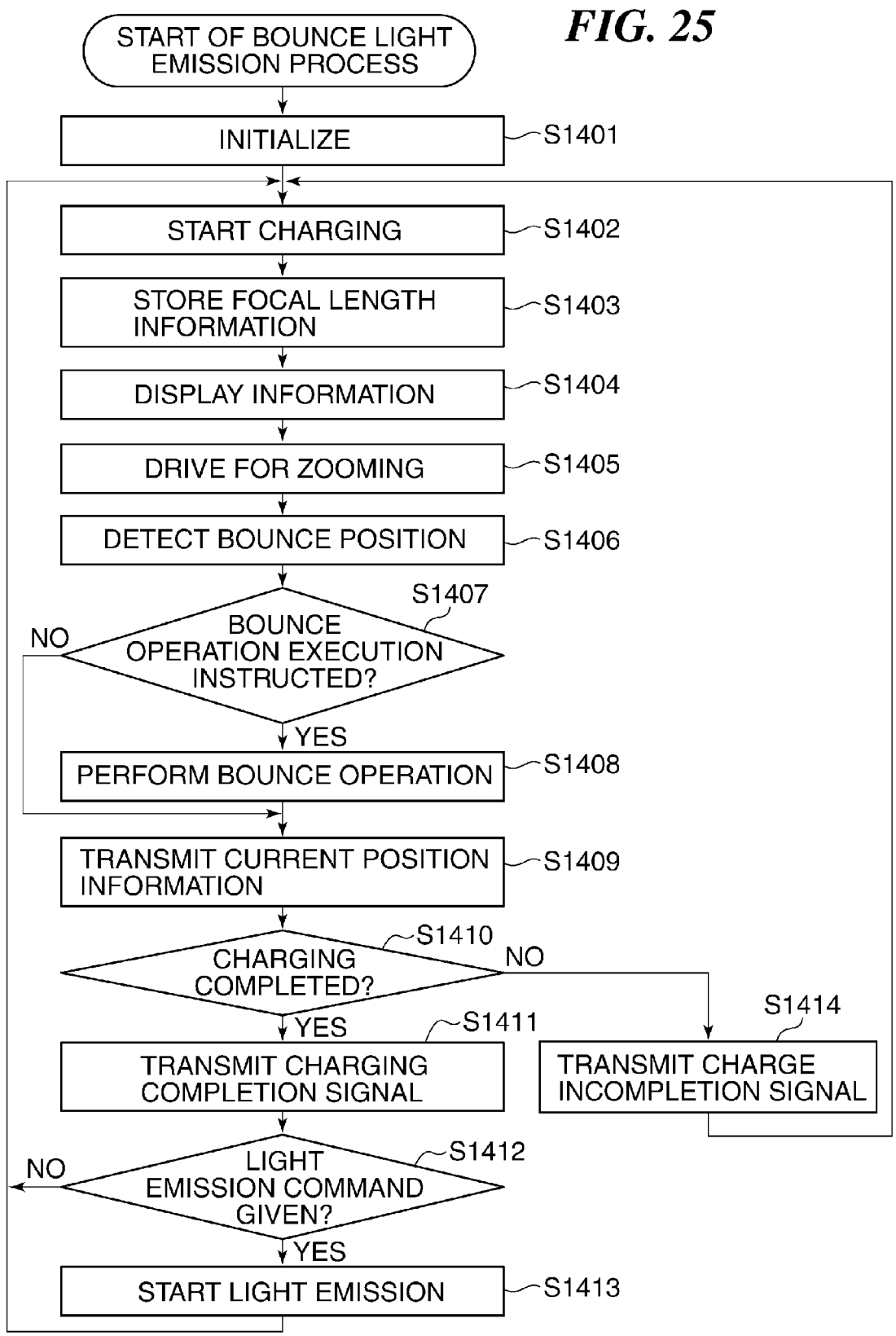
FIG. 25 is a flowchart of a bounce light emission process performed by the strobe microcomputer.

FIG. 25 is a flowchart of a bounce light emission process performed by the strobe microcomputer appearing in FIGS. 1 and 2.

When the power switch provided in the input section 312 is turned on to make the strobe microcomputer 310 operable, the strobe microcomputer 310 starts the bounce light emission process shown in FIG. 25. First, the strobe microcomputer 310 initializes the built-in memory and the ports (step S1401). Further, the strobe microcomputer 310 reads the states of the switches provided in the input section 312 and input information set in advance, and makes settings of the light emission mode, such as a light emission amount determination method and light emission timing.

Then, the strobe microcomputer 310 operates the boosting circuit 302 to charge the main capacitor 302d (step S1402). Then, the strobe microcomputer 310 stores focal length information obtained from the camera microcomputer 101 via the communication line SC in the built-in memory (step S1403). Note that in a case where focal length information has been stored before, the strobe microcomputer 310 updates the focal length information to the new focal length information.

Next, the strobe microcomputer 310 displays the information on the settings of the light emission mode and the focal length configured via the input section 312 (step S1404). The strobe microcomputer 310 drives the zoom optical system 307 by the zoom driving circuit 330 such that the irradiation range of the strobe light becomes a range set according to the focal length information (step S1405). Then, the strobe microcomputer 310 detects the rotational angle (bounce position) of the movable unit 300b with respect to the body 300a using the bounce H detection section 340a and the bounce V detection section 340c (step S1406).

Then, the strobe microcomputer 310 determines whether or not execution of the bounce operation is instructed (step S1407). If the execution of the bounce operation is instructed (YES to the step S1407), the strobe microcomputer 310 performs the above-described bounce operation (bounce driving) (step S1408). After that, the strobe microcomputer 310 transmits the current position information indicative of the rotational angles of the movable unit 300b with respect to the body 300a after termination of the bounce driving, to the camera microcomputer 101 (step S1409). If the execution of the bounce operation is not instructed (NO to the step S1407), the strobe microcomputer 310 proceeds to the step S1409.

Next, the strobe microcomputer 310 determines whether or not the charge voltage of the main capacitor 302d is not lower than a predetermined value (the charging of the main capacitor 302d has been completed) (step S1410). If the charging of the main capacitor 302d has been completed (YES to the step S1410), the strobe microcomputer 310 transmits a charging completion signal to the camera microcomputer 101 (step S1411). Then, the strobe microcomputer 310 determines whether or not a light emission start signal has been received as a light emission command (step S1412).

If the light emission start signal has been received (YES to the step S1412), the strobe microcomputer 310 causes the discharge tube 305 to emit light using the light emission control circuit 304 according to the light emission start signal (step S1413). Then, the strobe microcomputer 310 returns to the step S1402. If the light emission start signal has not been received (NO to the step S1412), the strobe microcomputer 310 returns to the step S1402.

Note that in the step S1413, even when each of a series of light emissions, such as a preliminary light emission for light control and a final light emission, has been terminated, the strobe microcomputer 310 does not return to the step S1402, but when the series of light emissions have been terminated, the strobe microcomputer 310 returns to the step S1402.

If the charging of the main capacitor 302d has not been completed (NO to the step S1410), the strobe microcomputer 310 transmits a charge incompletion signal to the camera microcomputer 101 (step S1414). Then, the strobe microcomputer 310 returns to the step S1402.

As described hereinabove, in the first embodiment of the present invention, when the direction of irradiating the strobe light is changed, it is possible to perform driving for changing the irradiating direction according to the automatic bounce mode in correct timing.

Next, a description will be given of a camera including a light emission control device according to a second embodiment of the present invention. Note that this camera has the same configuration as that of the camera described in the first embodiment.

Figure 26A:
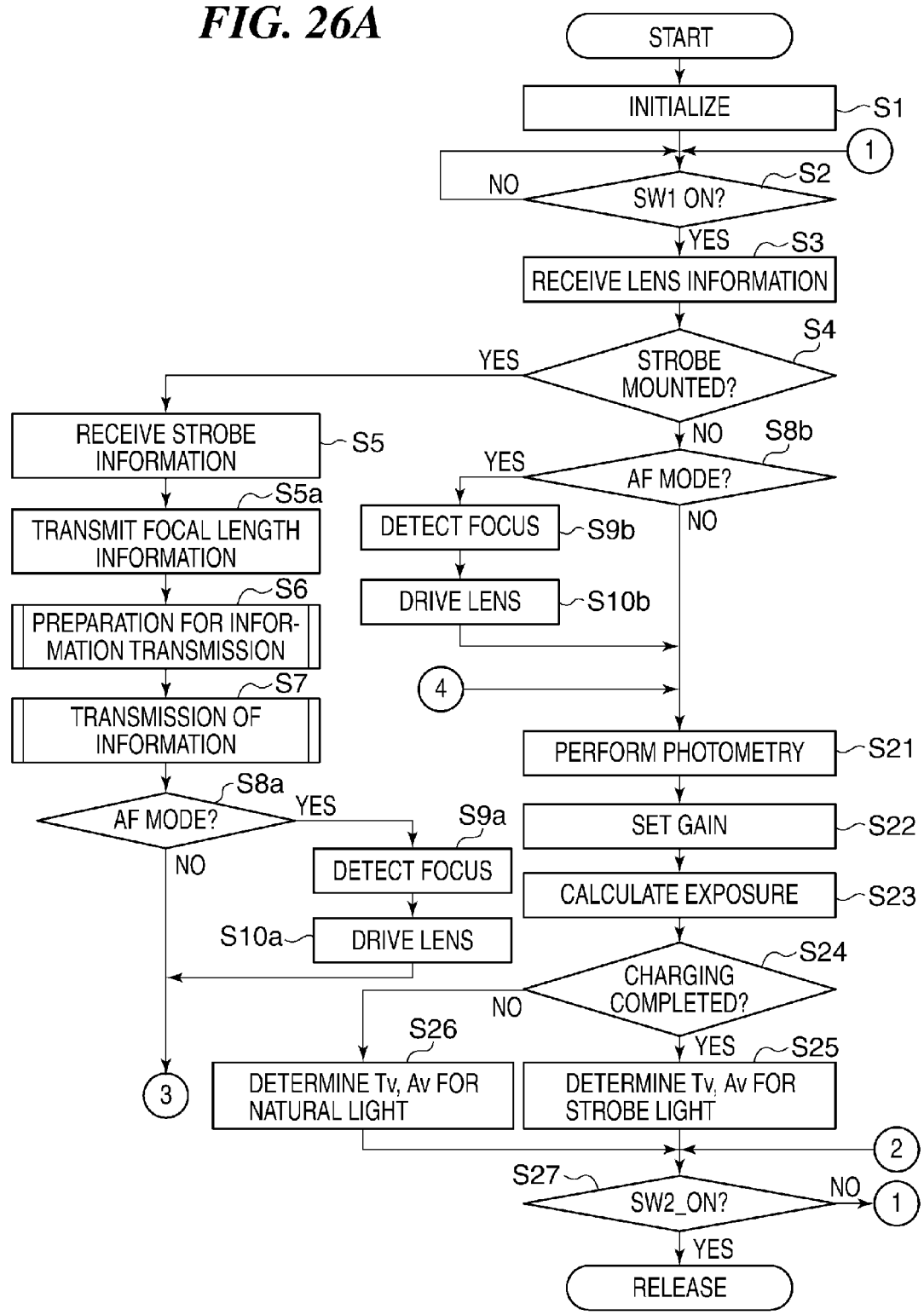
FIG. 26A is a flowchart of an automatic bounce flash shooting process performed by a camera microcomputer of a digital camera as an image pickup apparatus including a light emission control device according to a second embodiment of the present invention.
Figure 26B:
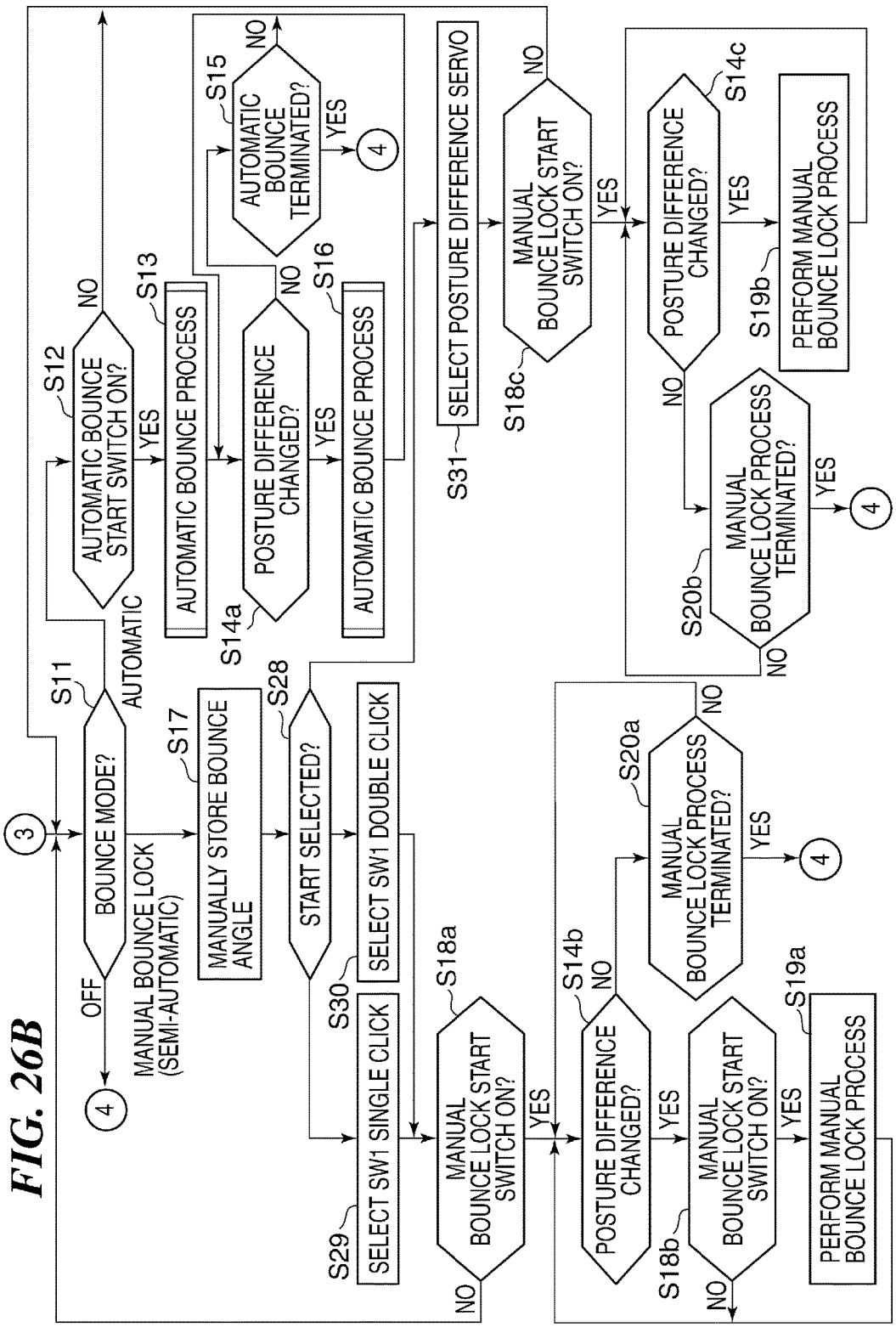
FIG. 26B is a continuation of FIG. 26A.

FIGS. 26A and 26B are a flowchart of an automatic bounce flash shooting process performed by the camera including the light emission control device according to the second embodiment. Note that in FIGS. 26A and 26B, the same steps as those of the automatic bounce flash shooting process shown in FIGS. 7A and 7B are denoted by the same step numbers, and description thereof is omitted.

Here, methods of operating the manual bounce lock start switch are stored in advance as start information in the camera microcomputer 101 or the strobe microcomputer 310 via the input section 112 or 312. The start switch operation methods include an SW1 single click operation performed for turning on the first release switch SW1 once again after it was turned on, an SW1 double click operation performed for turning on the first release switch SW1 twice in a short time period after it was turned on, and a servo operation which is the same as the automatic bounce operation. One of the SW1 single click operation, the SW1 double click operation, and the servo operation is selected as the start switch operation method, and is stored as the start information.

After execution of the step S17 in FIG. 26B, the camera microcomputer 101 selects a method of starting the manual bounce lock according to the start information stored in advance (step S28). If the SW1 single click operation is selected as the starting method (step S29), the camera microcomputer 101 proceeds to the above-described step S18a. Similarly, if the SW1 double click operation is selected as the starting method (step S30), the camera microcomputer 101 similarly proceeds to the above-described step S18a.

Note that in FIG. 26B, a step S19a is the same as the step S19 in FIG. 7B. After execution of the step S19a, the camera microcomputer 101 returns to the step S14b. Further, a step S20a is the same as the step S20 in FIG. 7B.

As described above, in a case where the SW1 single click operation or the SW1 double click operation has been selected as the method of starting the manual bounce lock, even if the camera is only inclined e.g. in order to perform a setting operation or confirm an image, the camera 100 is prevented from shifting to the bounce operation due to determination that the posture of the camera is changed.

If the servo operation (posture difference servo) has been selected as the method of starting the manual bounce lock (step S31), the camera microcomputer 101 proceeds to a step S18c. The step S18c is the same as the step S18a. Then, the camera microcomputer 101 executes steps S14c, S19b, and S20b. Since the steps S14c, S19b, and S20b are the same as the steps S14b, S19a, and S20a, description thereof is omitted.

If it is determined in the step S14c that the posture of the camera is changed, the camera microcomputer 101 proceeds to the step S19b to perform the servo operation in which the manual bounce lock processing in the step S19b is performed and then the process returns to the step S14c.

As described heretofore, in the second embodiment, by changing the irradiating direction while giving priority to a user's will, it is possible to drive the movable unit 300b in correct timing.

Incidentally, in a case where a change in the posture of the camera 100 is caused by the shooting mode thereof, it may be selected whether to perform the above-described servo operation or to perform the bounce operation according to the posture after operating the start switch. For example, the camera 100 is provided with modes (creative modes), such as a shutter priority mode, an aperture priority mode, a program mode, and a manual mode, for the user to set the aperture, the shutter speed, and the ISO sensitivity. Further, the camera 100 is provided with modes set for shooting purposes (portrait shooting, etc.) The servo operation may be selected according to these modes.

In this case, in the information transmission preparation process in the step S6 appearing in FIG. 7A, the camera microcomputer 101 transmits mode information indicative of a mode of the camera to the strobe microcomputer 310. Upon receipt information indicative of one of the creative modes as the mode information, when the posture is changed, the strobe microcomputer 310 performs a bounce operation after the start switch is operated, according to the change in the posture, irrespective of the automatic bounce or the manual bounce.

Although in the above-described embodiments, the description is given of the example in which the strobe is mounted on the camera, control associated with the manual bounce lock can also be applied to a strobe incorporated in the camera. Further, in the manual bounce lock control, the determination process and the process for calculating rotational angles may be performed by the strobe microcomputer 310.

As is apparent from the above description, in the examples illustrated in FIGS. 1 and 2, the camera microcomputer 101 and the posture detection circuit 140 function as a detection unit, and the camera microcomputer 101 and the input section 112 function as a selection unit. Further, the camera microcomputer 101 functions as a control unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, a control method realized by the functions of above-described embodiments may be executed by the light emission control device. Further, programs realizing the functions of above-described embodiments be executed by a computer provided in the light emission control device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2016-013498 filed Jan. 27, 2016 which is hereby incorporated by reference herein in its entirety.

What is claimed is:

1. A light emission control device for controlling a light emission unit that irradiates light to an object when the object is shot by an image pickup apparatus, the light emission control device comprising:
  at least one processor that functions, according to one or more programs in a memory, as units comprising:
    (1) a detection unit configured to detect posture information of at least one of the image pickup apparatus and the light emission unit;
    (2) a selection unit configured to, when performing bounce shooting in which the object is shot by causing the light emitted from the light emission unit to be reflected from the reflection object for illumination of the object, select one of (a) a first mode for controlling an irradiating direction of the light emission unit according to distances from the image pickup apparatus to the object and to a reflection object, and (b) a second mode for manually controlling the irradiating direction of the light emission unit; and
    (3) a control unit configured to start an operation for controlling, in a case where the second mode has been selected, the irradiating direction of the light emission unit according to the posture information detected by said detection unit, when a predetermined first operation that is different from an operation for selecting one of the first mode and the second mode is performed.

2. The light emission control device according to claim 1, wherein in a case where the first mode has been selected, when a predetermined second operation that is different from the first operation is performed, said control unit performs the control in the first mode, and on condition that an amount of change in the posture information detected by said detection unit is not smaller than a predetermined threshold value, said control unit performs the control in the first mode again.

3. The light emission control device according to claim 1, wherein in a case where the second mode has been selected, when the first operation is performed, on condition that an amount of change in the posture information detected by said detection unit is not smaller than a predetermined threshold value, said control unit controls the irradiating direction of the light emission unit such that the irradiating direction of the light emission unit after the change in the posture information becomes the same as the irradiating direction before the change in the posture information.

4. The light emission control device according to claim 1, wherein in a case where the second mode has been selected, when the first operation is performed, on condition that an amount of change in the posture information detected by said detection unit is not smaller than a predetermined threshold value, said control unit controls the irradiating direction of the light emission unit such that the irradiating direction of the light emission unit after the change in the posture information becomes the same as the irradiating direction before the change in the posture information, in a case where the first operation continues to be performed.

5. The light emission control device according to claim 1, further comprising a determination unit configured to determine whether or not a switch for instructing the image pickup apparatus to start a shooting preparation has been operated,
  wherein in a case where it is determined by said determination unit that the switch has been operated, on condition that the first operating portion is operated, said control unit controls the irradiating direction of the light emission unit according to the posture information detected by said detection unit.

6. The light emission control device according to claim 5, wherein the switch is operated with a single click or a double click.

7. The light emission control device according to claim 1, wherein the light emission unit includes a light emission section for irradiating light, and a movable unit for changing angles of said light emission section in a horizontal direction and a vertical direction, and
  wherein when controlling the irradiating direction, said control unit controls driving of said movable unit, to thereby change a bounce angle of said light emission section.

8. An image pickup apparatus including:
  an image sensor configured to obtain an image by shooting an object via an image pickup optical system; and
  at least one processor that functions, according to one or more programs in a memory, as units comprising:
    (1) a control unit configured to control a light emission unit,
    (2) a detection unit configured to detect posture information of at least one of the image pickup apparatus and the light emission unit; and
    (3) a selection unit configured to, when performing bounce shooting in which the object is shot by causing the light emitted from the light emission unit to be reflected from the reflection object for illumination of the object, select one of (a) a first mode for controlling an irradiating direction of the light emission unit according to distances from the image pickup apparatus to the object and to a reflection object, and (b) a second mode for manually controlling the irradiating direction of the light emission unit; and
  wherein the control unit starts an operation for controlling, in a case where the second mode has been selected, the irradiating direction of the light emission unit according to the posture information detected by said detection unit, when a predetermined first operation that is different from an operation for selecting one of the first mode and the second mode is performed.

9. A method of controlling a light emission control device for controlling a light emission unit that irradiates light to an object when the object is shot by an image pickup apparatus, the method comprising:
  detecting posture information of at least one of the image pickup apparatus and the light emission unit;
  when performing bounce shooting in which the object is shot by causing the light emitted from the light emission unit to be reflected from the reflection object for illumination of the object, selecting one of (a) a first mode for controlling an irradiating direction of the light emission unit according to distances from the image pickup apparatus to the object and to a reflection object, and (b) a second mode for manually controlling the irradiating direction of the light emission unit; and
  starting an operation for controlling, in a case where the second mode has been selected, the irradiating direction of the light emission unit according to the posture information detected by said detecting, when a predetermined first operation that is different from an operation for selecting one of the first mode and the second mode is performed.

10. A non-transitory computer-readable storage medium storing a computer-executable program for executing a method of controlling a light emission control device for controlling a light emission unit that irradiates light to an object when the object is shot by an image pickup apparatus, wherein the method comprises:

detecting posture information of at least one of the image pickup apparatus and the light emission unit;

when performing bounce shooting in which the object is shot by causing the light emitted from the light emission unit to be reflected from the reflection object for illumination of the object, selecting one of (a) a first mode for controlling an irradiating direction of the light emission unit according to distances from the image pickup apparatus to the object and to a reflection object, and (b) a second mode for manually controlling the irradiating direction of the light emission unit; and starting an operation for controlling, in a case where the second mode has been selected, the irradiating direction of the light emission unit according to the posture information detected by said detecting, when a predetermined first operation that is different from an operation for selecting one of the first mode and the second mode is performed.

* * * * *